(12) United States Patent
Hansen

(10) Patent No.: US 10,515,727 B2
(45) Date of Patent: Dec. 24, 2019

(54) MOLTEN SALT REACTOR

(71) Applicant: M. Sheldon Hansen, Orem, UT (US)

(72) Inventor: M. Sheldon Hansen, Orem, UT (US)

(73) Assignee: Utah Green Energy Technologies, LLC, Highland, UT (US)

( * ) Notice: Subject to any disclaimer, the term of this patent is extended or adjusted under 35 U.S.C. 154(b) by 0 days.

(21) Appl. No.: 16/010,362

(22) Filed: Jun. 15, 2018

(65) Prior Publication Data

US 2019/0139655 A1    May 9, 2019

Related U.S. Application Data

(60) Division of application No. 15/448,789, filed on Mar. 3, 2017, now Pat. No. 10,008,293, which is a
(Continued)

(51) Int. Cl.
| | |
|---|---|
| *G21C 3/32* | (2006.01) |
| *G21C 3/54* | (2006.01) |
| *G21C 3/336* | (2006.01) |
| *G21C 1/16* | (2006.01) |
| *G21C 1/22* | (2006.01) |
| *G21C 5/02* | (2006.01) |
| *G21C 19/14* | (2006.01) |
| *G21C 19/19* | (2006.01) |

(Continued)

(52) U.S. Cl.
CPC .............. *G21C 3/32* (2013.01); *G21C 1/16* (2013.01); *G21C 1/22* (2013.01); *G21C 3/10* (2013.01); *G21C 3/336* (2013.01); *G21C 3/54* (2013.01); *G21C 5/02* (2013.01); *G21C 7/00* (2013.01); *G21C 11/06* (2013.01); *G21C 19/14* (2013.01); *G21C 19/19* (2013.01); *G21C 5/126* (2013.01); *G21D 9/00* (2013.01); *Y02E 30/38* (2013.01); *Y02E 30/39* (2013.01)

(58) Field of Classification Search
CPC ........................................................ G21C 1/20
USPC ............................................................ 376/366
See application file for complete search history.

(56) References Cited

U.S. PATENT DOCUMENTS

| | | |
|---|---|---|
| 10,008,293 B2 | 6/2018 | Hansen |
| 2007/0064861 A1 | 3/2007 | Sterbentz |

(Continued)

OTHER PUBLICATIONS

Unknown, "Molten-Salt Reactor Experiment", Wikipedia Online Encyclopedia, Downloaded Mar. 22, 2017, pp. 1-5.
(Continued)

*Primary Examiner* — Marshall P O'Connor
(74) *Attorney, Agent, or Firm* — David B. Tingey; Bryant J. Keller; Kirton McConkie

(57) ABSTRACT

Systems and methods for providing and using molten salt reactors are described. While the systems can include any suitable component, in some cases, they include a graphite reactor core defining an internal space that houses one or more fuel wedges, where each wedge defines one or more fuel channels that extend from a first end to a second end of the wedge. In some cases, one or more of the fuel wedges comprise multiple wedge sections that are coupled together end to end and/or in any other suitable manner. In some cases, one or more alignment pins also extend between two sections of a fuel wedge to align the sections. In some cases, one or more seals are also disposed between two sections of a fuel wedge. Thus, in some cases, the reactor core can be relatively long (e.g., to be a pipeline reactor). Other implementations are also described.

3 Claims, 47 Drawing Sheets

Related U.S. Application Data continuation-in-part of application No. 14/859,100, filed on Sep. 18, 2015, now Pat. No. 10,283,223.

(51) Int. Cl.
*G21C 7/00* (2006.01)
*G21C 3/10* (2006.01)
*G21C 11/06* (2006.01)
*G21C 5/12* (2006.01)
*G21D 9/00* (2006.01)

(56) References Cited

U.S. PATENT DOCUMENTS

| | | |
|---|---|---|
| 2009/0252277 A1 | 10/2009 | Kim et al. |
| 2015/0036779 A1 | 2/2015 | LeBlanc |
| 2015/0228363 A1 | 8/2015 | Dewan |
| 2017/0084354 A1 | 3/2017 | Hansen |
| 2017/0330639 A1 | 11/2017 | Hansen |
| 2017/0330640 A1 | 11/2017 | Hansen |

OTHER PUBLICATIONS

Sorensen, Kirk, "Classic ORNL MSRE Film", Thorium Online blog (http://energyfromthorium.com), Oct. 16, 2016, pp. 1-8.

SECTION B-B    FIG. 2A

SECTION B-B

SECTION C-C

SECTION A-A

SECTION D-D

SECTION H-H

SECTION J-J

MOLTEN SALT REACTOR

CROSS-REFERENCE TO RELATED APPLICATION

This application claims priority to and is a divisional of U.S. application Ser. No. 15/448,789, filed Mar. 3, 2017, which is a continuation-in-part of U.S. application Ser. No. 14/859,100, filed Sep. 18, 2015, and entitled SYSTEMS AND METHODS FOR PROVIDING A MOLTEN SALT REACTOR, the entire disclosures of which are hereby incorporated by reference.

FIELD OF THE INVENTION

The present invention relates to molten salt reactors. More particularly, some implementations of the described invention relate to systems and methods for providing and using molten salt reactors. While the described systems can include any suitable component, in some implementations, they include a graphite reactor core defining an internal space that houses one or more fuel wedges, where each wedge defines one or more fuel channels that extend from a first end to a second end of the wedge. In some implementations, one or more of the fuel wedges comprise multiple wedge sections that are coupled together end to end and/or in any other suitable manner. Thus, in some cases, the reactor core can be relatively long. Additionally, in some implementations, one or more sections of the fuel wedges and/or parts of other reactor components are configured to be replaced relatively easily.

BACKGROUND AND RELATED ART

The need for electrical energy across the world appears to be ever growing. In this regard, electricity for power grids across the world is generated through a wide variety of methods. In one example, coal, natural gas, petroleum, another fossil fuel, wood, waste, and/or one or more other fuel sources are burned to create heat, which is then used to turn a turbine (e.g., via pressure applied to the turbine by steam that is created, and/or by air that is expanded, by the heat) and ultimately to turn an electrical generator.

In another example, wind or water is used to create electricity as such media move past (or otherwise interact with) a generator. For instance, water passing through a hydroelectric dam, water passing a water wheel, air passing a wind turbine, and tidal water passing a tidal energy converter have each been found to be effective methods for generating electricity.

In still other examples, sunlight (e.g., via solar cells, solar thermal energy generators) and/or geothermal energy (e.g., via vapor-dominated reservoirs, liquid-dominated reservoirs, enhanced geothermal systems, geothermal heat pumps, etc.) are used to generate electricity. Moreover, in still another example, nuclear energy is used to generate electricity. In this regard, uranium or another fissionable material is typically used to generate heat that converts water to steam, which, in turn, rotates one or more turbines that are coupled to one or more electric generators.

Although many conventional methods for generating electricity have proven to be useful, such methods are not necessarily without their shortcomings. For instance, some methods that generate electricity by burning fossil fuels, also produce relatively large amounts of pollution and carbon dioxide gas, while depleting the Earth's limited natural resources. Additionally, some methods for generating electricity via solar-power and/or wind-power systems are only able to generate electricity when they are exposed to a sufficient amount of sunlight and/or wind-factors that are not necessarily available 24 hours a day and 365 days a year. Moreover, as some geothermal and hydroelectric power systems rely upon, and are limited by, the natural conditions on which such systems rely, many such systems are optimally (and sometimes only) placed in specific locations (e.g., at tectonic plate boundaries, rivers, reservoirs, coast lines, etc.) that have the requisite conditions. Furthermore, some nuclear power plants also have shortcomings, which can include potential environmental damage associated with potential meltdowns, accident, uranium mining, and nuclear waste generated by the power plants.

Thus, while systems and methods currently exist that are used to generate electricity, challenges still exist, including those listed above. Accordingly, it would be an improvement in the art to augment or even replace current techniques with other techniques.

SUMMARY OF THE INVENTION

The present invention relates to molten salt reactors. More particularly, some implementations of the described invention relate to systems and methods for providing and using molten salt reactors. While the described systems can include any suitable component, in some implementations, they include a graphite reactor core defining an internal space that houses one or more fuel wedges, where each wedge defines one or more fuel channels that extend from a first end to a second end of the wedge. In some implementations, one or more of the fuel wedges comprise multiple wedge sections that are coupled together end to end and/or in any other suitable manner. In some cases, one or more alignment pins also extend between two sections of a fuel wedge to align the sections. In some cases, one or more seals are also disposed between two sections of a fuel wedge. Thus, in some cases, the reactor core can be relatively long. Additionally, in some implementations, one or more sections of the wedges and/or parts of other reactor components are configured to be replaced relatively easily.

In accordance with some implementations, the described molten salt reactor includes a reactor core that is made from graphite and that defines an internal space. In some such implementations, a graphite fuel wedge is disposed in the internal space, with the fuel wedge defining one or more fuel channels that are configured to allow a fissionable fuel to flow from a first end to a second end of the fuel wedge.

Some implementations further include a molten salt reactor that includes a graphite reactor core that defines a tubular internal space. In some such implementations, a first fuel wedge defining a first set of fuel channels and a second fuel wedge defining a second set of fuel channels are disposed in the internal space. Additionally, in some such implementations, the first and second sets of fuel channels are configured to allow a fissionable fuel comprising a molten salt to flow from a first end of the internal space to a second end of the internal space through the first and second set of fuel channels.

In yet other implementations, the described molten salt reactor includes a reactor core that is disposed in a reactor housing and that comprises graphite and defines multiple fuel channels that run between a first end and a second end of the reactor core. In some cases, the reactor core comprises one or more fuel ingress ports (or inlets) and egress ports (or outlets), and the reactor core is rotatably received within the reactor housing such that the fuel ingress and egress ports are configured to become at least one of more occluded (e.g., eclipsed, closed, etc.) and less occluded (e.g., more open) as the reactor core rotates within the housing.

Additionally, some implementations include a molten salt reactor that includes a reactor core that is disposed in a reactor housing and that comprises graphite and defines an internal space with multiple fuel wedges being received within the internal space, wherein the fuel wedges each define a fuel channel that is configured to allow a fissionable fuel to flow from a first end to a second end of each of the wedges. In some cases, a fuel pin rod is disposed between at least two of the wedges, with the fuel pin rod defining an internal fuel conduit. Additionally, in some cases, the reactor core further comprises a fuel ingress port and a fuel egress port, and the reactor core is rotatably received within the reactor housing such that the fuel ingress and egress ports are configured to become at least one of more occluded and less occluded as the reactor core rotates within the housing.

In still other implementations, in addition to (or in place of) rotating a portion of the reactor core to regulate the flow of fuel through the reactor, one or more pumps are configured to increase, decrease, and/or otherwise regulate the rate at which fuel is forced through the reactor. Accordingly, in some such implementations, pumps are used to increase and/or decrease the dwell time and/or flow rate of fuel within the reactor to increase and/or decrease a temperature of the fuel.

In yet other implementations, the described methods include a method for using a molten salt reactor, where the method includes obtaining a molten salt reactor and flowing a fissionable fuel through one or more fuel channels in the reactor. While the salt reactor in such implementations can have any suitable characteristic, in some instances, it includes a graphite reactor core that defines an internal space and that includes one or more fuel wedges in the internal space, where the fuel wedges each define one or more fuel channels that are configured to allow the fissionable fuel to flow from a first end to a second end of the reactor.

While the methods and processes of the present invention may be particularly useful for generation of electricity, those skilled in the art will appreciate that the described systems and methods can be used in a variety of different applications and in a variety of different areas of manufacture. For instance, instead of comprising a generator, some implementations of the described systems and methods are configured to provide heat to one or more buildings, stadiums, neighborhoods, and/or other structures and facilities.

In some other cases, the described systems are configured for desalination and/or to distill water (e.g., to create drinking (or relatively clean) water from salt water or another non-potable and/or polluted water source). In still other cases, the described systems and methods are configured to provide energy for use in: oil shale and oil sand production, molten pool thermal electric sterling motors, onshore and offshore power plants, automobiles, trains, ships, submarines, airplanes, helicopters, space shuttles, off-planet applications (e.g., on the moon), the production of hydrogen fuels, the production of bio gas applications, locations where portable power stations are useful (e.g., by attaching the molten salt reactor to a trailer, a skid, a vehicle, etc.), providing geothermal liquid enhancers, heating water for aqua culture, and/or for a wide variety of other suitable purposes.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other features and advantages of the present invention are obtained, a more particular description of the invention will be rendered by reference to specific embodiments thereof, which are illustrated in the appended drawings. Understanding that the drawings are not necessarily drawn to scale or in proper proportion, and that the drawings depict only typical embodiments of the present invention and are not, therefore, to be considered as limiting the scope of the invention, the present invention will be described and explained with additional specificity and detail through the use of the accompanying drawings in which:

FIG. 2A illustrates a cross-sectional view of a reactor core housing in accordance with a representative embodiment;

DETAILED DESCRIPTION OF THE INVENTION

The present invention relates to molten salt reactors. More particularly, some embodiments of the described invention relate to systems and methods for providing and using molten salt reactors. While the described systems can include any suitable component, in some embodiments, they include a graphite reactor core defining an internal space that houses one or more fuel wedges, where each wedge defines one or more fuel channels that extend from a first end to a second end of the wedge. In some embodiments, one or more of the fuel wedges comprise multiple wedge sections that are coupled together end to end and/or in any other suitable manner. In some cases, one or more alignment pins also extend between two sections of a fuel wedge to align the sections. In some cases, one or more seals are also disposed between two sections of a fuel wedge. Thus, in some cases, the reactor core can be relatively long. Additionally, in some embodiments, one or more sections of the wedges and/or parts of other reactor components are configured to be replaced relatively easily.

The following disclosure is grouped into two subheadings, namely "MOLTEN SALT REACTOR" and "REPRESENTATIVE OPERATING ENVIRONMENT." The utilization of the subheadings is for convenience of the reader only and is not to be construed as being limiting in any sense.

Molten Salt Reactor

Figure 1A:
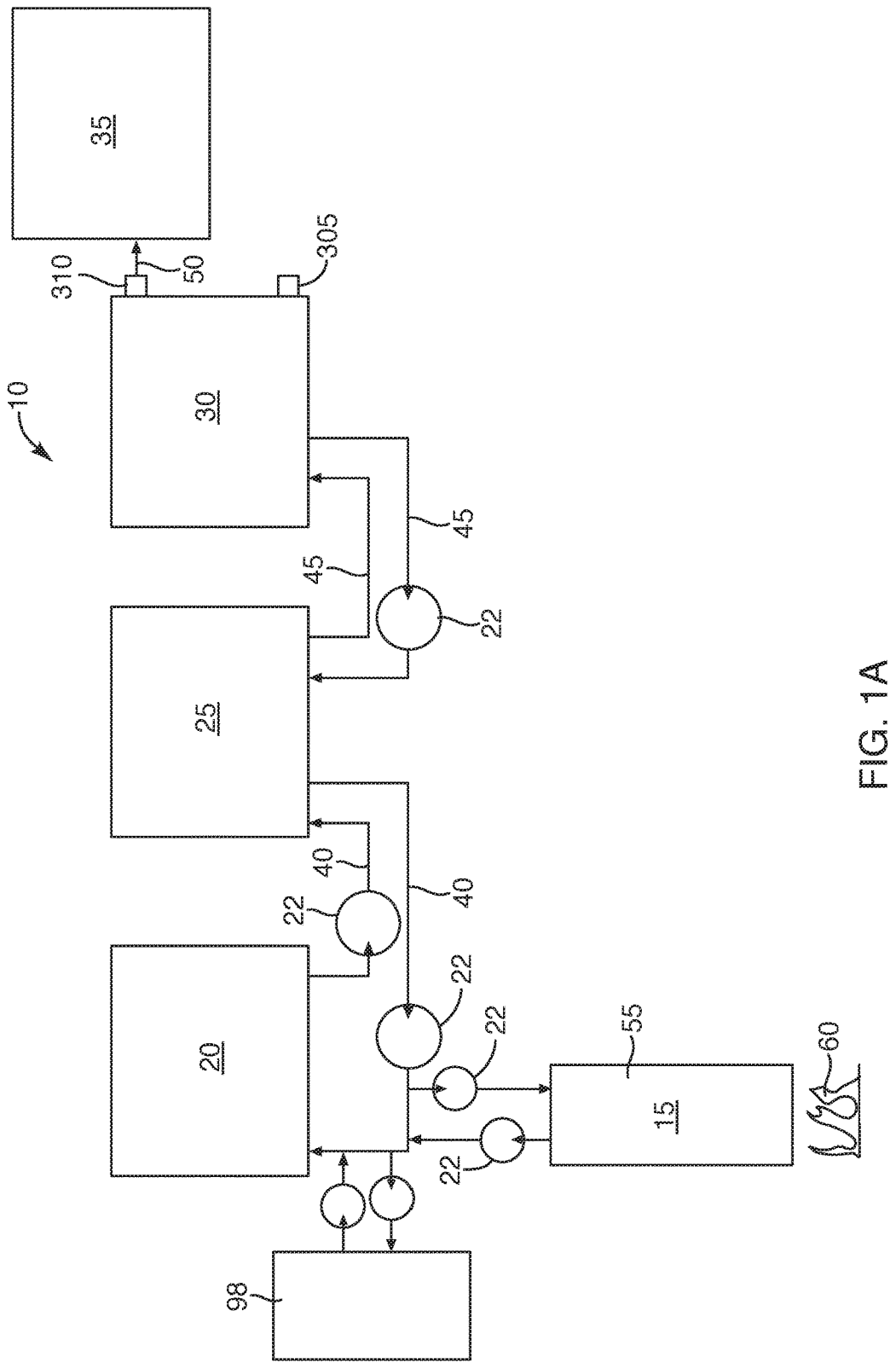
FIG. 1A illustrates a block diagram of a molten salt reactor system in accordance with a representative embodiment of the invention.

While the described systems can comprise any suitable component, FIG. 1A shows that in accordance with some representative embodiments the described molten salt reactor system 10 optionally comprises one or more heaters 15, reactors 20, heat exchangers 25, steam generators 30, and/or electric generators 35. Additionally, while the described systems can function in any suitable manner, FIG. 1A shows that, in some embodiments, the heater 15 is configured to heat one or more fissionable fuel sources (not shown) and/or carrier mediums (not shown) (collectively, the "fuel") into a molten state and to pass the molten fuel to the reactor 20. In some embodiments, the reactor 20 is configured to function as a neutron moderator that is designed to reduce the speed of fast neutrons in the molten fuel and to convert such neutrons into thermal neutrons that allow the fuel to sustain a nuclear chain reaction (or to be in a critical state), which further heats the fuel.

Figure 1B:
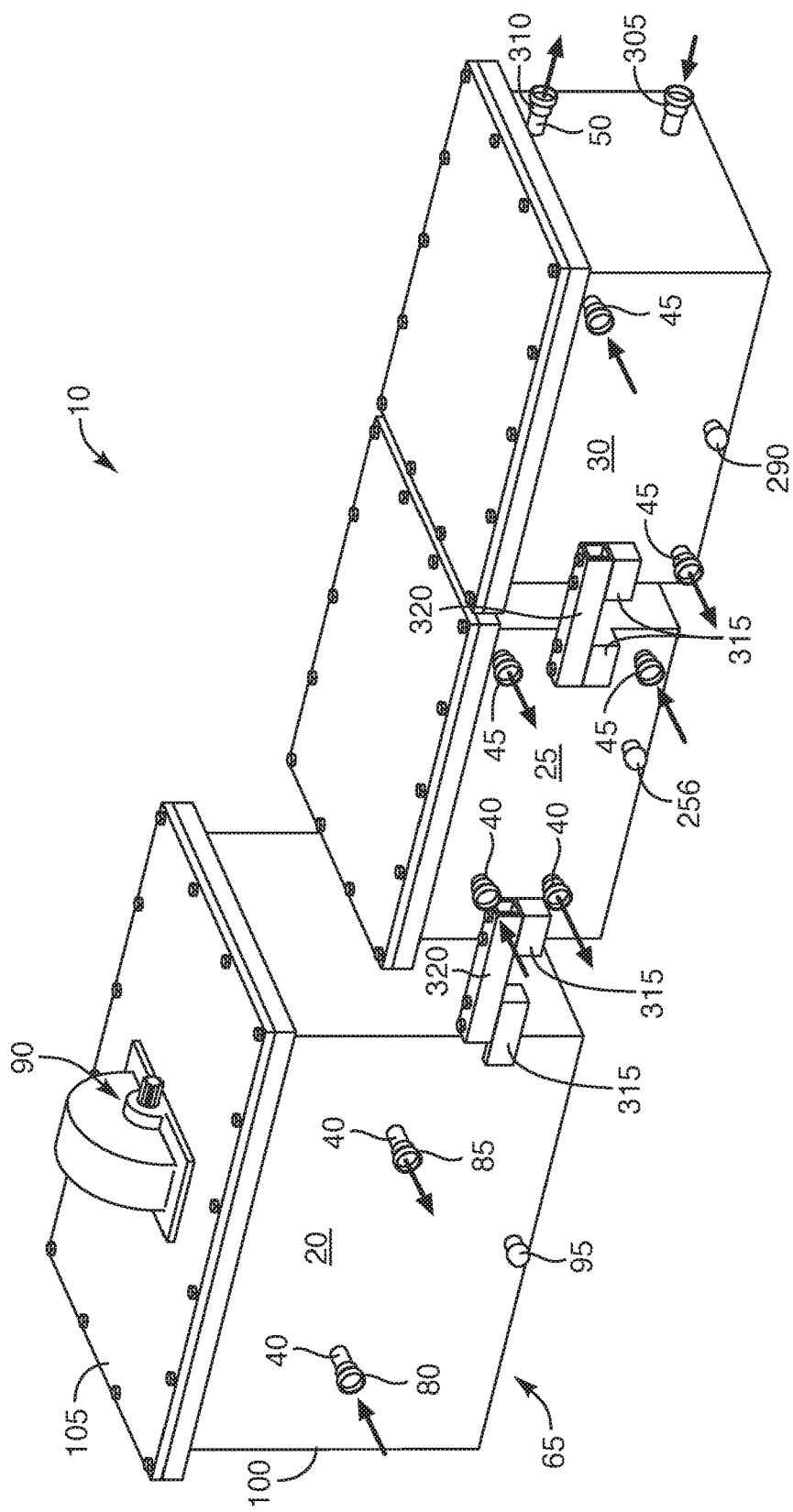
FIG. 1B illustrates a perspective view of the molten salt reactor system in accordance with a representative embodiment.
Figure 1C:
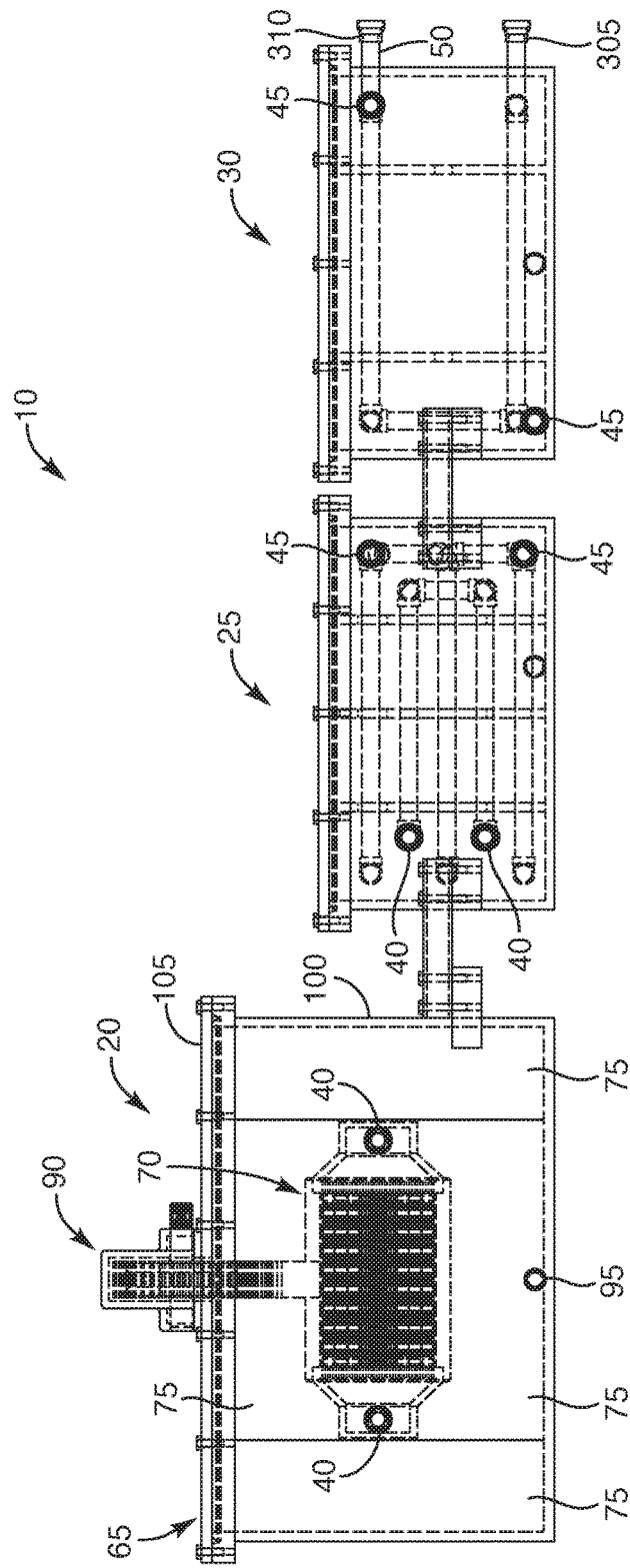
FIG. 1C illustrates a schematic view of the molten salt reactor system in accordance with a representative embodiment.

In accordance with some embodiments, FIGS. 1A-1C show that heated fuel (not shown) is cycled in a first fluid line 40 between the heat exchanger 25 and the reactor 20 such that as the fuel passes through the heat exchanger, heat from the heated fuel is optionally passed to a heat transfer medium (not shown) running through a second fluid line 45 that is separate from the first fluid line. In some embodiments (as shown in FIGS. 1A-1C), the second fluid line 45 extends between the heat exchanger 25 and the steam generator 30 and/or any other suitable location.

In some such embodiments, the system is optionally configured to move the heat transfer medium from the heat exchanger 25 (where the medium is heated), through the steam generator 30 (where heat from the heat transfer medium causes water in the steam generator to turn into steam), and the heat transfer medium is then returned to the heat exchanger (where the transfer medium is reheated). In accordance with some embodiments, FIG. 1A shows that steam from the steam generator 30 is optionally directed to the electric generator 35 (e.g., via a third line 50 and/or otherwise), where the steam is used to turn one or more turbines to generate electricity.

To provide a better understanding of the described system 10, each of the aforementioned components is described below in more detail.

With respect to the heater 15, the heater can comprise any suitable component that allows it to heat the fissionable fuel to a molten state and to then pass the molten fuel to the reactor 20. Indeed, in accordance with some embodiments, FIG. 1A shows the heater comprises a container 55, which is configured to hold the fuel, and a heat source 60 that is configured to heat the fuel.

The container 55 can have any suitable characteristic that allows the heater 15 to function as intended. For instance, the container can: be any suitable size (e.g., hold a volume of fuel that is larger than, smaller than, and/or approximately equal in volume to an internal volume of a reactor core in the reactor 20), be made of any suitable materials (e.g., comprise one or more nickel alloys, low-chromium nickel-molybdenum alloys (such as HASTELLOY-N™), metals, cements, ceramics, synthetic materials, and/or any other suitable materials), and have any suitable component (e.g., one or more drains that are configured to drain molten fuel to the reactor and/or another container, pumps that are configured to force the fuel to the reactor and/or another suitable container, mixers that are configured to mix various components of the fissionable fuel, vents, valves, lids, seals, thermostats, fluid level sensors, fluid sensors, radiation sensors, sensors, fans, and/or other suitable components) that allows the heater to function as intended. Indeed, in some embodiments, the container comprises one or more agitators, shakers, orbital mixers, and/or other mixers that are capable of mixing the various components of the fuel as it is cracked.

With regards to the heat source 60, the heat source can comprise any suitable heat source that is capable of converting (or cracking) one or more components of the fuel to a molten state. Some examples of suitable heat sources include, but are not limited to, one or more burners, heating coils, heating elements, ovens, fires, solar heaters, and/or other suitable heat sources that are capable of liquefying the fuel. The heat source may also use any suitable energy source to heat the container 55 to a desired temperature. Some non-limiting examples of such energy sources include fossil fuels, coal, electricity, wood, biomass, biofuel, and/or any other suitable source.

Once the fuel has been cracked, the fuel can be moved from the heater 15 to the reactor 20 in any suitable manner. In one example, the fuel is pumped (e.g., via one or more pumps 22 (ceramic and/or any other suitable pump), as shown in FIG. 1A) from the heater 15 to the reactor 20. In another example, the fuel is allowed to drain into the reactor via gravity. In still another example, a reactor core comprises a vacuum that is configured to draw the fuel into the core (e.g., once a valve is opened).

In some embodiments, once the heater 15 has cracked the fuel and the fuel has gone critical in the reactor 20, the heater is no longer needed to maintain the fuel in a molten state. Accordingly, while the heater 15 can have any suitable relationship with the reactor 20, in some embodiments, once the fuel has been cracked by the heater and been introduced into the reactor, the heater is disconnected from the reactor, a valve between the heater and the reactor is closed, and/or the system 10 is otherwise modified such that fuel in the reactor does not flow back into the heater until desired (e.g., if and when the fuel starts to cool and/or as the fuel is stored before being reintroduced into the reactor). Thus, in some embodiments, the heater is used to start and to restart (and/or to optimize) the system (e.g., when the system is started for the first time, after the system has been shut down for maintenance, when the fuel falls below a desired temperature before entering the reactor, and/or for any other reason).

With respect to the fuel, the fuel can comprise any suitable ingredient or ingredients that allow the fuel to be heated into a molten state and to go critical in the reactor 20. Indeed, as mentioned above, in some embodiments, the fuel comprises a fissionable fuel source and a carrier medium. Some examples of suitable fissionable fuel sources include, but are not limited to, U-233, thorium U-232, U-235, Th-232, Th-228, Th-230, Th-234, nuclear waste from a nuclear reactor (e.g., one or more light water, and/or other nuclear reactors), fuel un-cladded nuclear spent fuel rods, nuclear spent fuel rod pellets, Pu-239, $UF_4$—LiF, $PuF_3$, and/or any other suitable fissionable material and/or precursor to a suitable fissionable material. Indeed, in some embodiments, the fissionable fuel source comprises U-232, U-233, and/or U-235. Additionally, in some embodiments, the fuel comprises one or more other atomic elements that are configured to be mixed (e.g., homogeneously or otherwise) into the fuel.

The various components of the fissionable fuel source can be present in the fuel at any suitable concentrations. Indeed, in some embodiments in which the fuel comprises U-232 and U-233, the two components are respectively used at a molar ratio between about 100:1 and 1:100, or at any suitable subrange thereof. Indeed, in some embodiments, when the fuel is initially added to the reactor, the fuel respectively comprises U-232 and U-233 at a molar ratio between about 6:1 and about 2:1 (e.g., at a ratio of about 4:1) though other materials (e.g., atomic elements and/or other suitable materials) can also be mixed therein.

With respect to the carrier medium, the fuel can comprise any suitable carrier medium that allows the fuel to go critical in, and that is safe for use with, the reactor 20. Some examples of such carrier mediums include, but are not limited to, $KNO_3$ (potassium nitrate), $NaNO_3$ (sodium nitrate), $ThF_4$ (thorium fluoride), LiF (lithium fluoride), $BeF_2$ (beryllium fluoride), FLiBe (a molten mixture of lithium fluoride and beryllium fluoride), FLiNaK (a metal salt mixture of LiF, NaF (sodium fluoride), and/or KF (potassium fluoride)), and/or any other suitable salt or salts. Indeed, in some embodiments, the carrier medium comprises potassium nitrate and/or sodium nitrate. In some other embodiments, the carrier medium comprises potassium fluoride and/or sodium fluoride along with one or more other high thermal salts that can become a homogenous atomic element blend in the fuel.

Where the carrier medium comprises more than one ingredient, the various ingredients can be present at any suitable concentration in the fuel. Indeed, in some embodiments, the two components (e.g., potassium nitrate and sodium nitrate, potassium fluoride and sodium fluoride, etc.) are respectively used at a molar ratio between about 100:1 and 1:100, or at any suitable subrange thereof. In this regard, in some embodiments, the carrier medium respectively comprises potassium nitrate and sodium nitrate at a molar ratio between about 6:1 and about 0.5:1 (e.g., at a ratio of about 1.5:1). In some embodiments, the fuel includes a mixture of 60% potassium nitrate to 40% sodium nitrate, along with one or more other homogenous salt blends.

Figure 2B:
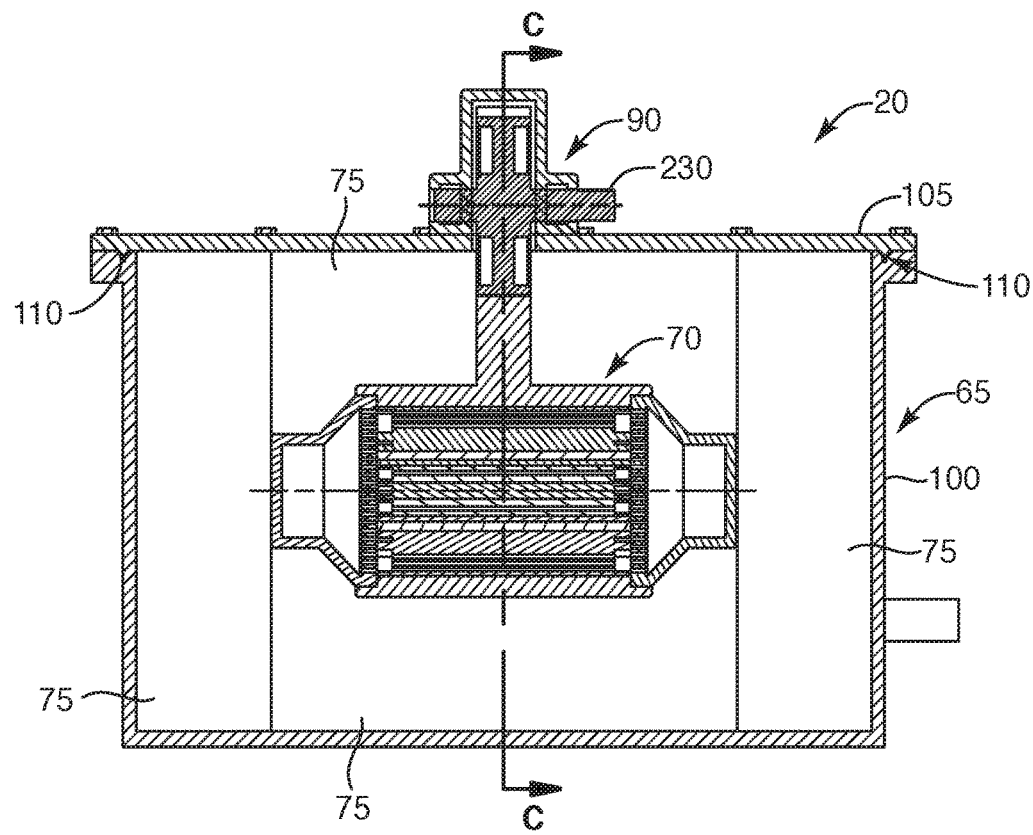
FIG. 2B illustrates a top schematic view of the reactor core housing in a partially assembled representative embodiment.
Figure 2B:
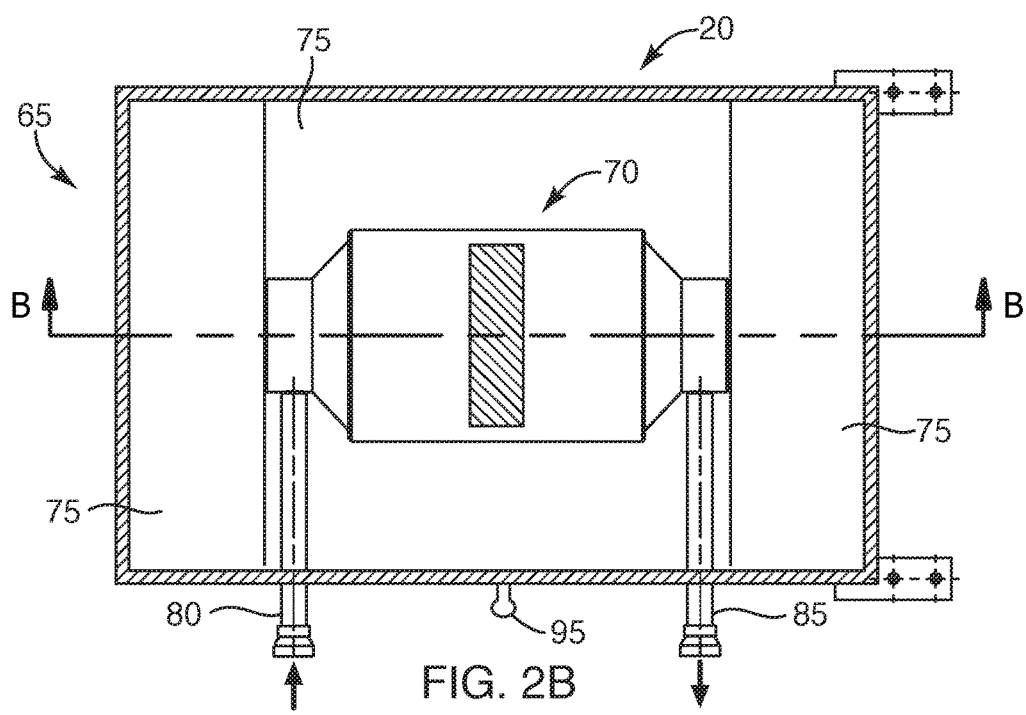

Turning now to the reactor 20, the reactor can comprise any suitable component and characteristic that allows the fuel to obtain and/or sustain a nuclear chain reaction by passing through the reactor. By way of non-limiting illustration, FIGS. 2A-2B show that, in some embodiments, the reactor 20 optionally comprises one or more housings 65, reactor cores 70, reflectors 75, fuel inlets 80, fuel outlets 85, reactor control mechanisms 90, and/or drains 95.

Figure 2C:
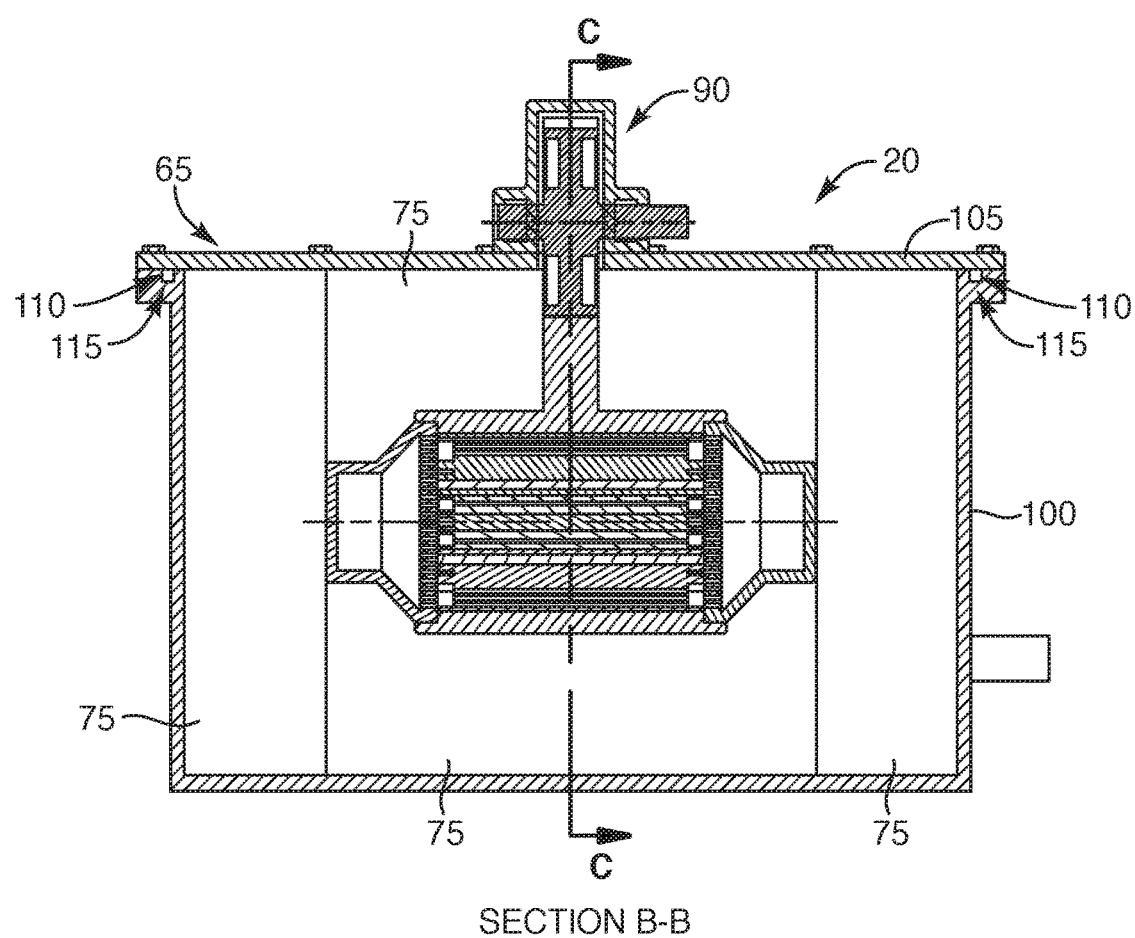
FIG. 2C illustrates a cross-sectional view of the reactor core housing in accordance with a representative embodiment.
Figure 3A:
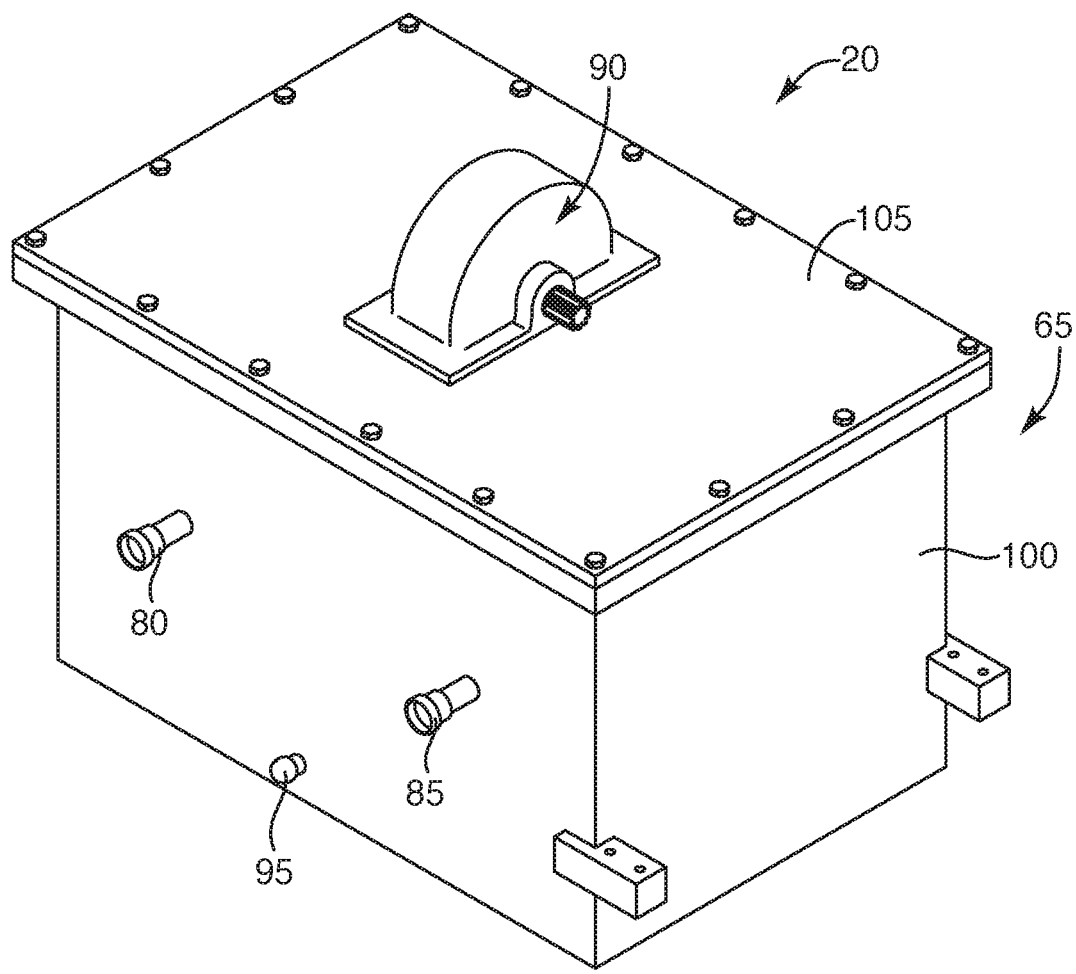
FIG. 3A illustrates a perspective view of a representative embodiment of the reactor core housing.
Figure 3B:
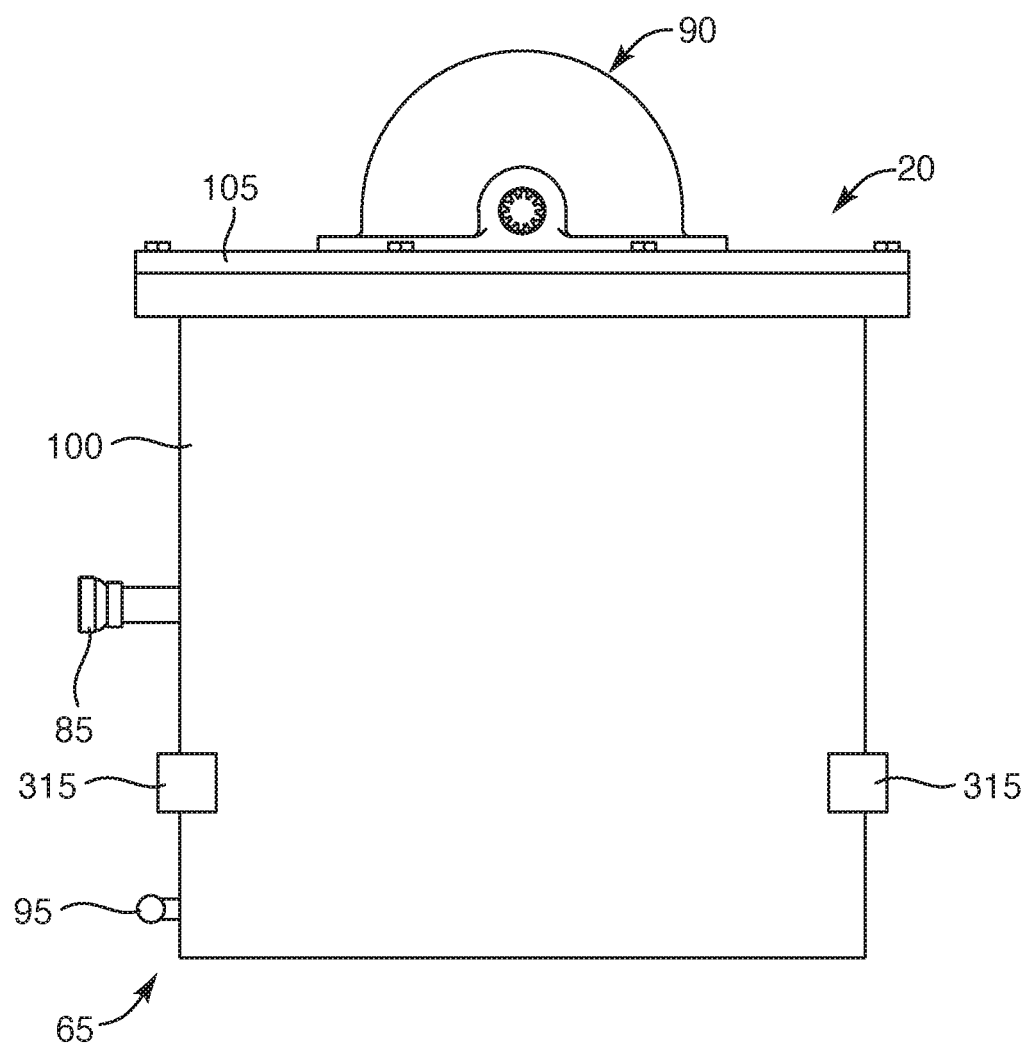
FIG. 3B illustrates a side view of a representative embodiment of the reactor core housing.
Figure 3C:
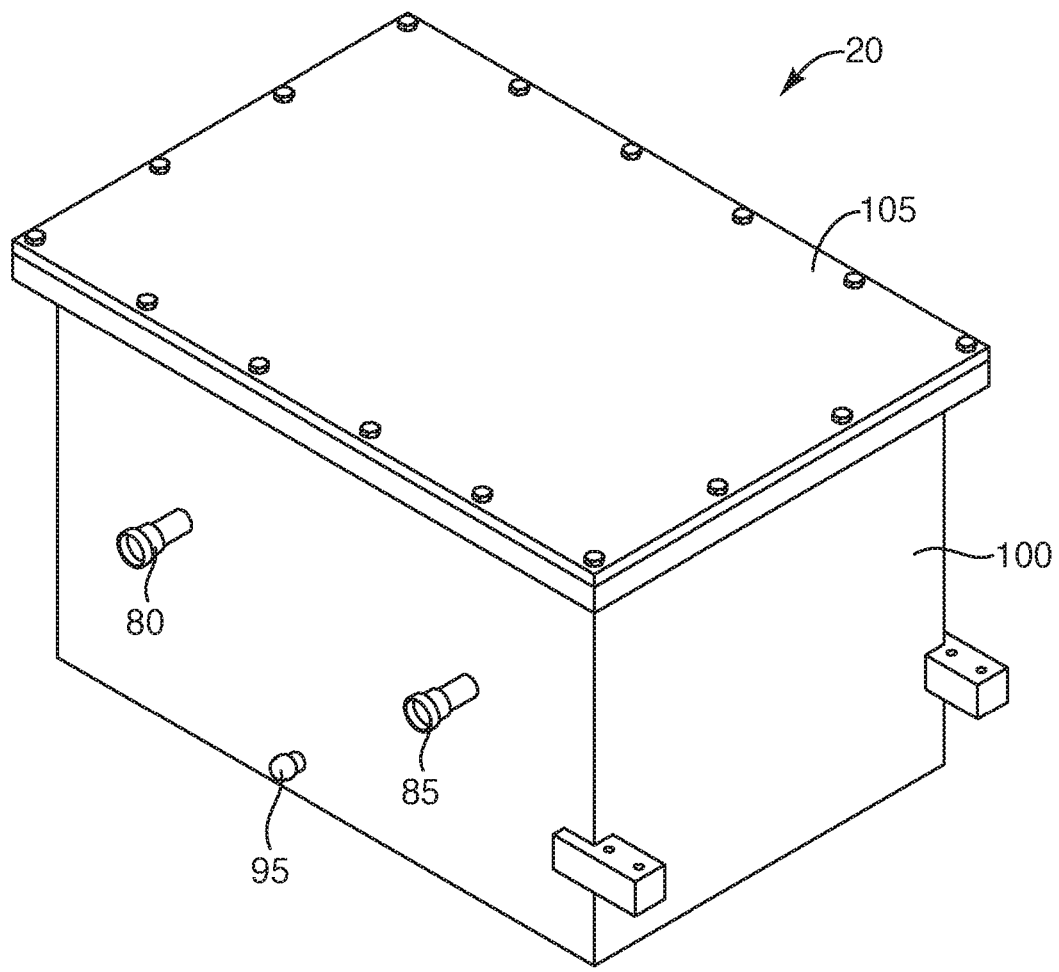
FIG. 3C illustrates a perspective view of a representative embodiment of the reactor.

With regards to the housing 65, the housing can comprise any suitable component or characteristic that allows the housing to contain the reactor core 70 and to prevent undesired amounts of neutrons and/or gamma radiation from escaping the housing. While the housing can further comprise any suitable component that allows it to substantially envelope the reactor core, FIGS. 2A-3B show that, in some embodiments, the housing 65 includes a container 100 having a cover 105 that is selectively removable and/or openable to provide access to the reactor core 70, the reflectors 75, and/or any other suitable component. In some such embodiments, the housing 65 (as shown in FIGS. 2B-2C) further comprises one or more seals 110, which may include, but are not limited to, one or more carbon seals, carbon ropes, carbon-containing materials, rubber seals, gaskets, positive seals, mating seals (or objects that come together to form a seal), and/or any other suitable seal and/or sealing material. Indeed, in some embodiments, FIG. 2C shows the seal 110 between the cover 105 and the container 100 comprises one or more carbon ropes 115.

The housing 65 can comprise any suitable material that allows it to function as intended. Indeed, in some embodiments, the housing comprises one or more metals (e.g., lead, steel, iron, tungsten, nuclear grade metals, and/or any other suitable metals), alloys (e.g., one or more nickel alloys, low-chromium nickel-molybdenum alloys (e.g., HASTELLOY-N™), nuclear grade alloys, and/or other suitable alloys), cements, types of nuclear gunnite, types of nuclear shotcretes, types of mortar, types of reinforced cement, ceramics, synthetic materials, natural materials, polymers, nano-metals, plastics, hydrogen-based materials, fiberglass, stone, and/or any other suitable materials. In some embodiments, however, the housing comprises a low-chromium nickel-molybdenum alloy, such as a HASTELLOY-N™ material. Additionally, in some embodiments, the housing further comprises one or more internal and/or external liners (e.g., lead, steel, ceramic, nano-composites, graphite, graphite foam, and/or plastic liners), a secondary containment housing (comprising the same materials as, or different materials than, the housing), and/or one or more reinforcement elements (e.g., steel rods, steel meshes, fiber reinforcements, composites, graphite foam, graphite metal composites, and/or any other suitable reinforcements).

Turning now to the reactor core 70, the core can comprise any suitable component or characteristic that allows it to act as a moderator as the fuel passes through it, such that the core is able to help the fuel reach (and/or maintain) a critical state. Some non-limiting examples of such elements include, a reactor core tube and one or more end caps, internal moderators, and/or diffusers.

Figure 4A:
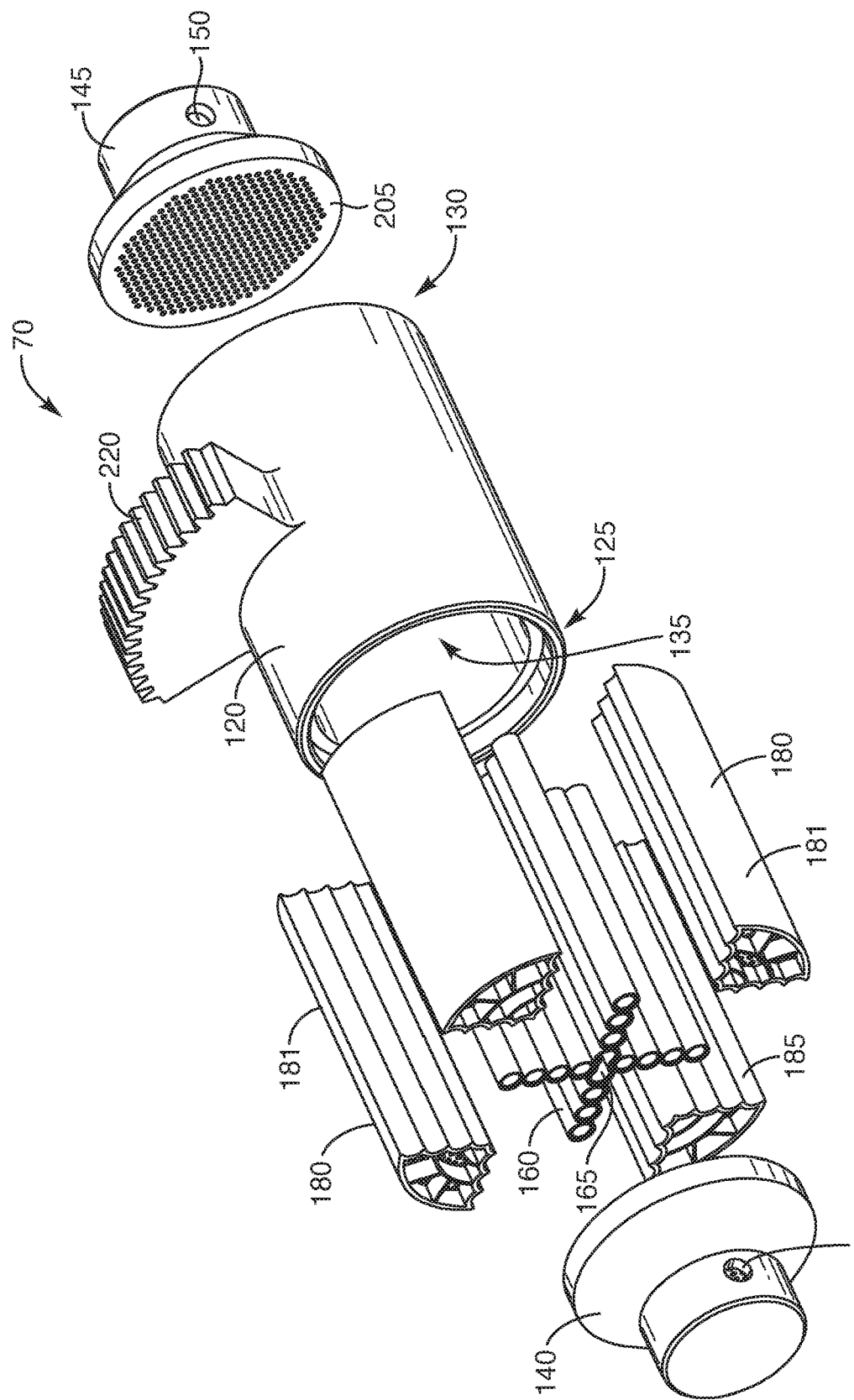
FIG. 4A illustrates a perspective, exploded view of a reactor core in accordance with a representative embodiment.

With reference to the reactor core tube, the tube can comprise any suitable characteristic that allows it to function as described herein. In this regard, the tube can be any suitable shape, including, without limitation, being cylindrical, polygonal, cuboidal, symmetrical, asymmetrical, tubular, spherical, prism-shaped (e.g., hexagonal prism shaped, polygonal prism shaped, pentagonal prism shaped, cuboidal prism shaped, parallel-piped prism shaped, octagonal prism shaped, rectangular prism shaped, and/or any other suitable prism shape), and/or any other suitable shape. By way of non-limiting illustration, FIG. 4A shows an embodiment in which the reactor core tube 120 is substantially cylindrical and tubular in shape, having a first end 125 and a second end 130 with an internal space 135 defined between the two ends.

The reactor core tube 120 can be any suitable size. Indeed, while the reactor core tube can be any suitable length, in some non-limiting embodiments, the tube has a length that is between about 0.05 meters (m) and about 150 m, or any length that falls in such range. In this regard, some embodiments comprise a reactor core tube having a length between about 0.1 m and about 61 m. In still other embodiments, the reactor core tube has a length between about 0.2 m and about 31 m. In yet other embodiments, the reactor core tube has a length between about 0.3 m and about 2.5 m (e.g., between about 0.5 m and about 0.8 m). In other embodiments, the reactor core tube has length that is even greater than or shorter than the lengths set forth herein. In this regard, it will be understood that the reactor core tube's size may vary greatly, depending on its particular use.

While the reactor core tube 120 can have any suitable width or diameter, in some embodiments, the tube has an inner diameter or width (or ID) that is between about 0.04 m and about 10 m, or any width/diameter that falls in such range. In this regard, some embodiments of the reactor core tube comprise an ID that is between about 0.2 m and about 3 m (e.g., between about 0.25 m and about 1.3 m or between about 0.5 m and about 0.76 m). Indeed, in some embodiments, the ID (and/or other one or more other measurements of the reactor core tube) is adjusted or otherwise set to meet the needs of a particular fuel, application, and/or a desired energy output.

The walls of the reactor core tube 120 can be any suitable thickness. Indeed, in some embodiments, the distance between the tube's outer diameter (OD) and ID (or wall thickness) is between about 0.1 centimeter (cm) and about 1 m, or any thickness that falls in such range. Indeed, in some embodiments, the tube has a wall thickness that falls between about 1 cm and about 13 cm (e.g., between about 1.5 cm and about 3.5 cm). In other embodiments, the tube's wall can be any other suitable thickness (e.g., based on energy output needs).

With reference now to the end caps, although some embodiments of the reactor core 70 are formed with one or both ends (e.g., ends 140 and/or 145) being closed, in some embodiments, the first and/or second ends of the reactor core tube 120 open until they are capped with an end cap. While the end caps can perform any suitable function, in some embodiments, the end caps are configured to retain the fuel in the reactor core and to help direct the fuel into and out of the reactor core tube.

While the end caps can comprise any suitable component that allows them to perform their desired function, FIG. 4A shows a representative embodiment in which the first end cap 140 and the second end cap 145 each comprises one or more (e.g., 1, 2, 3, 4, 5, 6, or more) fuel ports 150. Additionally, while the end caps can be any suitable shape, FIG. 4A shows an embodiment in which the first 140 and second 145 end caps are flared to respectively help channel fuel from the fuel port 150 in the first cap 140 to the internal space 135 of the reactor core tube 120, and then from the internal space 135 of the reactor core tube 120 to the fuel port 150 in the second cap 145.

Where the reactor core 70 comprises a first 140 and/or second 145 end cap (or fuel heads), the end caps can be coupled to the core through any suitable method. Some example of such methods include, without limitation, being integrally formed with, being threaded together with, via a pressure and/or friction fitted together with, via one or more mating surfaces (e.g., grooves and corresponding ridges or otherwise), via a luer-taper connection, via one or more seals (e.g., carbon seals, carbon rope seals, rubber seals, positive seals, mating seals, nano-composites, and/or other suitable seals), via welding, via one or more adhesives, via one or more mechanical fasteners (e.g., rivets, clamps, clamping mechanisms, reflectors 75 and/or other objects that help press the caps into the reactor core tube 120, screws, bolts, clips, pegs, crimps, pins, brads, threads, brackets, catches, couplers, key-way splines, straps, cramps, heat shrink binding mechanisms, and/or any other suitable mechanical fasteners), and/or other suitable fastening mechanism. Indeed, in some embodiments, the end caps are coupled to the reactor core tube via a friction fitting, with one or more seals (e.g., carbon ropes, positive seals, and/or other suitable seals) being disposed between the end caps and the reactor core tube to help maintain an air-tight and/or fluid/fuel-tight seal between the caps and the reactor core tube.

As mentioned, in some embodiments, the internal space 135 in the reactor core tube 120 comprises one or more internal moderators that are configured to help the fuel reach (and/or maintain) a critical state in the reactor core 70. In this regard, the internal moderators can comprise any suitable component or components that are capable of performing the described function. Some examples of suitable internal moderators include, but are not limited to, one or more rods, balls, pellets, beads, granules, particles, blocks, articles, pipes, graphite gels, gels, pieces, and/or other objects that can be surrounded by and/or filled with the fuel so as to allow the material of the moderator (e.g., carbon, graphite, and/or any other suitable material capable of bringing the cracked fuel to a critical state) to function as a moderator. Indeed, in some embodiments, the internal moderators comprise graphite balls, and more particularly substantially pure graphite having a purity level of about 99% or greater (e.g., having a graphite purity of at least about 99.90%).

Figure 4B:
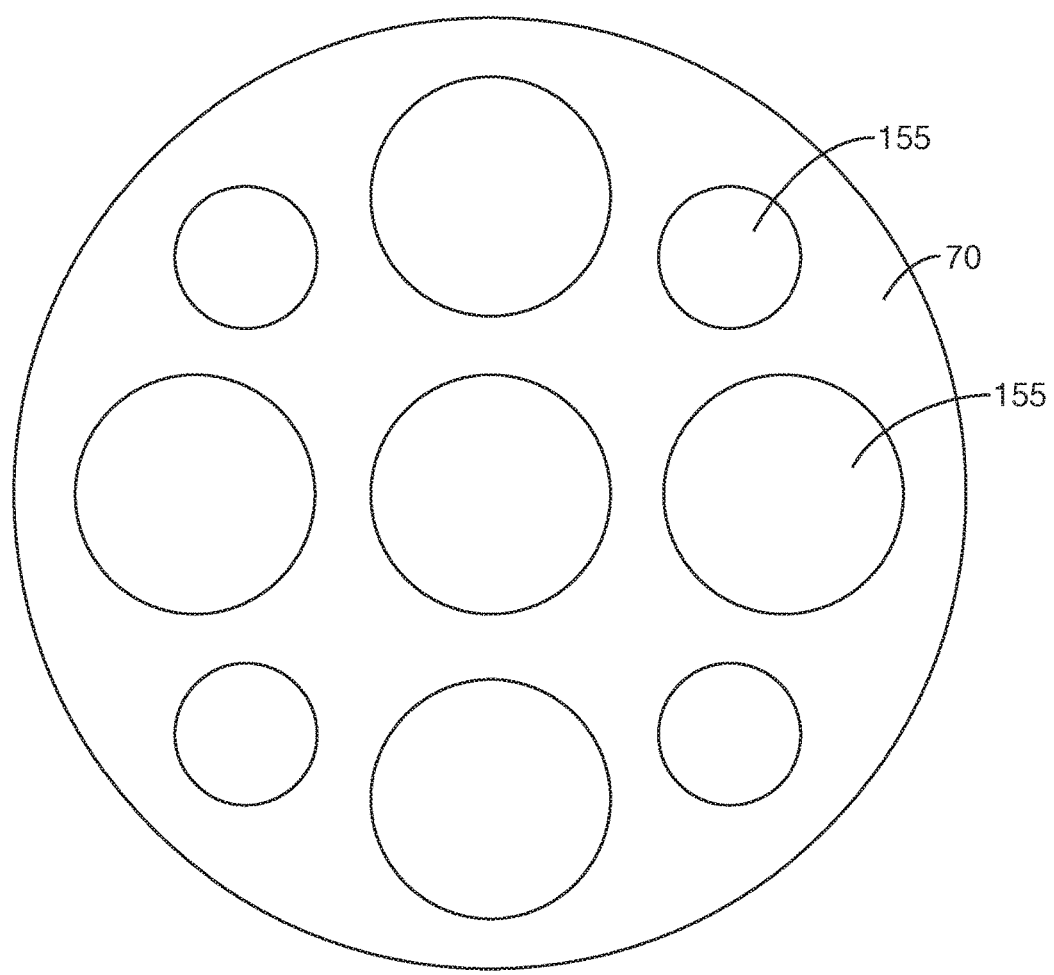
FIGS. 4B-4C each illustrate a cross-sectional view of the reactor core, in accordance with a representative embodiment, and wherein the reactor core itself is configured to act as a moderator.
Figure 4C:
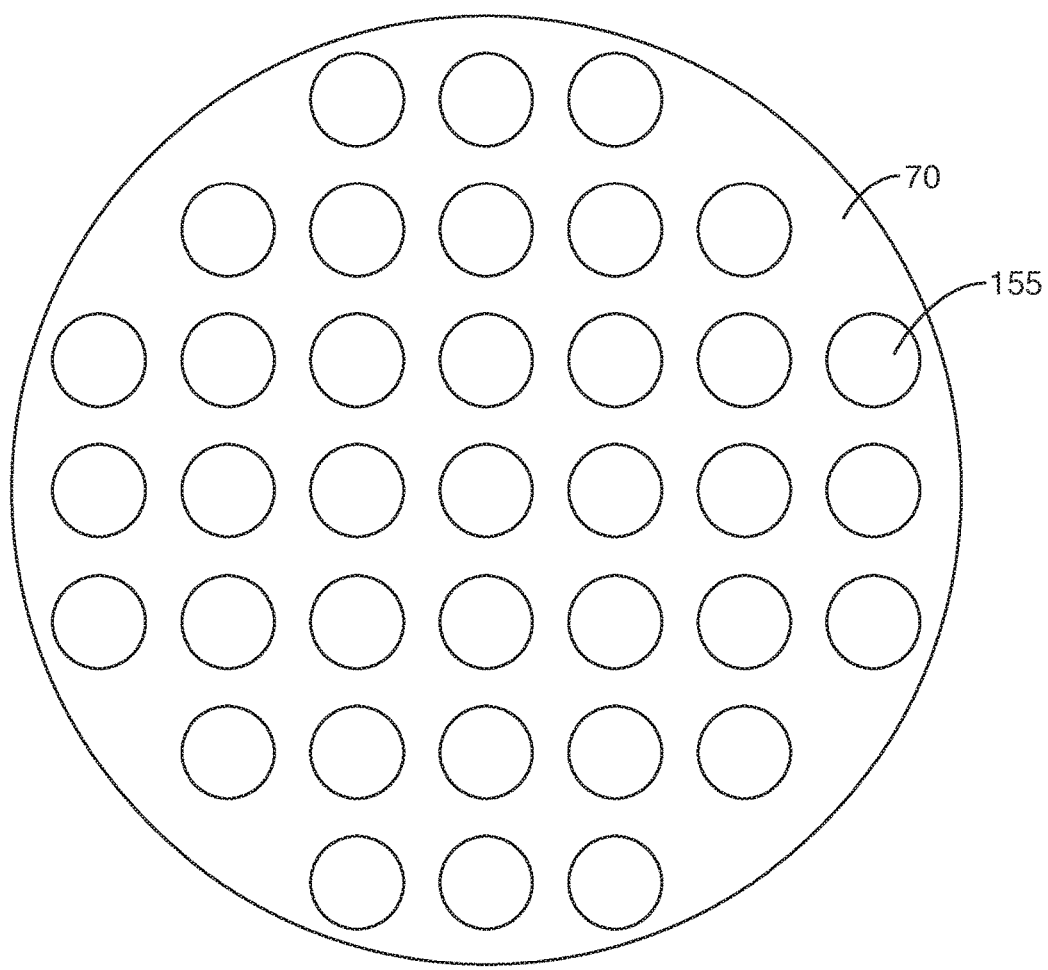
Figure 4D:
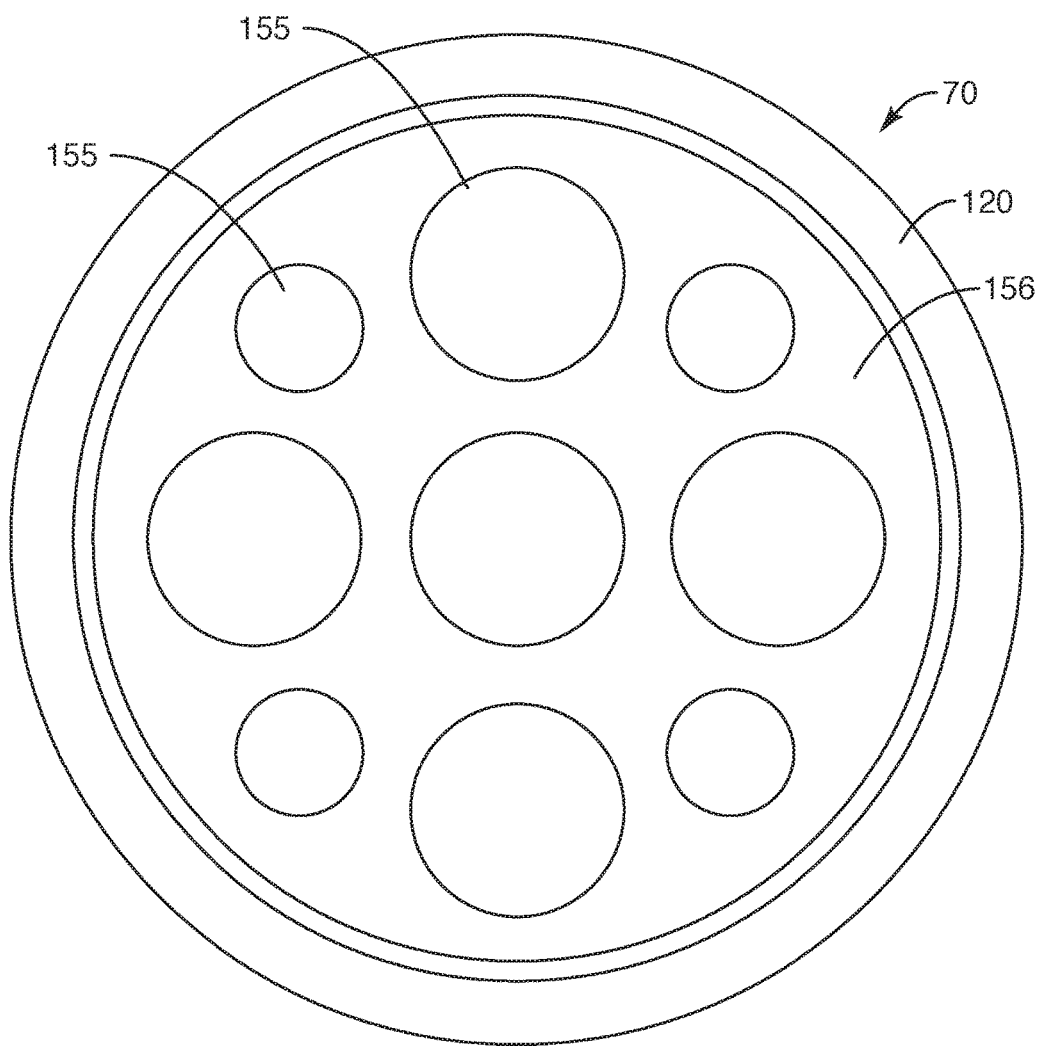
FIG. 4D illustrates, in accordance with a representative embodiment, a cross-sectional view of the reactor core, wherein the reactor core comprises a cylindrical insert configured to function as an internal moderator.
Figure 4E:
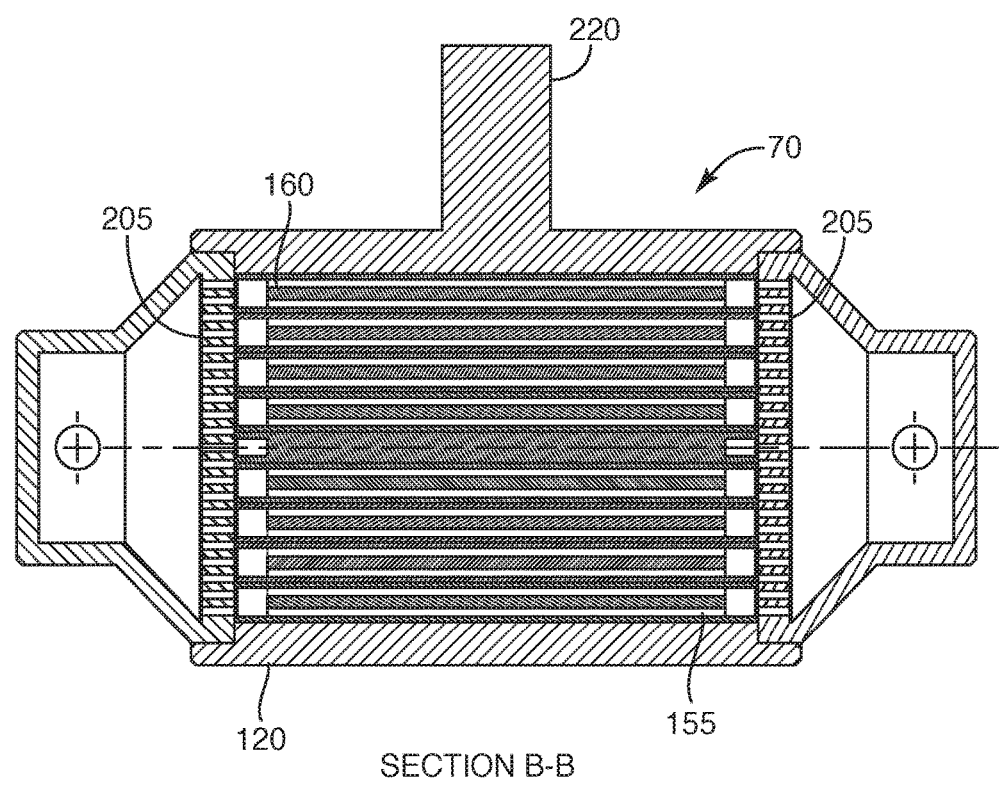
FIG. 4E illustrates a cross-sectional view of the reactor core in accordance with a representative embodiment.

In some other examples, the internal moderators comprise one or more cylinders, blocks, wedges, pins, rods, balls, solid block inserts defining a plurality of holes, the reactor core 70 itself (e.g., wherein the internal space 135 comprises one or more fuel channels or holes extending through a portion of the reactor core), and/or other suitable objects that define one or more holes therein, wherein such holes are configured to channel the fuel from a first portion (e.g., a first end 125 portion, a first diffuser (as discussed below), and/or a first end cap 140) to a second portion (e.g., a second end 130 portion, a second diffuser (as discussed below), and/or a second end cap 145) of the reactor core. Indeed, in some embodiments, the reactor core itself acts as the internal moderator. In some other embodiments, however, the internal moderators comprise one or more fuel pin rods, fuel wedges, and/or graphite spheres.

Where the reactor core 70 itself acts as the internal moderator, the reactor core can comprise any suitable characteristic that allows it to bring and/or maintain the fuel at a critical state. In some embodiments, the core comprises (e.g., by itself and/or houses) a solid block of material (e.g., graphite, as discussed below) defining one or more fuel channels. In this regard, the core can comprise any suitable number of fuel channels, including, without limitation, between about 1 fuel channel and about 2,000 fuel channels, or any number of channels falling within such range. Indeed, in some embodiments, the reactor core defines between about 3 and about 150 (e.g., between about 3 and about 60 or between about 80 and about 130) fuel channels. By way of non-limiting illustration, FIGS. 4B and 4C respectively show some embodiments in which the reactor core 70 itself defines 9 and 37 fuel channels 155. Additionally, FIG. 4D illustrates an embodiment in which the reactor core 70 comprises a cylindrical insert 156 that is disposed within the reactor core tube 120, and which defines 9 fuel channels 155. While the fuel channels 155 shown in FIGS. 4B-4D are shown to be substantially circular or cylindrical in shape, the channels can have any other suitable shape that also the reactor to function, including, without limitation, being tubular, prism shaped, round balls, egg-shaped balls, polygonal balls, and/or any other suitable shape.

Where the reactor core 70 comprises one or more fuel pin rods, the fuel pin rods can comprise any suitable component or characteristic that allows them to bring a portion of the molten fuel to (and/or to be maintained at) a critical state. Indeed, while the pins can be any suitable length, in some embodiments, they are of a sufficient length that allows them to direct fuel from the first end 125 to the second end 130 of the reactor core tube 120.

Figure 4F:
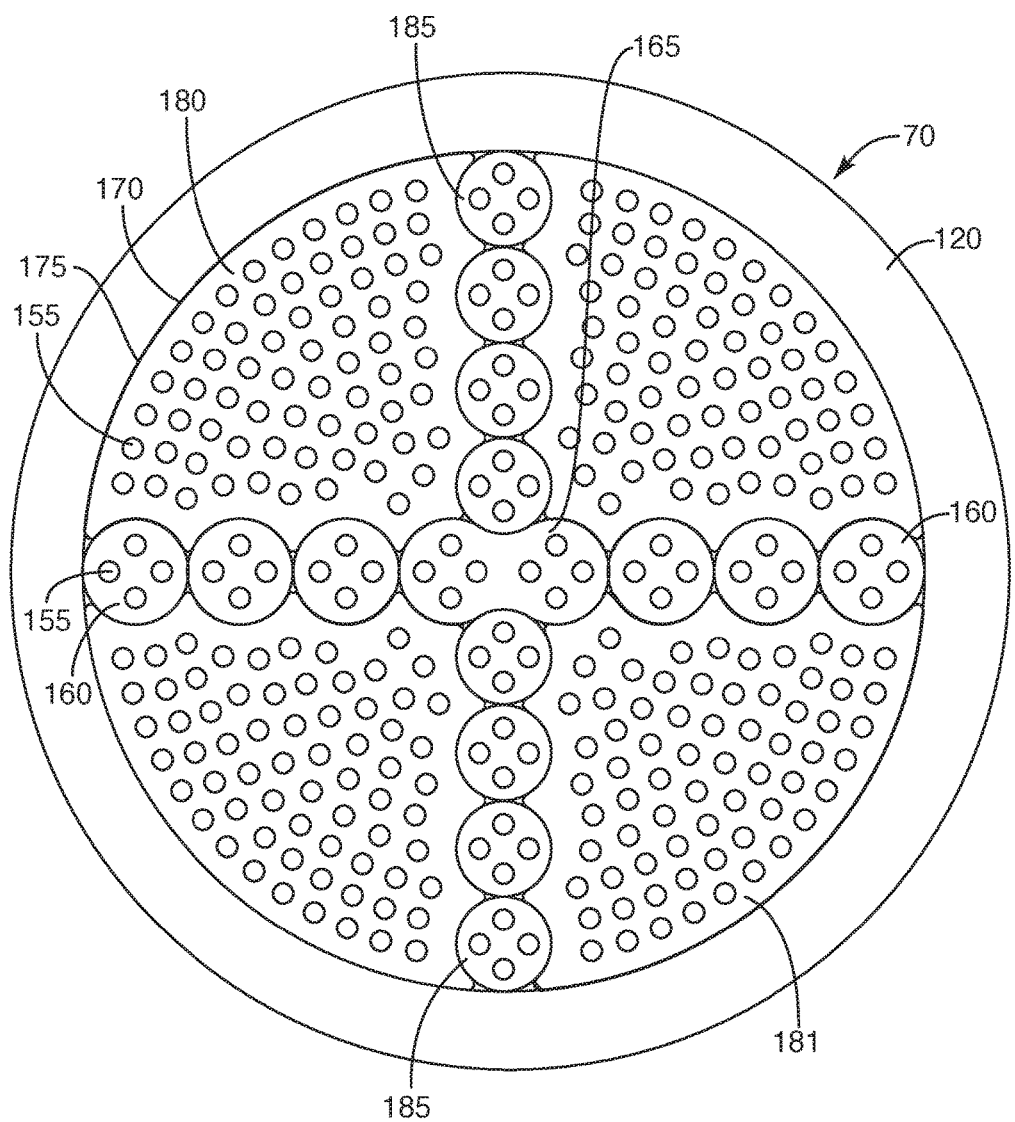
FIG. 4F illustrates, in accordance with a representative embodiment, a cross-sectional view through the reactor core, wherein the core includes multiple fuel pin rods that are disposed between multiple fuel wedges.

Additionally, in some embodiments, the pins define one or more holes, or fuel channels, that extend through a length of the pins to channel the fuel from the reactor core tube's first end 125 to its second end 130. The channels can be disposed in the pins in any suitable manner, including, without limitation, by running substantially parallel with a longitudinal axis running through a length of the pins, by corkscrewing through the pins, by twisting through the pins, by extending through the pins at an angle, by rotating though the pins, by spiraling through the pins, by extending through the pins in a serpentine manner, and/or in any other suitable manner. In accordance with some embodiments, however, FIGS. 4A-4E show that the fuel channels 155 (which may also be referred to as internal fuel conduits and holes) run substantially straight through the pins 160 (e.g., parallel with the pins' longitudinal axes).

Where the reactor core 70 comprises one or more pins 160, the pins can each define any suitable number of holes that allow the core to bring and/or maintain the fuel at a critical state. In this regard, each pin can comprise 1, 2, 3, 4, 5, 6, 7, 8, 9, 10, 11, 12, 13, 14, 15, or more holes. By way of non-limiting illustration FIG. 4F shows an embodiment in which several pins 160 comprise four fuel channels 155, while a center pin 165 comprises eight fuel channels 155. In some embodiments, each hole in the pin is a fuel channel that extends through the pin. In some other embodiments, however, even though a pin defines multiple entry and/or exit holes, the holes are in fluid communication with a single fuel channel that flows through the pin.

The pins 160 can be any suitable shape, including, without limitation, being substantially cylindrical; tubular; cuboidal; rectangular-prism-shaped; triangular-prism-shaped; polygonal-prism-shaped; hexagonal-prism-shaped; pentagonal-prism-shaped; cuboidal-prism-shaped; octagonal-prism-shaped; segment-prism-shaped; parallel-piped-prism-shaped; pill-shaped (e.g., cylindrical with rounded ends); having an outer perimeter with a cross-sectional appearance resembling that of a peanut, cells in anaphase, cells in telophase, and/or a double-barreled shotgun; having a cross-sectional view resembling 2, 3, 4, 5, 6, or more intersecting circles; having or more corresponding shapes that fit together to substantially fill a portion of the reactor core 70; and/or any other suitable shape. By way of non-limiting illustration, FIGS. 4A and 4F show some embodiments in which the pins 160 have a cylindrical shape and/or (in the case of the center pin 165 shown in FIGS. 4A and 4F) a cross-sectional view resembling cells in telophase.

Where the reactor core 70 comprises one or more pins 160, the reactor core can comprise any suitable number of pins that allows the reactor core to function as described herein. In this regard, while some embodiments of the core comprise no pins, other embodiments comprise between about 1 and about 2,000 pins, or any subrange thereof. Indeed, in some embodiments, the reactor core comprises between about 1 and about 140 pins, or any subrange thereof (e.g., between about 12 and about 80 pins). By way of non-limiting illustration, FIG. 4F shows an embodiment in which the reactor core 70 comprises a total of 15 pins (as shown by pins 160 and 165).

Although, in some embodiments, the internal space 135 is mostly (if not entirely) filled with fuel pin rods 160, in other embodiments, in addition to (or in place of) the pins, the internal space houses one or more wedges. In this regard, the term wedge may be used to describe any suitable internal moderator (including, without limitation, a graphite and/or other suitable moderator) defining one or more fuel channels 155 that run through a length of the moderator. In this regard, some embodiments of the described fuel pins may be described as belonging to a sub-class of fuel wedges (especially where the pins define two or more discrete fuel channels). In some embodiments, however, the term fuel wedge may refer to an elongate, graphite (and/or carbon) moderator that defines a plurality of fuel channels that extend along a length of the wedge, wherein the wedge is configured to fit in (and, in some embodiments, to stack or fit together with other wedges and/or pins to substantially fill) the internal space. Additionally, while the fuel wedges can have any suitable shape that allows them to act as moderators, in some embodiments, the wedges have a surface that is configured to substantially contour with an inner surface of the reactor core 70 (e.g., an inner surface of the reactor core tube 120) and/or to come into contact with such inner surface at more than one place. For instance, in some embodiments in which the reactor core tube 120 defines an interior surface having a polygonal, rounded, contoured, and/or irregular surface, an outer surface of one or more fuel wedges is configured to substantially contour such interior surface and/or to at least contact such surface in more than one location at a time.

In this regard, FIG. 4F shows an embodiment in which the reactor core tube 120 defines a interior surface 170 (that is cylindrical, tubular, polygonal, irregular, symmetrical, and/or any other suitable shape), and in which an outer surface 175 of each of the fuel wedges 180 is curved, angled, and/or otherwise configured to substantially correspond in shape with the interior surface 170 of the reactor core tube 120.

The fuel wedges 180 can have any suitable shape that allows the reactor 20 to function as intended. Some non-limiting examples of suitable shapes include that of geometrical sector-shaped prism, an arc-shaped prism, a polygonal prism, a rounded prism, a hexagonal prism, a pentagonal prism, a triangular prism, a cuboidal prism, a parallel-piped prism, a segment prism, a sector prism, a truncated sector prism, an elongated diamond shaped prism, and/or any other suitable shape.

Figure 4G:
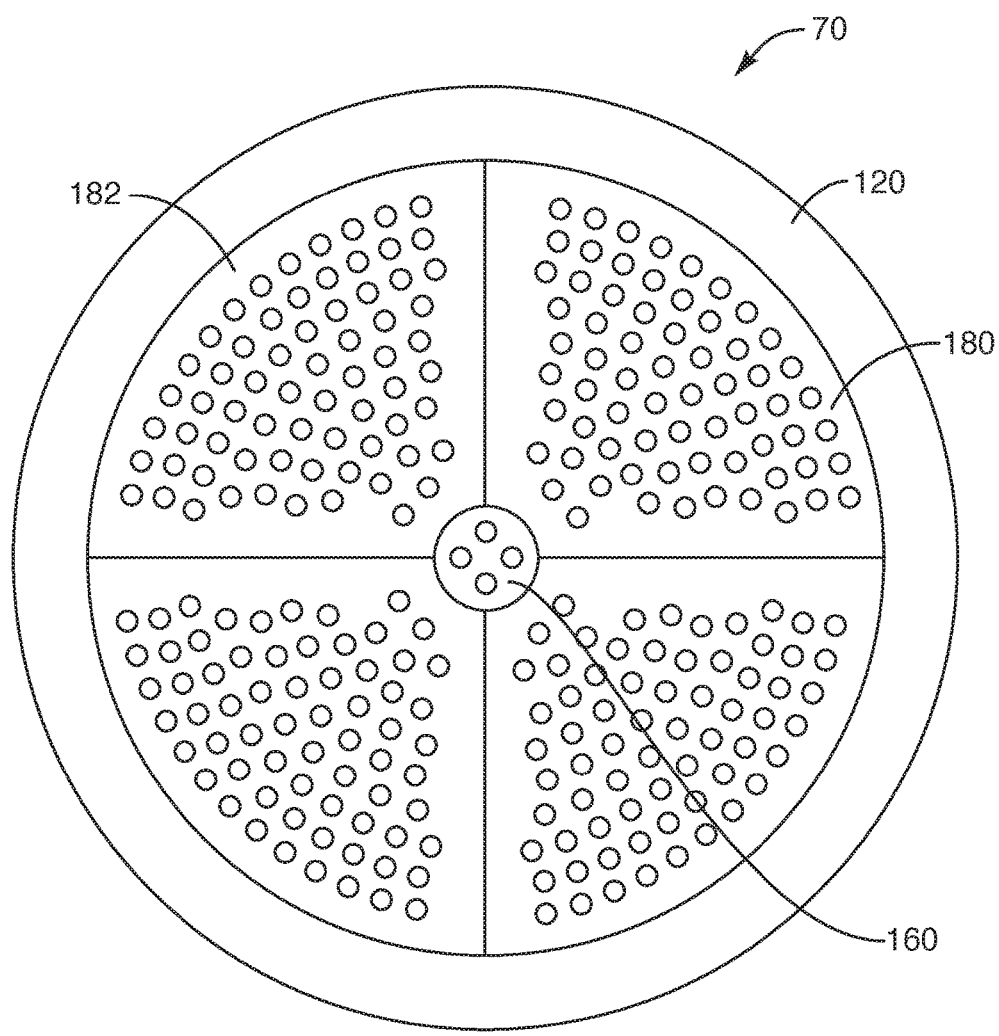
FIG. 4G illustrates a cross-sectional view through the reactor core, the core having multiple fuel wedges and a fuel pin rod in accordance with a representative embodiment.
Figure 4H:
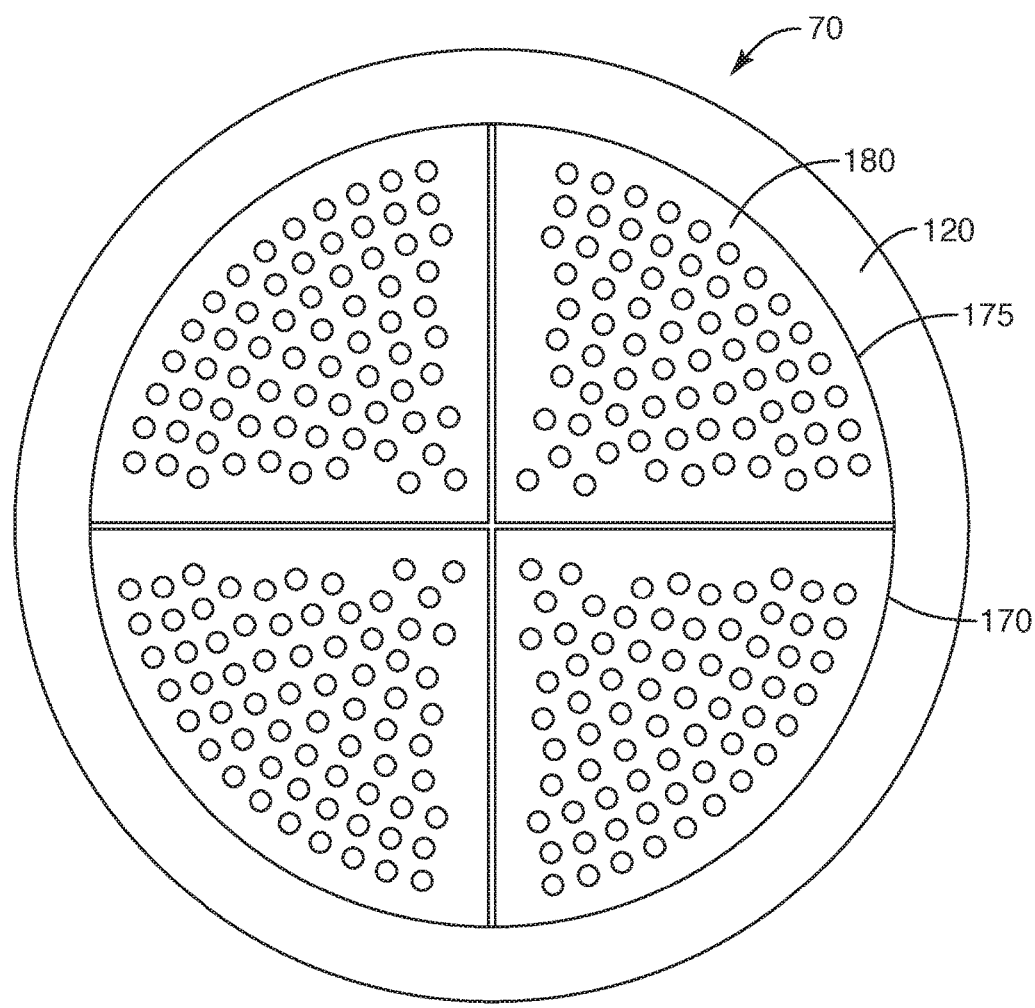
FIG. 4H illustrates a cross-sectional view through the reactor core, the core having multiple fuel wedges in accordance with a representative embodiment.
Figure 4I:
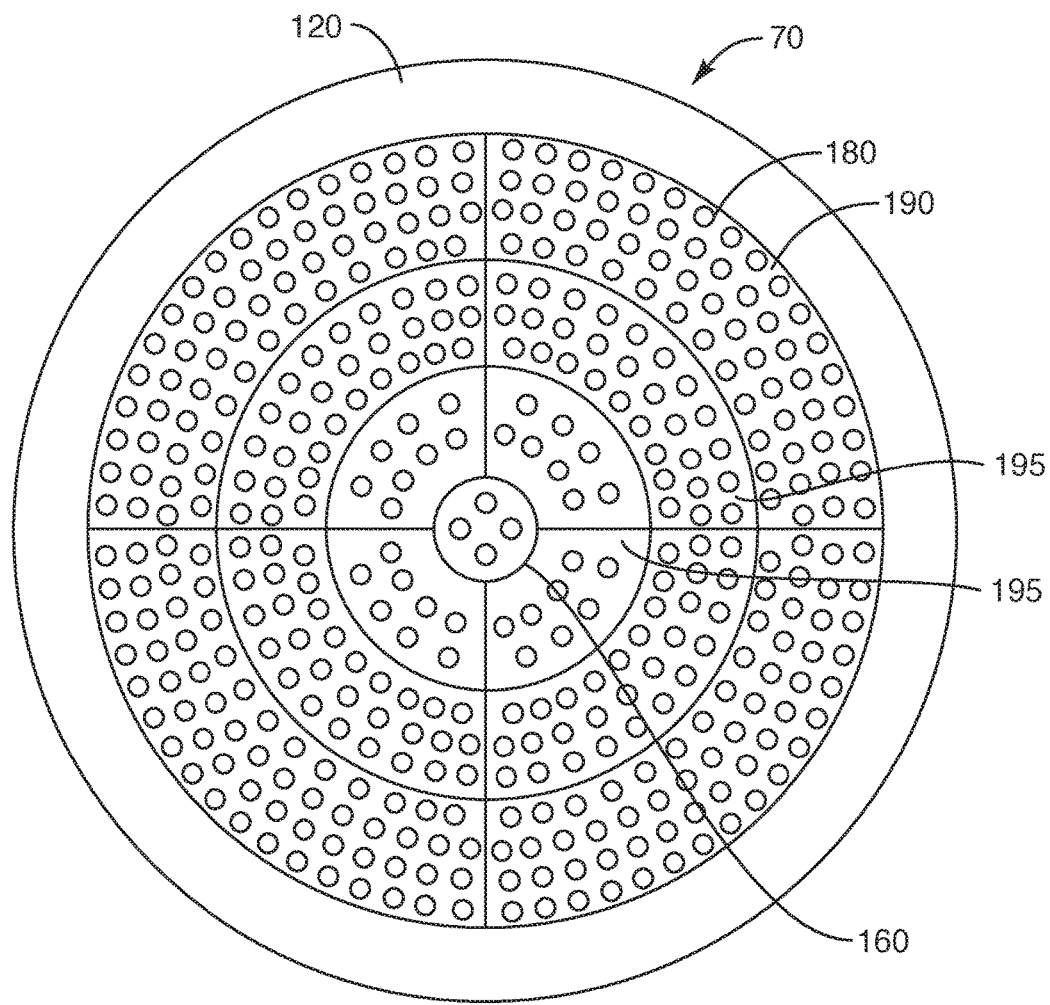
FIG. 4I illustrates a cross-sectional view through the reactor core, the core having multiple arc-shaped fuel wedges and the fuel pin rod in accordance with a representative embodiment.
Figure 4J:
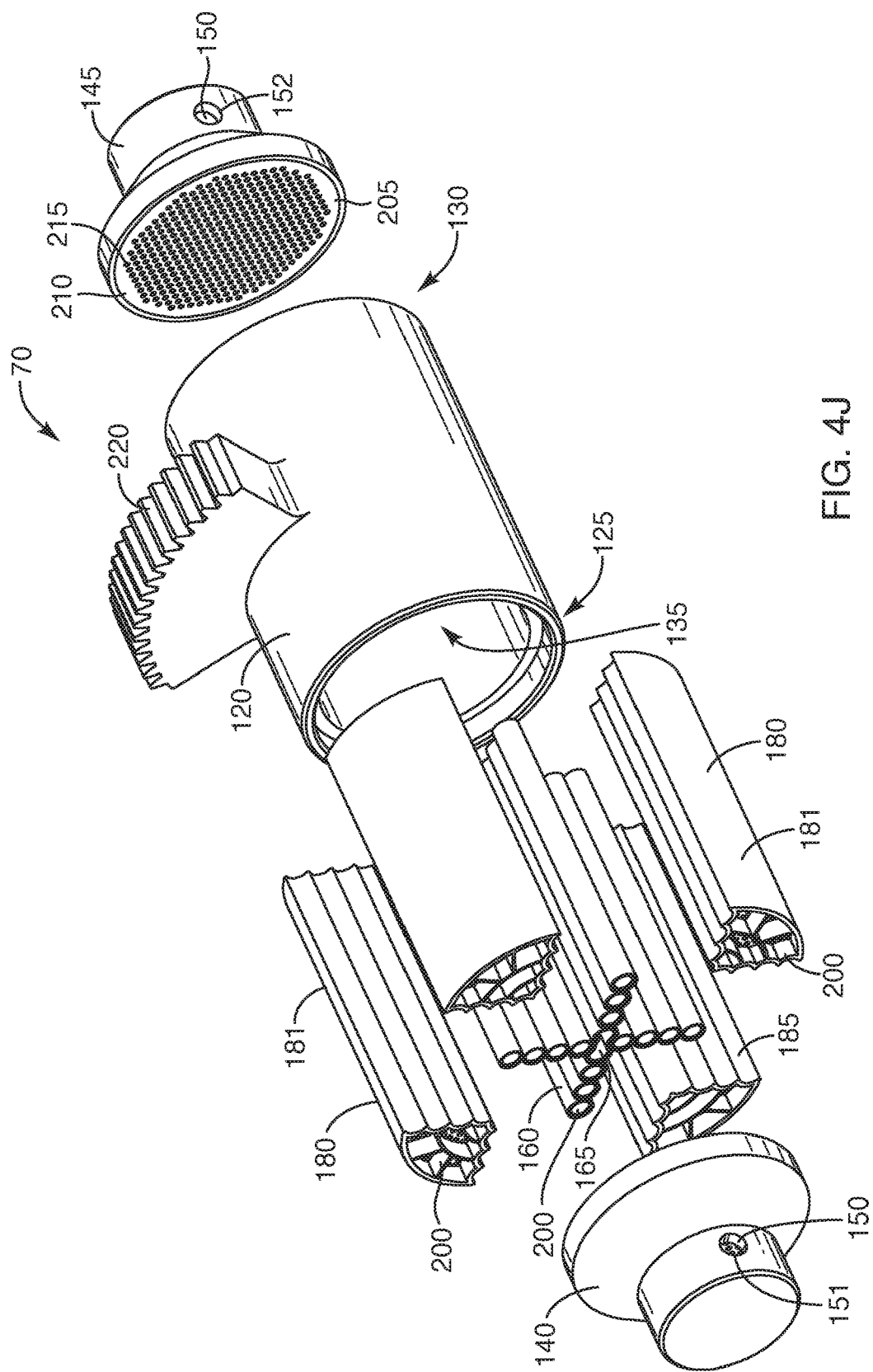
FIG. 4J illustrates a perspective, exploded view of the reactor core in accordance with a representative embodiment.
Figure 4K:
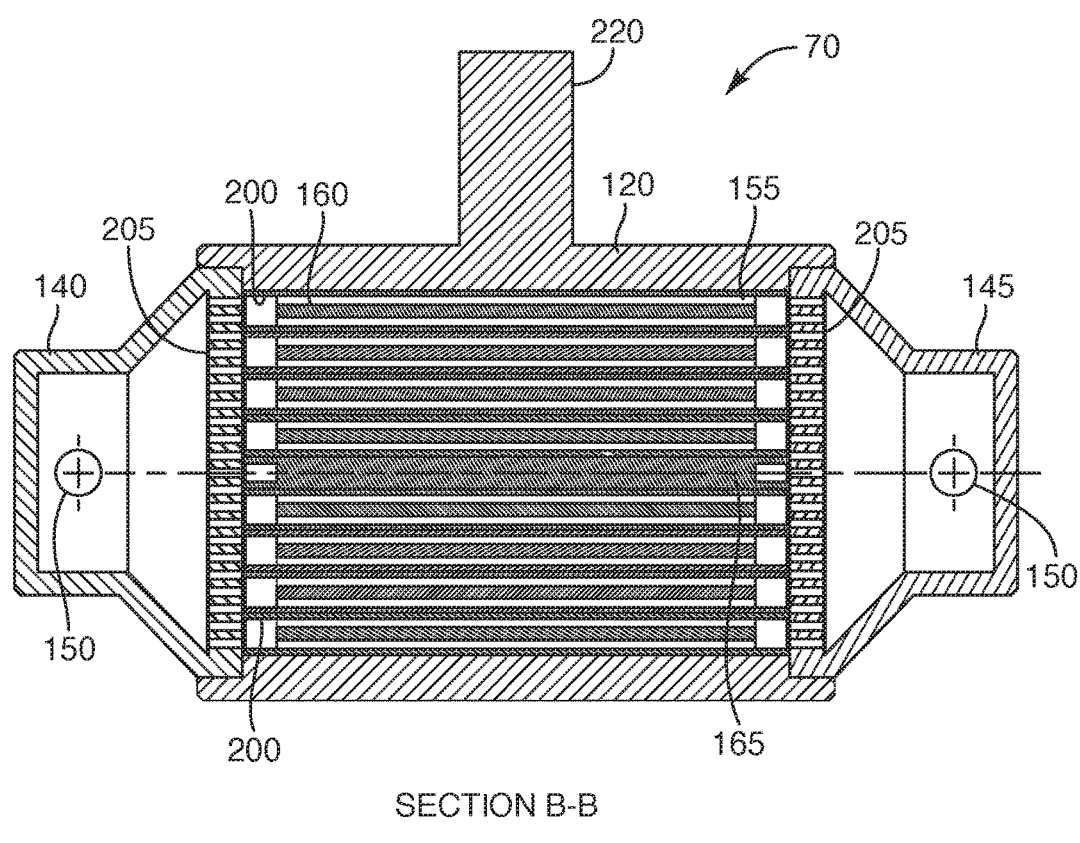
FIG. 4K illustrates a cross-sectional view of the reactor core in accordance with a representative embodiment.
Figure 4L:
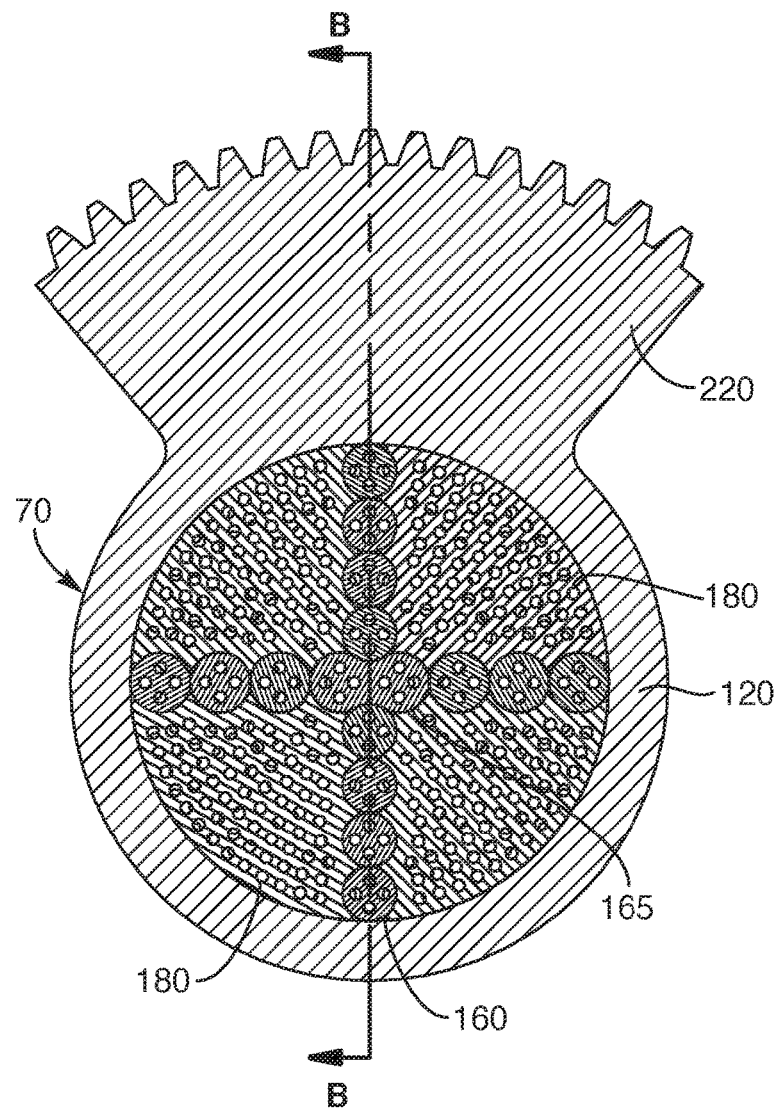
FIG. 4L illustrates a cross-sectional view through a reactor core tube, the fuel pin rods, and the fuel wedges in accordance with a representative embodiment.
Figure 4M:
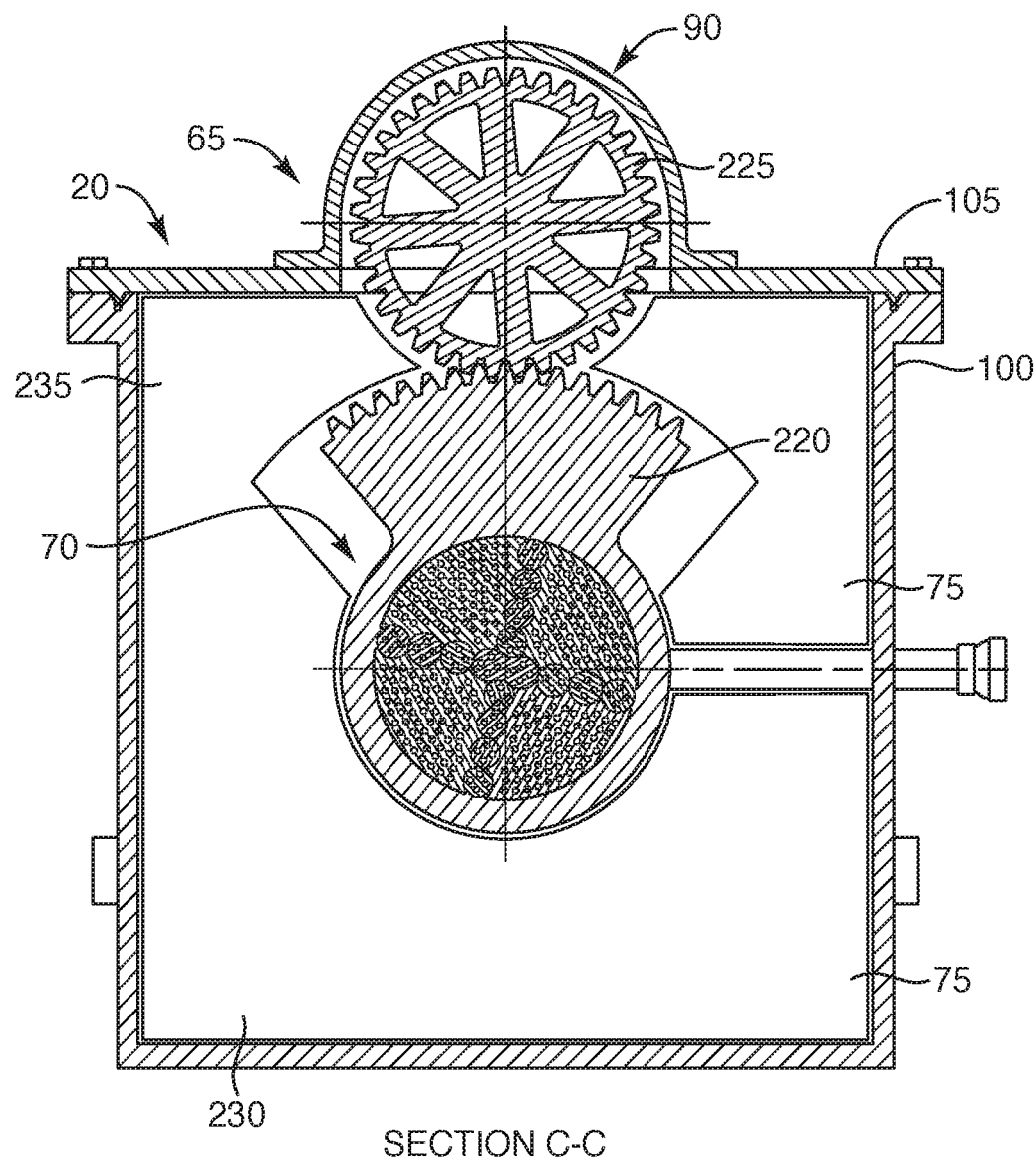
FIG. 4M illustrates a cross-sectional view through the reactor core housing in accordance with a representative embodiment.
Figure 4N:
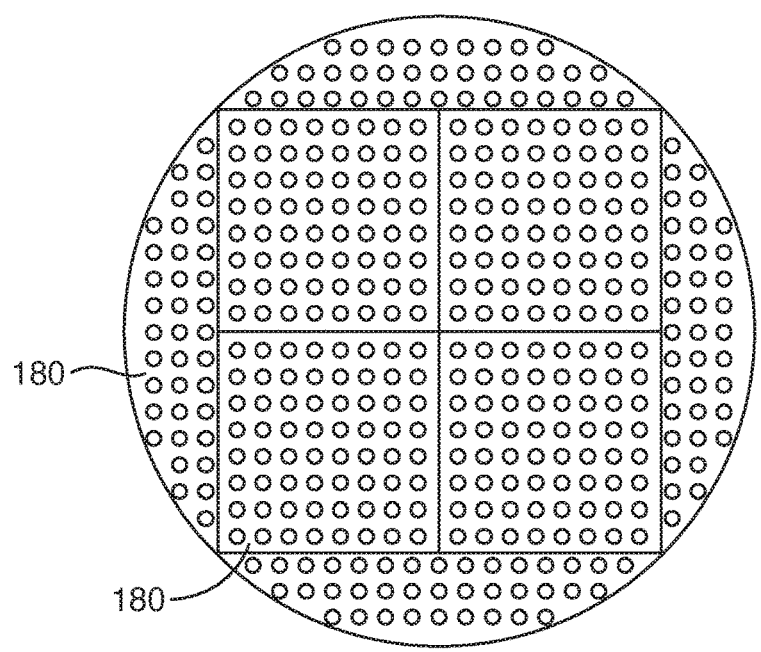
FIGS. 4N-4O each illustrate a cross-sectional view of a different embodiment of fuel wedges for use in some embodiments of the reactor core.
Figure 4O:
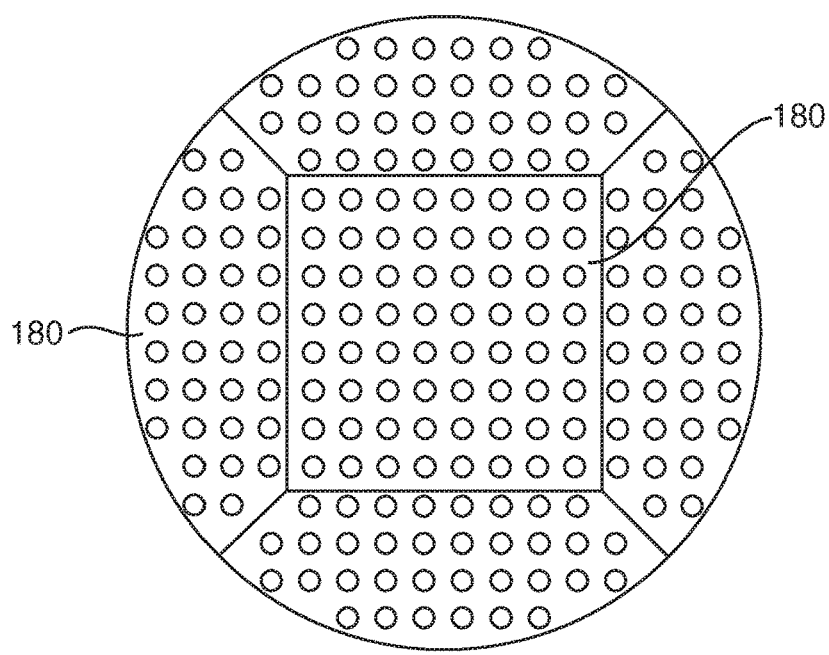
Figure 5A:
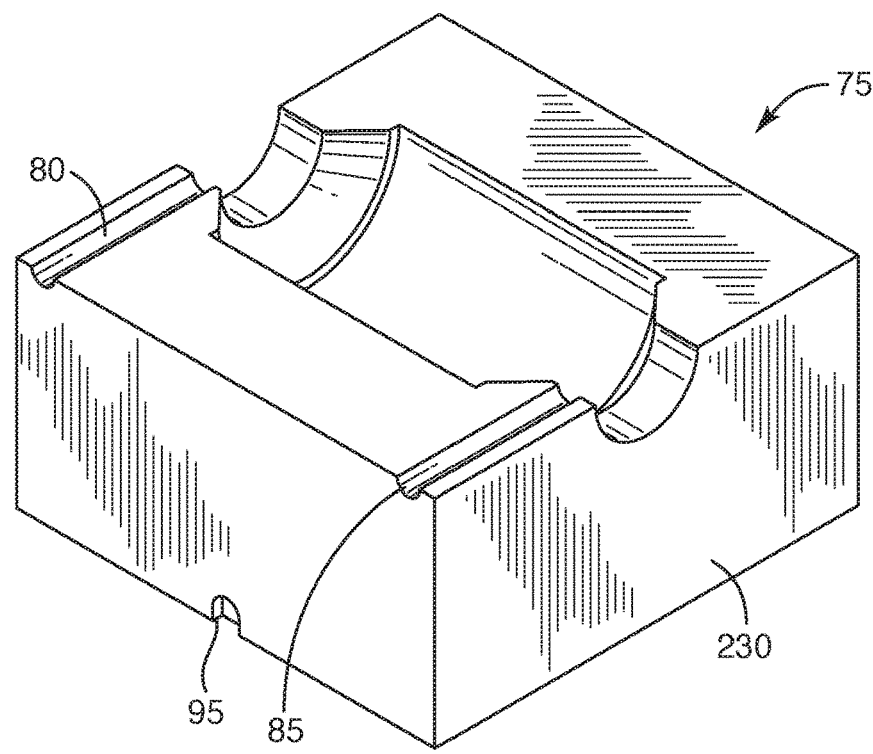
FIG. 5A illustrates a perspective view of a bottom reflector in accordance with a representative embodiment.
Figure 5B:
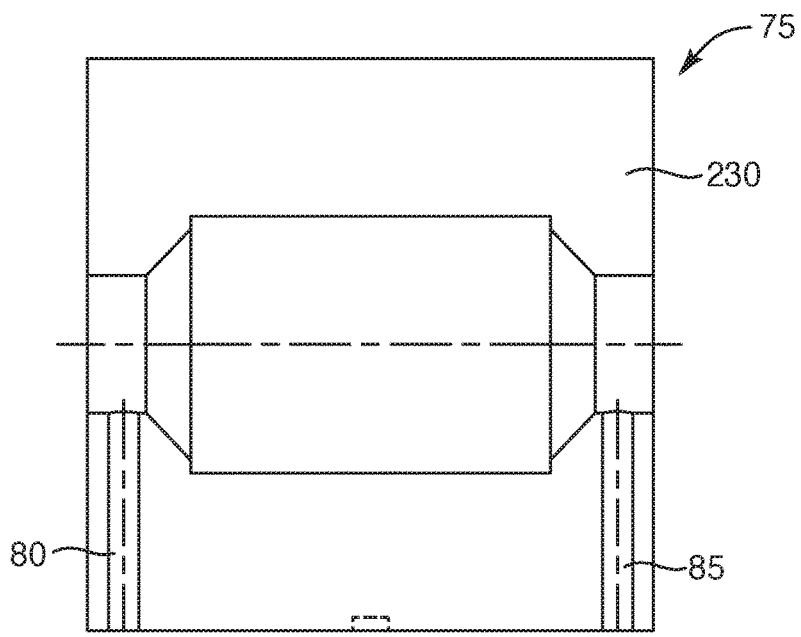
FIG. 5B illustrates a top view of the bottom reflector in accordance with a representative embodiment.
Figure 5C:
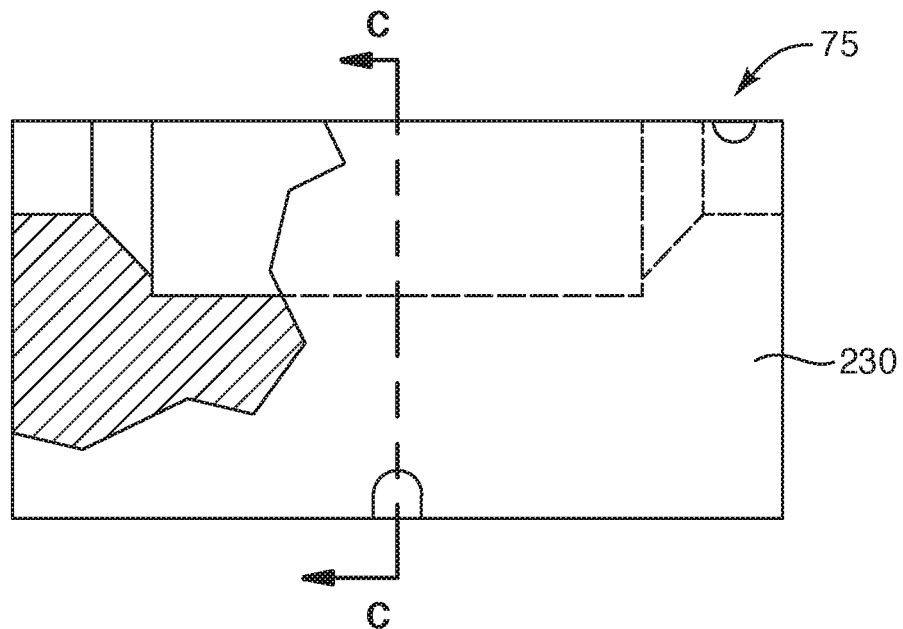
FIG. 5C illustrates a partial break-away view of the bottom reflector in accordance with a representative embodiment.
Figure 5D:
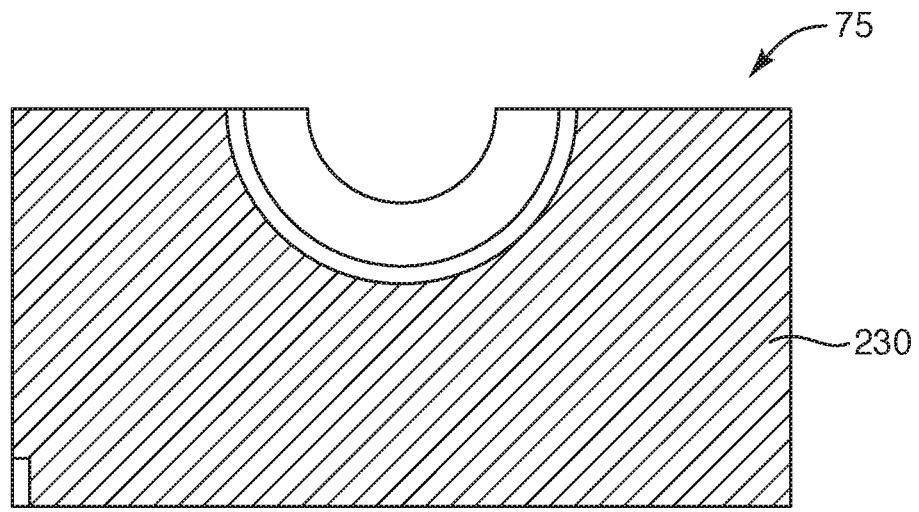
FIG. 5D illustrates a side, cross-sectional view of the bottom reflector in accordance with a representative embodiment.
Figure 6A:
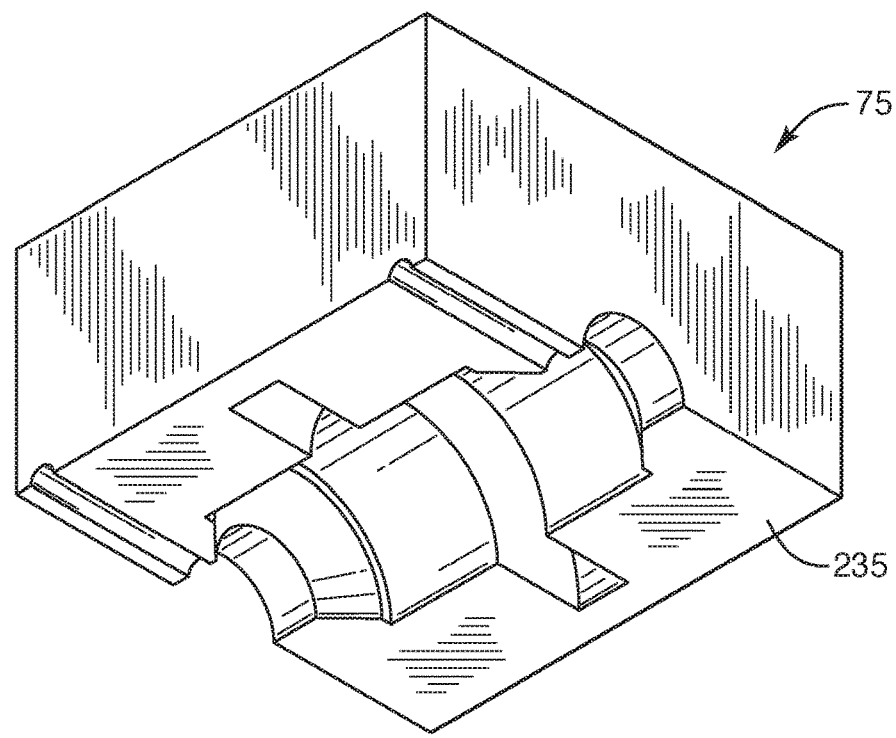
FIG. 6A illustrates a perspective view of a top reflector in accordance with a representative embodiment.
Figure 6B:
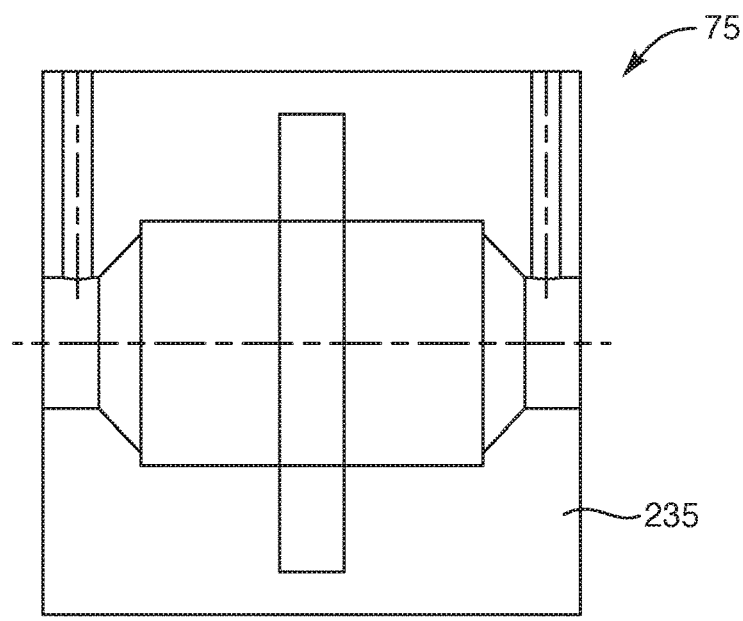
FIG. 6B illustrates a bottom view of the top reflector in accordance with a representative embodiment.
Figure 6C:
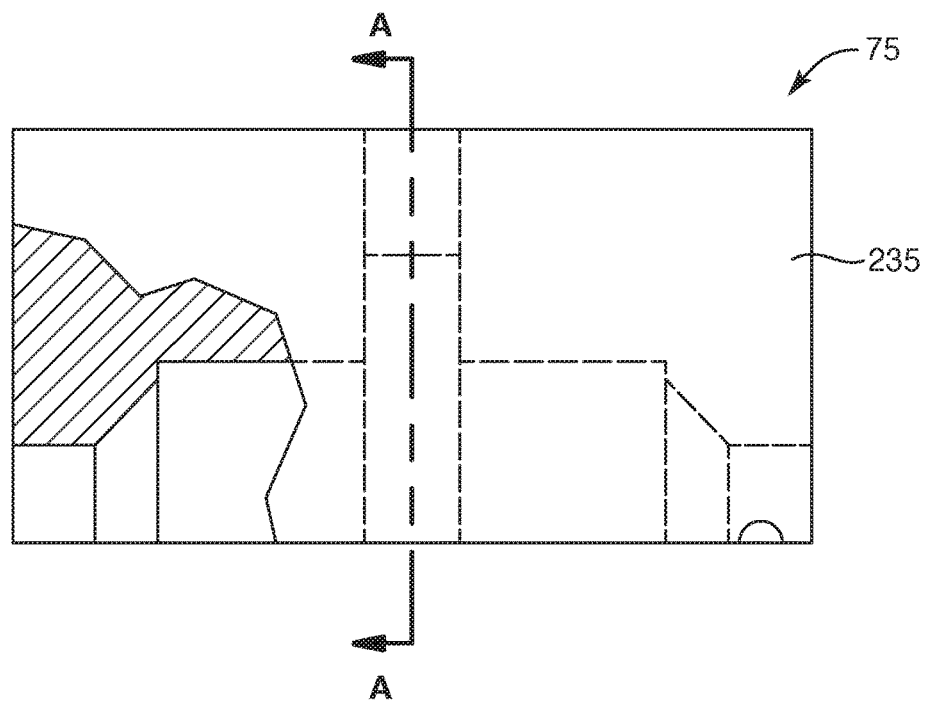
FIG. 6C illustrates a partial break-away view of the top reflector in accordance with a representative embodiment.
Figure 6D:
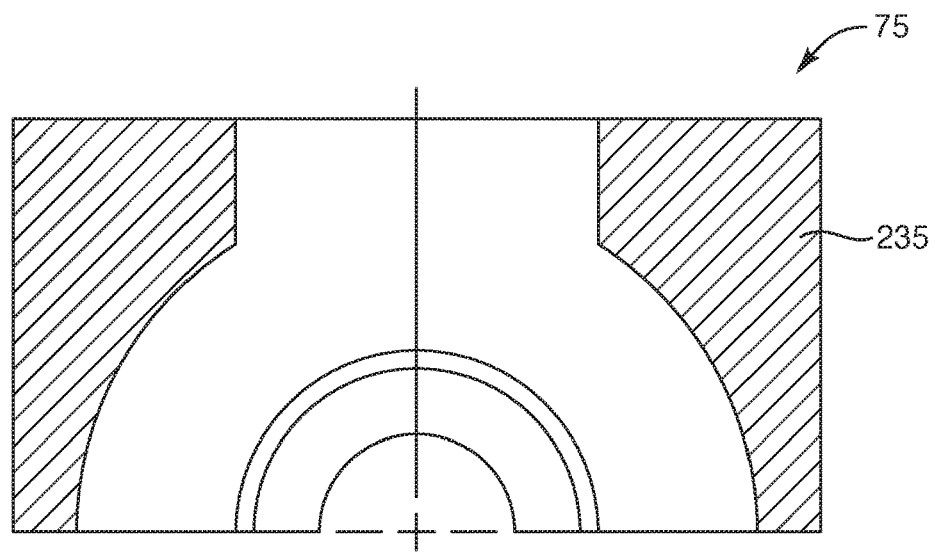
FIG. 6D illustrates a side, cross-sectional view of the top reflector in accordance with a representative embodiment.
Figure 7A:
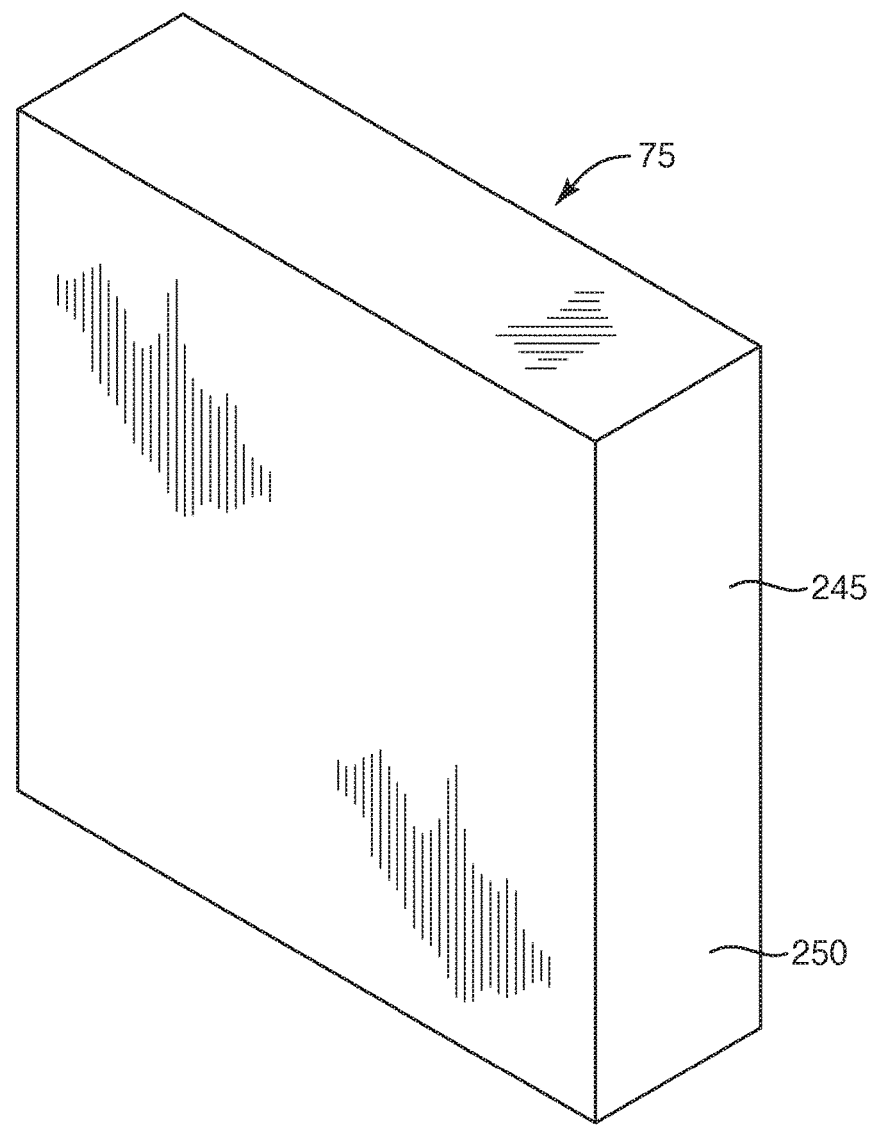
FIG. 7A illustrates a prospective view of a side reflector in accordance with a representative embodiment.
Figure 7B:
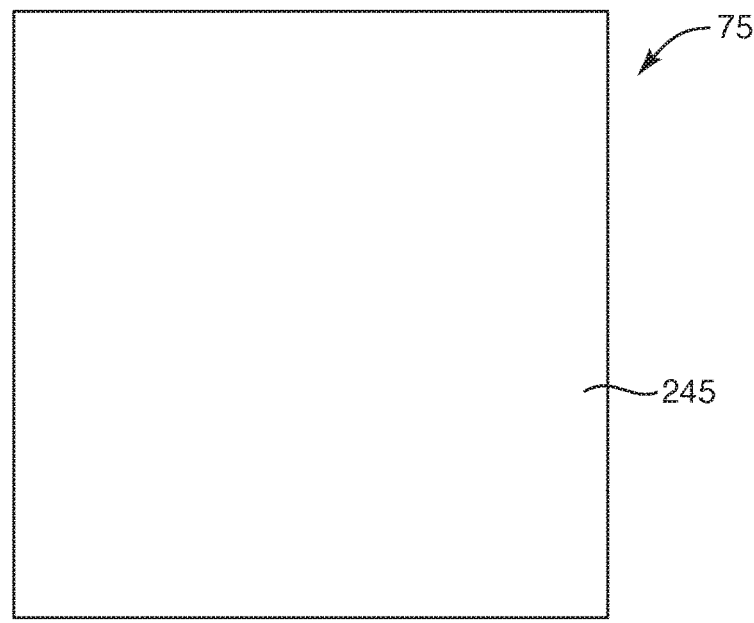
FIG. 7B illustrates a front view of the side reflector in accordance with a representative embodiment.
Figure 7C:
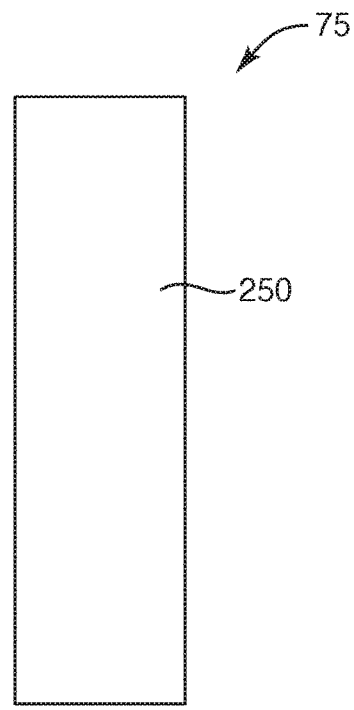
FIG. 7C illustrates a side view of the side reflector in accordance with a representative embodiment.
Figure 8A:
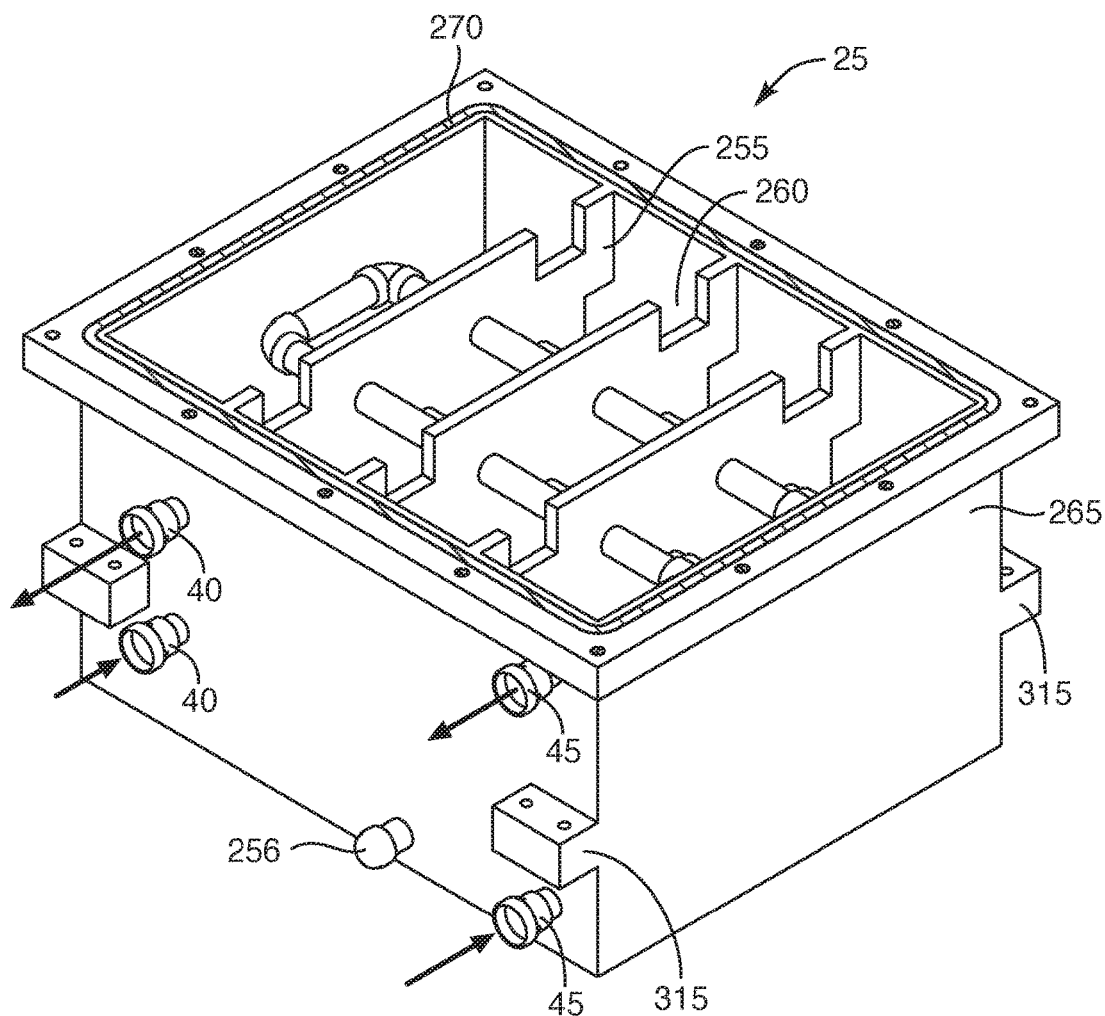
FIG. 8A illustrates a prospective view of a partially-assembled heat exchanger in accordance with a representative embodiment.
Figure 8B:
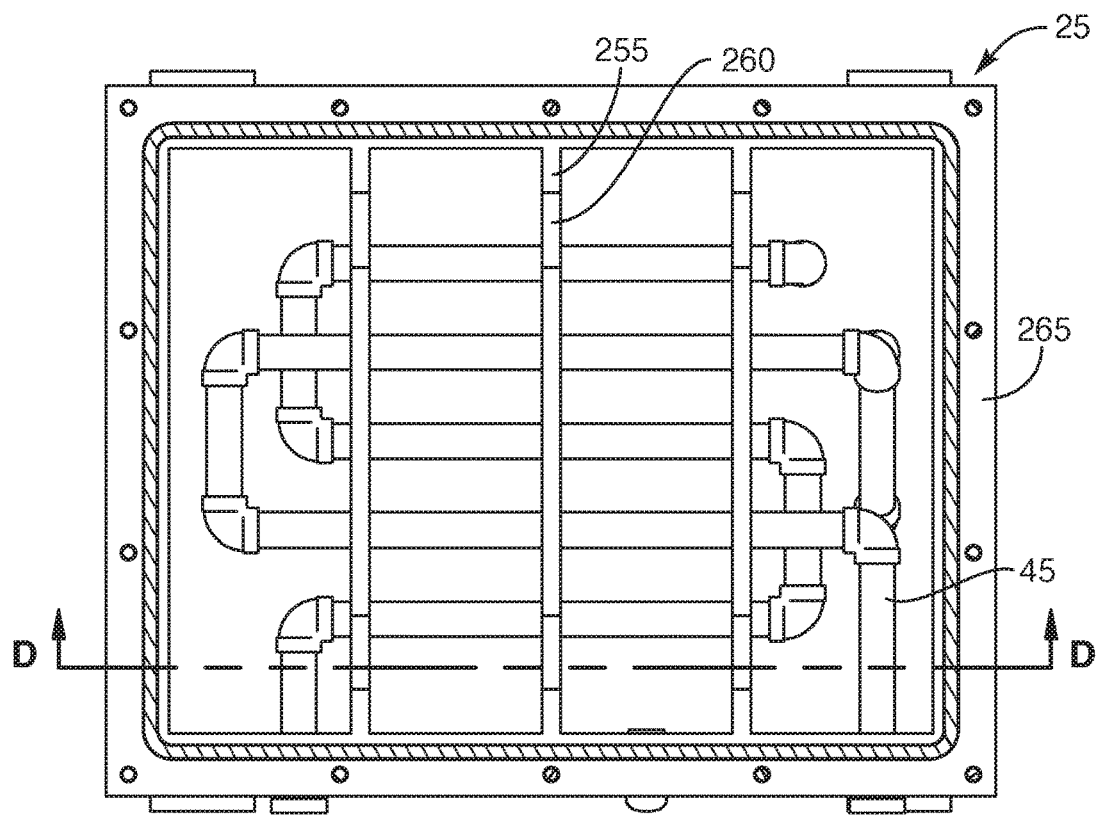
FIG. 8B illustrates a top view of the partially-assembled heat exchanger in accordance with a representative embodiment.
Figure 8C:
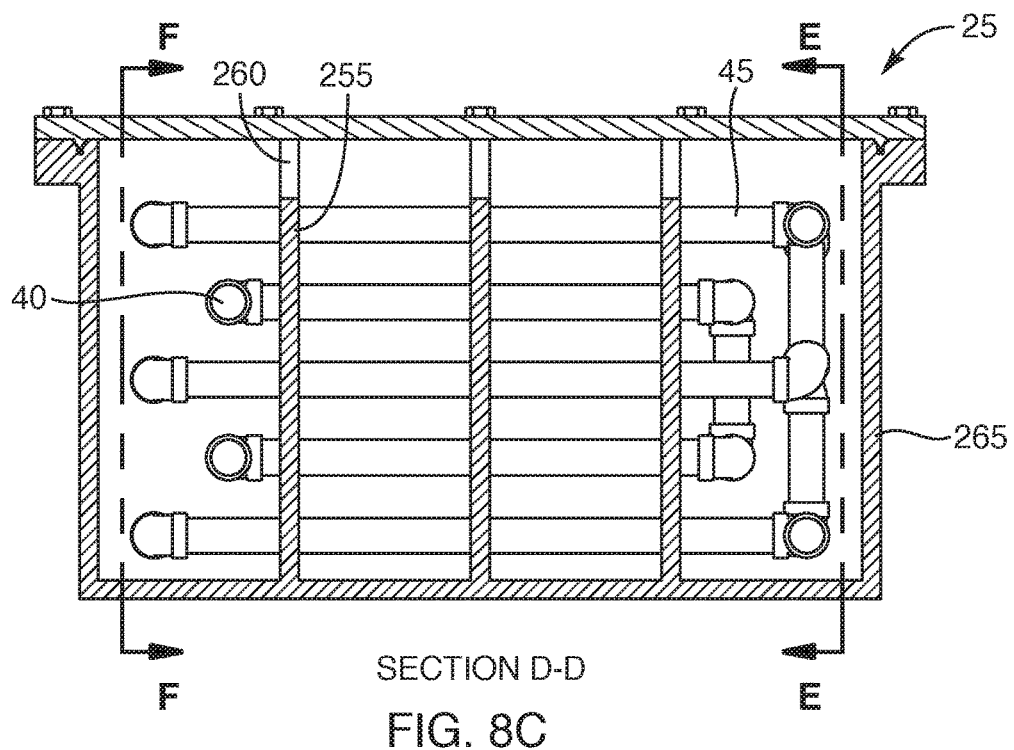
FIG. 8C illustrates a first cross-sectional view of the heat exchanger in accordance with a representative embodiment.
Figure 8D:
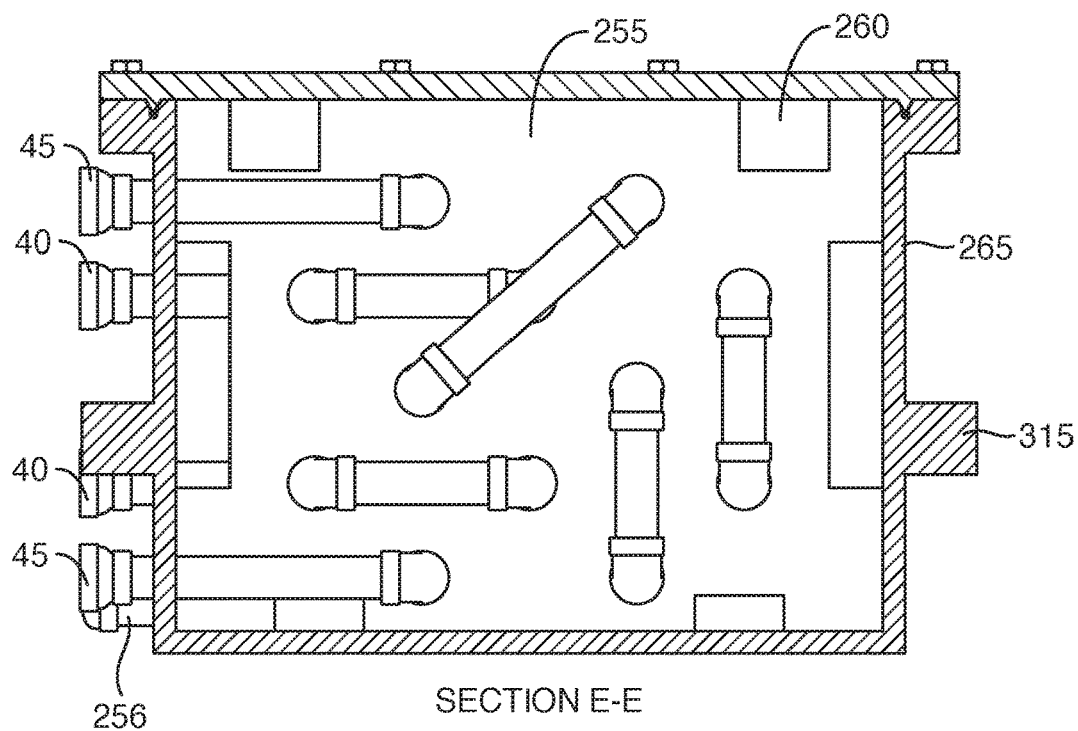
FIG. 8D illustrates a second cross-sectional view of the heat exchanger in accordance with a representative embodiment.
Figure 8E:
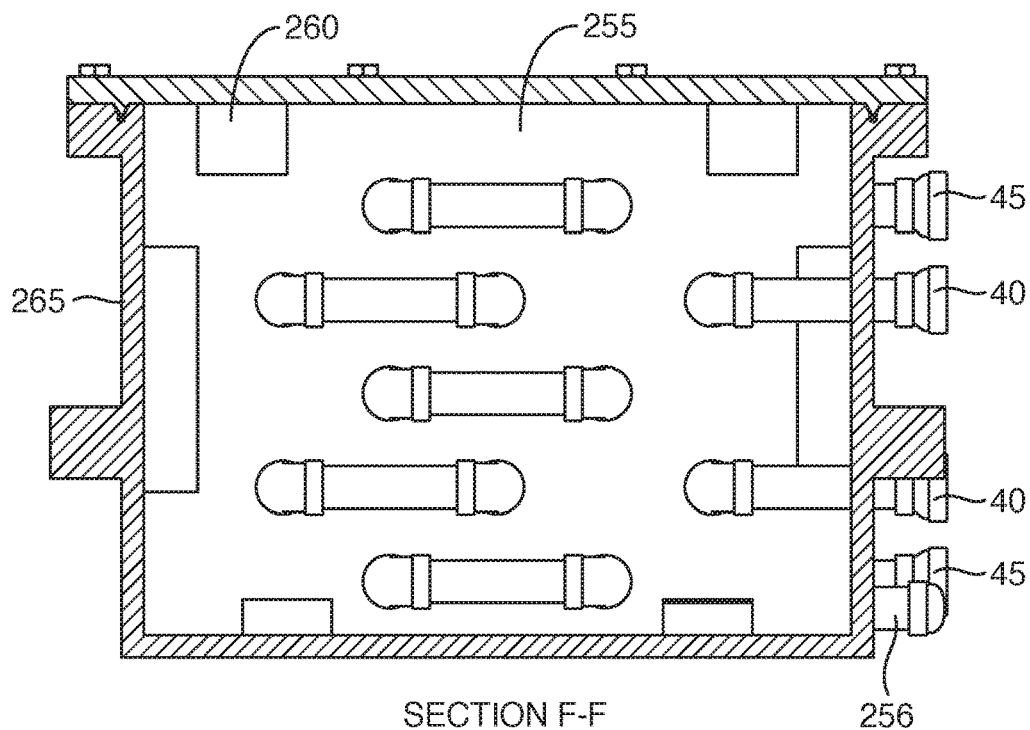
FIG. 8E illustrates a third cross-sectional view of the heat exchanger in accordance with a representative embodiment.

In accordance with some embodiments, however, FIG. 4F (and FIG. 4A) illustrates an embodiment in which the fuel wedges 180 comprise a substantially wedge-shaped prism 181, having a plurality of rounded, angled, and/or other suitable surfaces 185 that are configured to hold one or more pins (e.g., pins 160 and/or 165). FIG. 4G illustrates an embodiment in which the reactor core 70 comprises multiple substantially-sector-shaped wedges 182, having a pin 160 disposed between the wedges. In particular, while the reactor core 70 can comprise any suitable number of wedges (i.e., 1, 2, 3, 4, 5, 6, 7, 8, 9, 10, or more) FIG. 4G shows an embodiment in which the core 70 comprises four wedges 180. Additionally, FIG. 4H illustrates an embodiment in which the wedges 180 are substantially sector-shaped, and wherein there are no pins disposed within the reactor core 70. Furthermore, FIG. 4I illustrates an embodiment in which the reactor core 70 comprises a plurality of arc-shaped prism wedges 190 surrounding a plurality of arc-shaped prism internal moderators 195 and a fuel pin 160. In still other non-limiting examples, FIGS. 4N-4O show that in some embodiments, the fuel wedges 180 are shaped as prisms having the shape of square prisms, as prisms resembling segments of a cylinder, as truncated sector prisms, etc.

Where the reactor core 70 itself, an insert in the core (e.g., the cylindrical insert 156), the pins 160, the wedges 180, and/or one or more other internal moderators each comprise one or more fuel channels 155 that are configured to direct fuel from a first portion (e.g., a first end 125 portion, a first diffuser (as discussed below), and/or a first end cap 140) to a second portion (e.g., a second end 130 portion, a second diffuser (as discussed below), and/or a second end cap 145) of the reactor core 70, the channels can be any suitable size that allows the fuel to flow through the channels. In some embodiments, the holes have an ID that is between about 0.05 cm and about 60 cm, or any ID that falls in such range (e.g., between about 0.5 cm and about 4 cm). Indeed, in some embodiments, the holes in the pins have an ID between about 0.9 cm and about 30.5 cm. In other embodiments, the fuel channels have an ID between about 0.95 cm and about 23 cm. By way of non-limiting illustration, FIG. 4B illustrates an embodiment in which the reactor core 70 defines fuel channels 155 that have an ID of about 0.95 cm (±0.9 cm). FIG. 4B illustrates an embodiment in which the reactor core 70 defines fuel channels 155 of two different sizes, which have an ID of between about 20 cm (±2 cm) and about 12 cm (±2 cm). FIG. 4C, on the other hand, illustrates an embodiment in which the reactor core 70 defines fuel channels 155 having an ID of about 7.6 cm (±2 cm). In still other embodiments, one or more fuel channels in the reactor core have an inner diameter of about 3.8 cm±1 cm.

Although, in some embodiments, the internal moderator or moderators (e.g., the fuel pins 160, fuel wedges 180, cylindrical insert 156, and/or other suitable moderators) are configured to substantially fill the reactor core 70 when the core is cool, in some embodiments, internal moderators are sized so as to be slightly smaller than the internal space 135 of the reactor core tube 120—thus allowing the internal moderators to expand (as they are heated) to substantially fill the internal space without expanding so much that they crack or break the reactor core tube.

While the internal moderators can be any suitable size at standard temperature and pressure (or STP) that allows the reactor 20 to function as intended, in some embodiments, the volume (and/or length) of all of the internal moderators is configured to be between about 0.01% and about 15%, or any subrange thereof, smaller than the internal volume (and/or diameter or length) of the reactor core tube 120 at STP. Indeed, in some embodiments, the internal moderators (as a whole) have a total volume (and/or diameter or length) that is anywhere between about 1% and about 10% (e.g., between about 2.5% and about 5.5%) smaller than the internal volume (and/or diameter or length) of the reactor core tube at STP.

The ends of the internal moderators (e.g., the reactor core 70 itself, the cylindrical insert 156, the fuel pins 160, and/or the fuel wedges 180) can have any suitable shape that allows them to be used in the reactor core 70. Indeed, in some embodiments, the ends of the pins, wedges, inserts, etc. are substantially flat; are rounded; include one or more walls, spacers, seals, protuberances, and/or other standoffs that are configured to space openings to the various fuel channels 155 away from an object (e.g., an end cap 140 or 145, or a diffuser, as discussed below); and/or are otherwise shaped to allow the fuel to enter into one end of, and to exit from an opposite end of, the various moderators. By way of non-limiting illustration, FIGS. 4J-4K illustrate some embodiments in which the pins 160 and 165 and the wedges 180 each comprise one or more standoffs 200 that are configured to space openings for the fuel channels 155 away from an object (e.g., a diffuser 205, the first end cap 140, the second end cap 145, and/or any other suitable object).

Where one or more of the internal moderators (e.g., the fuel pins 160, fuel wedges 180, etc.) comprise one or more standoffs, the standoffs can be any suitable length. Indeed, in some embodiments, the standoffs at a first end or second end of the fuel pins, and/or fuel wedges are, individually, any suitable length between about 0.01 cm and about 20 cm, or any subrange thereof. Indeed, in some embodiments, the standoffs at one or both ends of the pins and/or wedges are, at each end, between about 1 cm and about 5 cm. In still other embodiments, the standoffs at one or both ends of the pins and/or wedges are, individually, between about 2 cm and about 4 cm (e.g., about 3.8 cm±0.5 cm). In still other embodiments, the standoffs are any other suitable length (e.g., based on energy output needs, fuel flow needs, the size of the reactor core 70, and/or any other suitable factor).

With reference now to the diffusers 205, some embodiments of the reactor core 70 optionally comprise one or more baffles, channels, meshes, tubing, blocks, and/or any other suitable diffusers that are capable of distributing fuel from the first end cap 140 into the fuel channels 155 in the pins 160 and/or wedges 180, and/or from the fuel channels in the pins and/or wedges and into the second end cap 145. More particularly, the diffuser can comprise any suitable component (e.g., a manifold connected, fuel lines, holes, flutes, and/or any other suitable characteristic) that allows the diffuser to direct fuel to one or more portions of the reactor core (or internal moderator).

Where the reactor core 70 comprises a diffuser 205, the core can comprise any suitable number of diffusers, including, without limitation, 1, 2, 3, 4, 5, or more diffusers at one or both ends of the core. Indeed, in some embodiments (as illustrated in FIG. 4J), the reactor 20 comprises one diffuser 205 adjacent to the first end cap and another diffuser 205 adjacent to the second end cap 145. In some other embodiments, however (e.g., where the reactor core is used at an incline and/or vertically), the core comprises one or more diffusers at a bottom end of the core (e.g., adjacent to the first end cap) and does not necessarily have a diffuser near the top end of the core (e.g., adjacent to the second end cap).

While the diffusers 205 can have any suitable characteristic that allows them to function as described herein, in accordance with some embodiments, FIG. 4J shows the diffuser 205 comprises a plate 210 with one or more holes 215, with the plate being disposed between the fuel port 150 of the corresponding end cap (e.g., end caps 140 and/or 145) and the pins 160 and/or wedges 180. Additionally, FIG. 4A shows an embodiment in which the diffusers 205 are formed with the end caps (e.g., end caps 140 and/or 145). In accordance with some other embodiments, however (and as shown in FIG. 4J), the diffusers 205 are formed separate from the end caps (e.g., end caps 140 and/or 145) so as to be inserted into one of the end caps, sandwiched between an end cap and a portion of the reactor core 70, and/or to be placed in any other suitable location.

Where the reactor core 70 comprises one or more diffusers 205 defining a plurality of holes (see holes 215 in FIG. 4J), any suitable portion of the diffusers' surface area define holes that are configured to channel fuel. Indeed, in some embodiments, the area of the holes in a face of each diffuser is between about 50% and about 150% (or falls in any suitable subrange thereof) of the area of the fuel channels 155 in a face of the reactor core and/or the internal moderator. Indeed, in some embodiments, the area of the holes in a face of each diffuser is about equal (±10%) to the area of the fuel channels in a face of the reactor core and/or the internal moderator.

Turning now to the fuel inlets 80 and fuel outlets 85, the reactor 20 can comprise any suitable number of fuel inlets and outlets (e.g., 1, 2, 3, 4, 5, 6, or more) that allows fuel to pass (selectively and/or otherwise) through one or more fuel ingress ports 151 (or inlets) at a first end of the reactor (e.g., the first end cap 140) and to then exit through one or more fuel egress ports 152 (or outlets) at a second end of the reactor (e.g., the first end cap 145). In one non-limiting illustration, however, FIG. 2B shows an embodiment in which the reactor 20 comprises one fuel inlet 80 and one fuel outlet 85. Additionally, while the fuel inlets can be any suitable shape (e.g., circular, polygonal, and/or any other suitable shape), in some embodiments, an egress from the fuel inlet and ingress to the fuel outlet substantially correspond with a shape of a corresponding fuel port 150. Indeed, in some embodiments, in which the fuel ports are substantially circular in shape, the egress from the fuel inlet and the ingress to the fuel outlet are also substantially circular in shape.

While the fuel inlets 80 and fuel outlets 85 can be made of any suitable materials (e.g., graphite, one or more nickel alloys, low-chromium nickel-molybdenum alloys (such as HASTELLOY-N™), metals, cements, ceramics, synthetic materials, composites, nano-composites, and/or any other suitable materials), in some embodiments, the fuel inlet and outlet each comprise a low-chromium nickel-molybdenum alloy (e.g., HASTELLOY-N™ materials), with one or more seals (e.g., carbon seals, carbon rope seals, composites, and/or other suitable seals) being disposed between the inlet and outlet and the corresponding end cap (e.g., the first 140 or second 145 end cap) to which they extend. Indeed, in some embodiments, the fuel inlets 80 and outlets 85 comprise a HASTELLOY-N™ material that is lined with graphite.

With reference now to the reactor control mechanism 90, some embodiments of the described system 10 are configured to selectively modify the rate at which fuel flows through the reactor core 120. In this regard, in some cases and within some limits, as fuel is forced through the reactor core 70 at higher and higher rates, the fuel is able to interact with the internal moderators to allow the fuel to reach higher and higher temperatures. Conversely, in some cases and within some limits, as the rate at which fuel flows through the reactor core is slowed, the temperature of the fuel also drops. Indeed, in some embodiments, if the fuel is allowed to stay stagnant in the reactor core for an extended period of time, the fuel will lose its critical state and will (if left long enough) even harden. Thus, by varying the rate at which fuel moves through the reactor core, the described system can vary the amount of heat (and hence the amount of electricity) that the system produces. Moreover, by stopping the flow of fuel through the core, the system can be permanently and/or temporarily shut down (e.g., by allowing the fuel to cool and harden).

The fuel can flow through the reactor core 70 at any suitable rate that allows the reactor core to function as described herein. In this regard, the rate at which the fuel flows through the core can be varied based on the size of the core, the desired amount of heat generated by the reactor core, the amount of fissionable material in the fuel, a desired homogeneous balance, and/or a wide variety of other factors. Indeed, while the fuel can flow through the reactor core at absolutely any suitable rate, in some embodiments, the fuel is configured to flow through the core at a rate between about 0 Liters per min (L/min) and about 45,500 L/min, or within any suitable subrange thereof (e.g., based on the size, function, and/or any other suitable characteristic of the reactor). Indeed in some embodiments, the fuel is pumped (or otherwise caused to flow) through the reactor core at a rate between about 0 L/min and about 15,000 L/min, or within any subrange thereof (e.g., between about 19 L/min and about 150 L/min). By way of non-limiting illustration, in some embodiments in which the reactor core has an outer diameter of about 3 m, with a length of about 4.3 m, and with about 125 fuel channels 155 having an inner diameter between about 1.27 cm and about 6.35 cm (e.g., about 3.81 cm±0.5 cm), the fuel is pumped at (under some desired operating conditions) a rate of between about 18.9 L/min and about 50 189.3 L/min (e.g., between about 37 L/min and about 133 L/min).

Where the described system 10 comprises one or more mechanisms for varying the rate at which fuel flows through the reactor core 70, the reactor control mechanisms 90 can comprise any suitable component or mechanism that is capable of performing such a function. In this regard, some non-limiting examples of suitable reactor control mechanisms include one or more variable frequency fuel pumps, fuel pumps, valves, mechanisms in which the reactor core is rotatable so as to move the fuel ports 150 and the corresponding fuel inlet 80 and outlet 85 into and out of alignment with each other, mechanisms that are capable of changing an angle of the reactor core (e.g., to have gravity affect the flow), and/or any other suitable mechanism. Indeed, in at least some embodiments, one or more pumps 22 (as shown in FIG. 1A, see also FIG. 3C) are configured to control (e.g., increase, decrease, stop, maintain substantially constant, vary, and/or otherwise control) the rate at which the fuel flows through the reactor 20. In still other embodiments, in addition to, or in place of, such pumps, the reactor core is configured to be rotated to increase and/or decrease the rate at which fuel passes through the reactor 20.

Where the reactor core 70 is configured to rotate to vary the rate at which fuel passes through the reactor 20, the reactor core can be rotated in any suitable manner that allows a passage between the fuel inlet 80 and/or outlet 85 and a corresponding fuel port 150 (e.g., in the first 140 and/or second 145 end cap) to become more and/or less occluded as the reactor core rotates (e.g., as one opening is rotated into and/or out of alignment with the other). Indeed, in some embodiments, the reactor core is configured to be rotated manually and/or automatically (e.g., via one or more computer systems) via the reactor control mechanism 90, which comprises one or more motors, servos, actuators, gear drives, worm drives, kelley drives, and/or other suitable mechanisms. In this regard, FIGS. 2A, 4L, and 4M show some embodiments in which the reactor core 70 is coupled with a partial gear 220 (or a sector gear) that is intermeshed with a second gear 225 that is sealed within the housing 65 and that comprises a pinion, gear, and/or other contact surface 230 (e.g., a hex head, a head with splines, and/or any other suitable surface that can be engaged by a wrench, pry bar, motor, servo, pneumatic driver, kelley shaft, drill, and/or other suitable tool that can be used to turn the contact surface), which can be used to turn the second gear to rotate the reactor core, to thereby vary the rate at which fuel is moved through the reactor and, hence, the amount of energy that is produced by the system 10. Accordingly, in some embodiments, a user can use a wrench or other turning tool to rotate the contact surface 230 and hence the reactor core. Thus, even if one or more pumps go down and/or power is lost, in some embodiments, a user can manually rotate the reactor core to slow and/or stop fuel flowing though the reactor (e.g., by moving the fuel port 150 (e.g., in the first 140 and/or second 145 end cap) out of alignment with the corresponding inlet 80 and/or outlet 85.

Additionally, FIGS. 4M and 6A-6D show that in some embodiments, at least one reflector 75 (e.g., the second reflector 240, as discussed below) is optionally configured to allow the partial gear 220 and, hence, the reactor core 70 to rotate clockwise and counterclockwise. While this ability to rotate the reactor core in two directions may serve many purposes, in some embodiments, it allows the reactor core to move back and forth to break any fuel that has solidified and become crusted between the core and a reflector.

Where the reactor core 70 is configured to rotate to vary the rate at which fuel flows through the reactor 20, the core can be rotated by any suitable amount that allows the fuel inlet 80 and/or outlet 85 and a corresponding fuel port 150 (e.g., in the first 140 and/or second 145 end cap) to be aligned to allow for a maximum flow of fuel through the reactor and to be shifted with respect to each other (e.g., as the core rotates) such that fuel ports are moved out of alignment with the corresponding inlet and/or outlet to reduce the size of the aperture through which the fuel can enter or exit the core. Indeed, in some embodiments, the reactor core is configured to rotate (clockwise and/or counter clockwise) between about 0.2 degrees and about 180 degrees, or within any subrange thereof. Indeed, in some embodiments, the reactor core can move the fuel ports from being in maximum alignment with the corresponding inlet and/or outlet to having the inlet and/or outlet be completely out of alignment with the corresponding fuel port (e.g., to stop fuel from entering and/or exiting the core) when the core is rotated by about 25 degrees or less (less than about 20 degrees). In some embodiments, however, the core is configured to rotate less than 20 degrees (e.g., to stop and/or otherwise vary the flow of the fuel through the cell) in either the clockwise and/or the counter clockwise direction.

Turning now to the reflectors 75, some embodiments of the described reactor 20 comprise one or more reflectors that are configured to reflect neutrons and/or gamma rays released from the fuel as the fuel moves through the reactor core 70. As a result, the reflectors may help the reactor bring and/or maintain the fuel at a critical state, while (in some embodiments) preventing radiation from escaping from the reactor 20 and harming individuals in proximity to the reactor. In this regard, the reflectors can comprise any suitable characteristic that allows them to function as intended.

In one example of a suitable characteristic of the reflectors 75, the reflectors can be any suitable thickness that allows them to function as described herein. Indeed, in at least some embodiments, the reflectors ensure that an outer surface of the reactor core tube 120 and/or either of the end caps 140 or 145 is separated from an internal wall of the housing 65 by between about 2 cm and about 10 m (or any subrange thereof) by a suitable material (e.g., graphite and/or any other suitable material, as discussed below). Indeed, in some embodiments, the reflectors ensure that an outer surface of the reactor core tube 120 and/or either of the end caps 140 or 145 is separated from an internal wall of the housing 65 by between about 20 cm and about 6 m (e.g., about 40 cm±10 cm) of reflector material. More specifically, in some embodiments, the reflectors ensure that an outer surface of the reactor core tube and/or either of the end caps are separated from an internal wall of the housing by at least about 30 cm.

As another example of a suitable characteristic of the reflectors 75, although some embodiments of the reactor core 70 are permanently enveloped in a reflector, in other embodiments, the reactor core is surrounded in the reactor housing 65 by one or more reflectors (and/or sections of reflectors) that are configured to be selectively removed and/or replaced. As a result, in some embodiments, if the reactor core, an internal moderator, a reflector, and/or another portion of the reactor 20 breaks, cracks, ages, and/or otherwise becomes damaged, one or more reflectors can be removed such that the damaged portion of the reactor can be removed, accessed, repaired, and/or replaced. In this regard, while the reflectors can be assembled in any suitable manner that allows them to surround the reactor core, FIGS. 4M, 5A-7C, and FIGS. 2A-2B show that, in some embodiments, the reflectors 75 comprise a first 235 and second 240 reflector that are configured to fit together to encase the reactor core 70 (e.g., as a clam shell), with a third 245 and fourth 250 reflector that each flank the first end cap 140 and the second end cap 145. Accordingly, in such embodiments, one or more reflectors can be removed and/or replaced relatively easily.

The various components of the reactor core 70 (including, without limitation, the reactor core itself, the reactor core tube 120, the first 140 and second 145 end caps, the cylindrical insert 156, the fuel pins 160, the fuel wedges 180, the diffusers 205, the reflectors 75, the partial gear 220, alignment pins (as discussed below), and/or any other suitable portion of the reactor core) can be made of any suitable material. Some non-limiting examples of such materials include, but are not limited to, graphite (e.g., substantially pure graphite having a purity level of about 99% or greater (such as a graphite purity of at least about 99.9%), a boron-free graphite, a pyrolytic graphite, a CGB grade graphite, and/or any other suitable graphite) and/or any other suitable material. Indeed, in some embodiments, the reactor core, the reactor core tube, the end caps, the cylindrical insert, the fuel pins, the fuel wedges, the diffusers, the reflectors, the alignment pins, and/or the partial gear each comprise 99.9% pure, boron-free graphite. In some other embodiments, one or more portions of the reactor core comprise one or more other metals, cements, ceramics, graphite spheres, and/or other suitable materials. For instance, some embodiments of the partial gear comprise a metal (e.g., a HASTELLOY-N™ alloy) that is placed on and/or used to form teeth on the gear.

Turning now to the drains 95, some embodiments of the reactor 20 optionally comprise one or more drains that are configured to drain (e.g., into a suitable holding tank) fuel: that seeps from the reactor core 70, that is released when (or if) the reactor core cracks and/or breaks, that can be drained to cool the reactor if the reactor starts to overheat, and/or that is otherwise desirable to drain from the reactor. While such drains can comprise any suitable component that allows them to function as intended, in some embodiments, the drains comprise one or more ball valves, butterfly valves, gate valves, diaphragm valves, and/or other suitable valves comprising one or more suitable ceramic materials, metals, alloys, composites, and/or other suitable materials. Indeed, in some embodiments, the drain 95 (as shown in FIGS. 1B-2B) comprises a ceramic ball valve.

With reference now to the heat exchanger 25, in some embodiments of the described system 10, fuel that is brought to the critical state in the reactor core 70 is optionally pumped (or otherwise moved) through the first fluid line 40 (which can be any suitable size and length), from the reactor 20, through the heat exchanger 25, and then back into the reactor for reheating. In some such embodiments, the heat exchanger is optionally configured in such a manner that heat from fuel in the first fluid line is passed to a heat transfer medium running through the second fluid line (which can also be any suitable size and length). Accordingly, the described system can heat the heat transfer medium without ever contaminating it with radioactive materials from the fuel.

While the transfer of heat from the first line 40 to the second line 45 can be done in any suitable manner and via any suitable known or novel heat transfer device (or heat exchanger), in some embodiments, the first fluid line is disposed in proximity to the second fluid line (e.g., as shown in FIGS. 8A-8E). Additionally, in some embodiments, in order to better pass heat from the first fluid line to the second fluid line, both lines are at least partially submerged in and/or are otherwise surrounded by the heat transfer medium. Moreover, while the first and second fluid lines can run through the heat exchanger 25 in any suitable manner (by having one run in a top portion of the heat exchanger while the other line runs in the bottom portion, by having portions of the lines disposed in close proximity to each other, etc.), in some embodiments, a portion of the first fluid line is configured to be disposed in a bottom portion of the heat exchanger while a portion of the second fluid line is configured to be disposed in an upper portion of the heat exchanger.

With regards to the heat transfer medium, the heat transfer medium can comprise any suitable material or materials that allow it to safely absorb heat from the first fluid line 40 and, in some embodiments, to flow through the second fluid line 45. Some non-limiting examples of suitable heat transfer mediums include one or more salts that are free from fissionable materials, water, coolants, graphite gels, and/or other suitable materials. Indeed, in some embodiments, the heat transfer medium comprises one or more salts, which may include, but are not limited to, potassium nitrate; sodium nitrate; lithium fluoride; beryllium fluoride; a mixture of lithium fluoride and beryllium fluoride; a metal salt mixture of lithium fluoride, sodium fluoride, and/or potassium fluoride; a thermal graphite gel; and/or any other suitable salt or salts. Indeed, in some embodiments, the heat transfer medium comprises potassium nitrate and/or sodium nitrate. In some other embodiments, the carrier medium comprises potassium fluoride, sodium fluoride, and/or a graphite gel.

Where the heat transfer medium comprises more than one ingredient, the various ingredients can be present at any suitable concentration in the fuel. Indeed, in some embodiments, at least two of the components of the heat transfer medium are respectively used at a molar ratio between about 100:1 and 1:100, or at any suitable subrange thereof. In this regard, in some embodiments, the carrier medium respectively comprises potassium nitrate and sodium nitrate at a molar ratio between about 6:1 and about 0.5:1 (e.g., at a ratio of about 1.5:1). In other embodiments, however, the carrier medium comprises potassium nitrate and sodium nitrate at any molar ratio that is suitable for a desired energy output, thermal fluid, system, and/or other suitable factor.

The first 40 and second 45 fluid lines can be made of any suitable materials (e.g., one or more nickel alloys, low-chromium nickel-molybdenum alloys (such as a HASTELLOY-N™ material), metals, cements, ceramics, synthetic materials, composites, nano-metal composites, and/or any other suitable materials) that allow the lines to function as intended. In some embodiments, however, the lines each comprise a low-chromium nickel-molybdenum alloy.

In addition to the aforementioned characteristics, the heat exchanger 25 can comprise any other suitable component, including, without limitation, a housing (e.g., a housing comprising one or more of the materials and components similar to those discussed above with respect to the reactor 20), one or more drains (e.g., drains comprising one or more of the materials and characteristics similar to those discussed above with respect to the drain 95), one or more baffles and/or supports, mixers (e.g., as discussed above with respect to the heater 15), pumps, seals (e.g., as discussed above with respect to the reactor), and/or other suitable components. By way of non-limiting illustration, FIGS. 8A-8E show some embodiments in which the heat exchanger 25 comprises one or more supports 255 with openings 260, drain 256, housings 265, and seals 270.

With reference now to the steam generator 30, in some optional embodiments, once the fuel (which has been brought to a critical state by passing through the reactor core 70) heats the heat transfer medium in the second fluid line 45 of the heat exchanger 25, the heated heat transfer medium is circulated (e.g., via one or more pumps or otherwise) in the second line from the heat exchanger to the steam generator (and/or any other suitable device that is capable of using heat from the reactor 20 to expand a media such as air, gas, water, etc.), and then back to the heat exchanger. In some such embodiments, the second line (and/or an object heated thereby) is brought into contact and/or close proximity with water (and/or another suitable medium), such that heat from the heat transfer medium in the second line is able to convert the water to steam, which can then be used to turn a turbine connected to an electric generator 35 (which may include any suitable turbine and/or generator).

In addition to the aforementioned components, the steam generator 30 can comprise any other suitable component that allows it to function as intended. Indeed, in some embodiments, the steam generator comprises a housing (e.g., a housing comprising one or more of the materials and components similar to those discussed above with respect to the reactor 20), one or more drains (e.g., drains comprising one or more of the materials and characteristics similar to those discussed above with respect to the emergency drain 95), one or more baffles and/or supports, mixers (e.g., as discussed above with respect to the heater 15), pumps, seals (e.g., as discussed above with respect to the reactor), water inlets, steam outlets, and/or other suitable components. By way of non-limiting illustration, FIGS. 9A-9E show some embodiments in which the steam generator 30 comprises one or more supports 280 with openings 285, drain 290, housings 295, seals 300, water inlets 305, and steam outlets 310.

The various portions of the described system 10 can be made in any suitable manner. In this regard, some non-limiting examples of methods for making the described reactor core 70 include boring, machining, etching, cutting, drilling, grinding, shaping, plaining, molding, extruding, sanding, lathing, smoothing, buffing, polishing, and/or otherwise forming various pieces of graphite (and/or another suitable material) to form one or more pieces of the reactor core (e.g., the reactor core tube 120, end caps 140 and 145, fuel pins 160, fuel wedges 180, diffusers 205, reflectors 75, alignment pins (as discussed below), and/or any other suitable parts). Furthermore, the other portions of the described system can be formed in any suitable manner, including, without limitation, via cutting; bending; tapping; dying; sanding; plaining; shaping; molding; extruding; drilling; grinding; buffing; polishing; connecting various pieces with one or more adhesives, mechanical fasteners (e.g., nails, clamps, rivets, staples, clips, pegs, crimps, pins, brads, threads, brackets, etc.), welds, and/or by melting pieces together; and/or any other suitable method that allows the described system to perform its intended functions.

The described system 10 and its various components can also be used in any suitable manner. Indeed, as previously described, in some embodiments a molten salt fuel source is added to the reactor core 70 where it is allowed to go and/or remain at a critical state before flowing into the heat exchanger 25 and then being recycled into the reactor core. In some embodiments, however, the described system comprises one or more sensors and/or other indicators that allow a user and/or computer system to monitor and/or control (e.g., automatically and/or manually) the reactor. Indeed, in some embodiments, the described system is configured to automatically and/or manually (e.g., based on sensor readings, programming, environmental conditions, emergency conditions, satellite control, and/or any other suitable factor) vary and/or stop the flow of the fuel through the reactor 20.

Indeed, in some embodiments, the described system 10 is configured to automatically regulate the flow of fuel through the reactor 20 to optimize the reactor for desired operating parameters. In some other embodiments, the described system comprises one or more automatic and/or manual shut-offs that allow fuel to stop its flow through the reactor and/or to be drained from the reactor.

In addition to the aforementioned features, the described system 10 can be modified in any suitable manner that allows the system to generate heat and/or electricity. In one example, the various components of the described system can be coupled together in any suitable manner (e.g., via the first fluid line 40, the second fluid line 45, one or more connectors, ball valves, valves, and/or in any other suitable manner). By way of non-limiting illustration. FIG. 1B shows an embodiment in which the reactor 20 is coupled to the heat generator 25, which (in turn) is coupled to the steam generator, via one or more connection points 315 (e.g., lugs, recesses, mechanical fasteners, hammer pin rocks, catches, etc.) and connectors 320 (e.g., brackets, catches, braces, couplers, ball connections, joints, etc.).

In another example, one or more components of the described system 10 are coupled to a common object. In this regard, some examples of such objects include, but are not limited to, a trailer (e.g., for a truck), a skid, a platform, a pallet, a train car, a vehicle (e.g., a train, car, truck, tractor, boat, ship, submarine, submergible, airplane, hovercraft, trolley, tank, motorcycle, bus, transports, heavy machinery, machinery, motor home, van, helicopter, military vehicle, space shuttle, drone, UAV, etc.); and/or any other suitable object.

In another example, some embodiments of the reactor core 70 comprise one or more fuel pins 160 having rounded ends with one or more fuel channels 155 running between the two ends. Indeed, in some embodiments, each such fuel pin comprises a single internal fuel channel. In each of the aforementioned embodiments, the pins can have any suitable characteristics that allows the reactor core to bring the fuel to (or to maintain the fuel at) a critical state. Indeed, in some embodiments, the rounded ends comprise one or more threads or other connection mechanisms configured to attach the rounded ends to the pin.

Figure 9A:
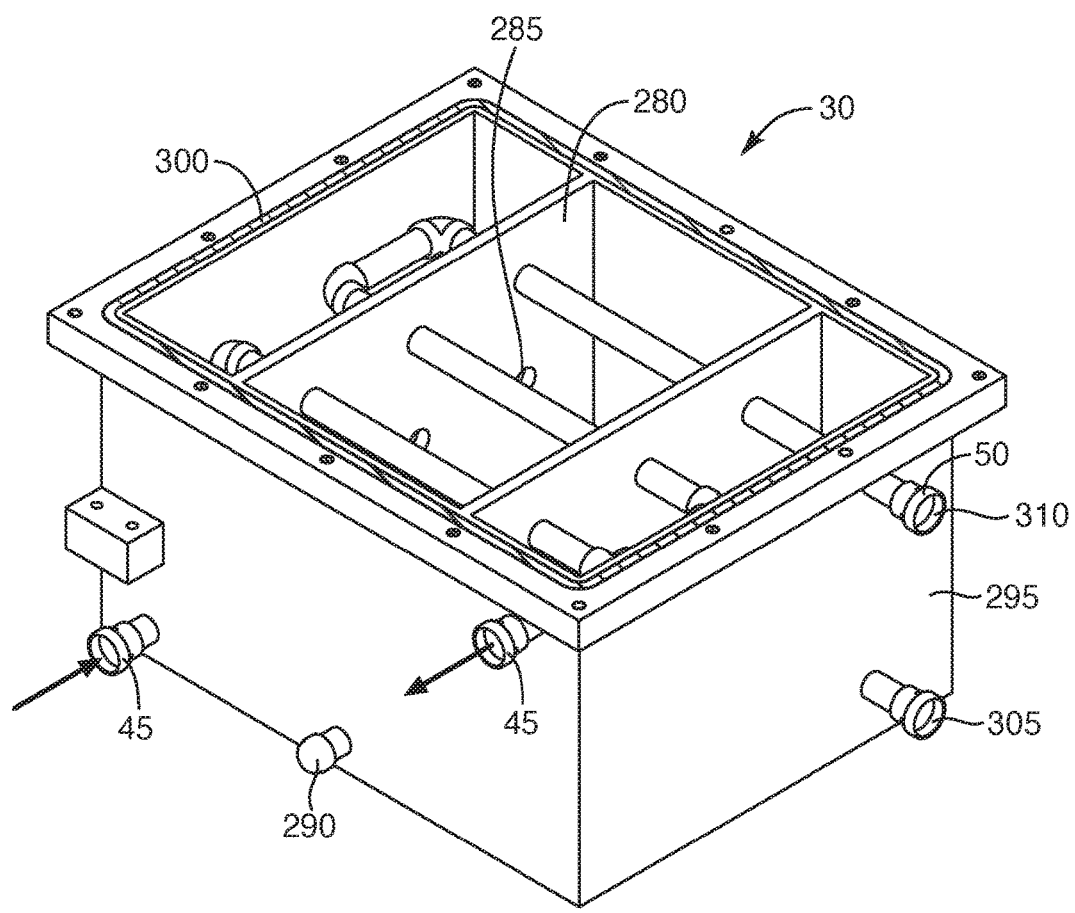
FIG. 9A illustrates a prospective view of a partially-assembled steam generator in accordance with a representative embodiment.
Figure 9B:
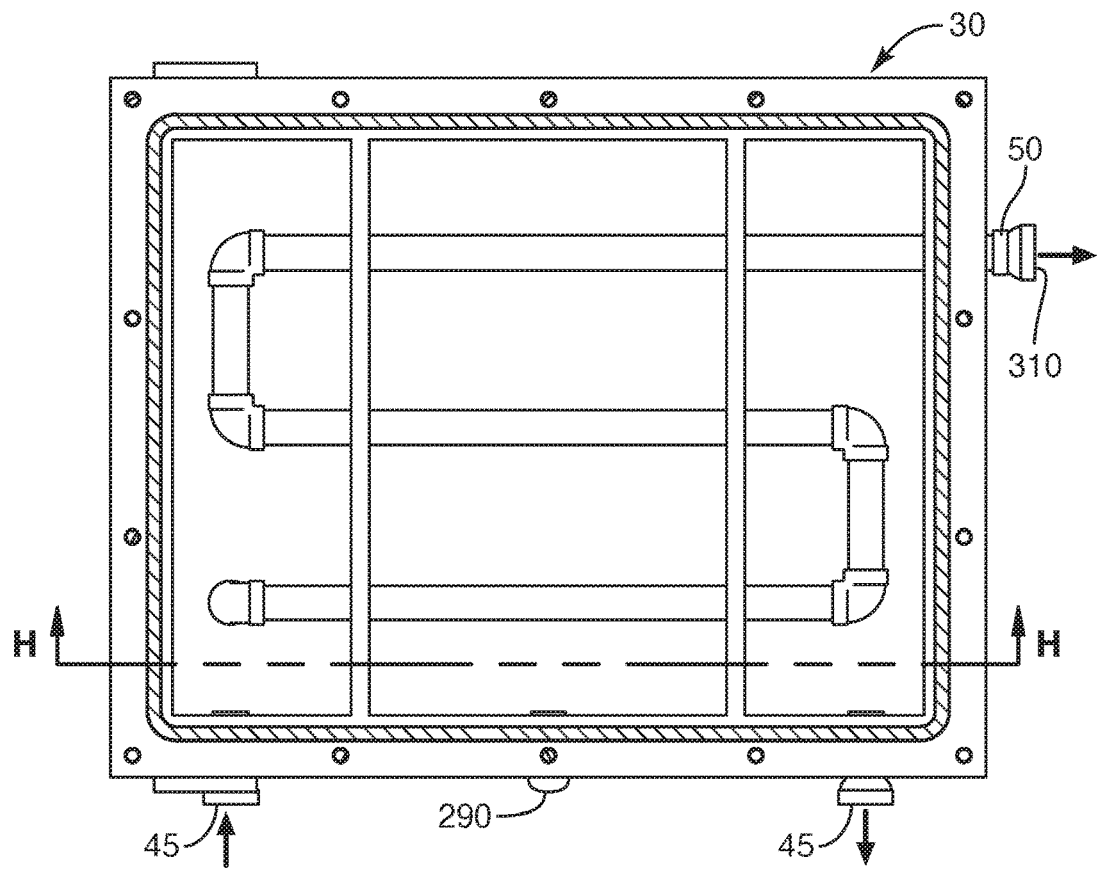
FIG. 9B illustrates a top view of the partially-assembled steam generator in accordance with a representative embodiment.
Figure 9C:
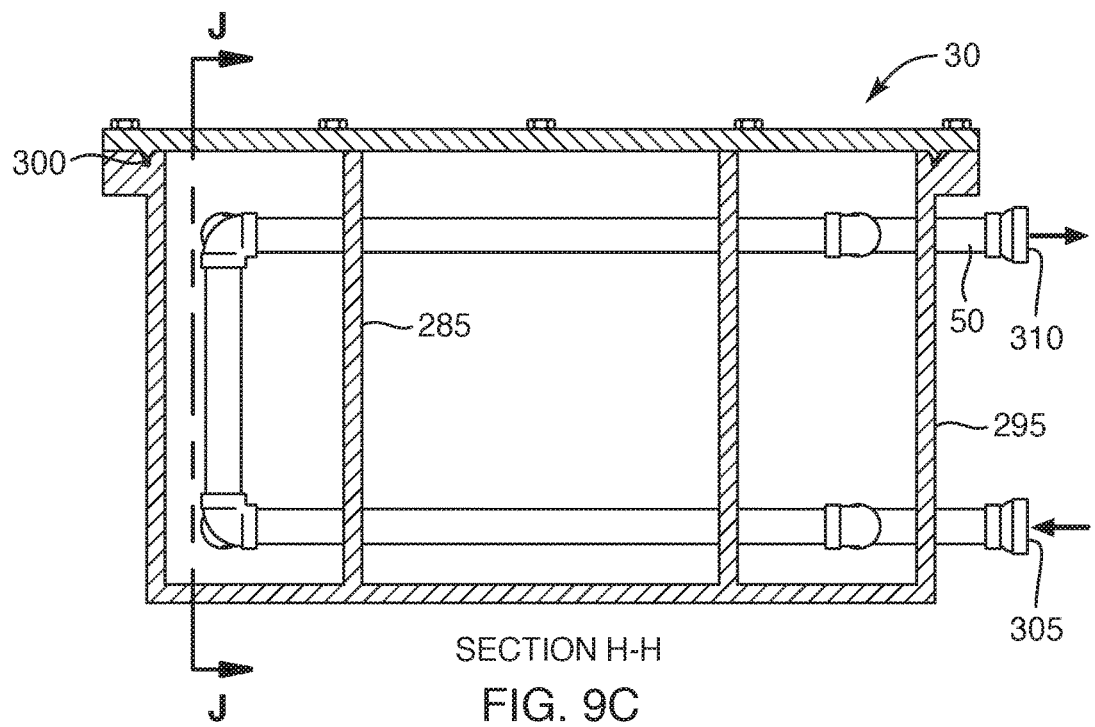
FIG. 9C illustrates a first cross-sectional view of the steam generator in accordance with a representative embodiment.
Figure 9D:
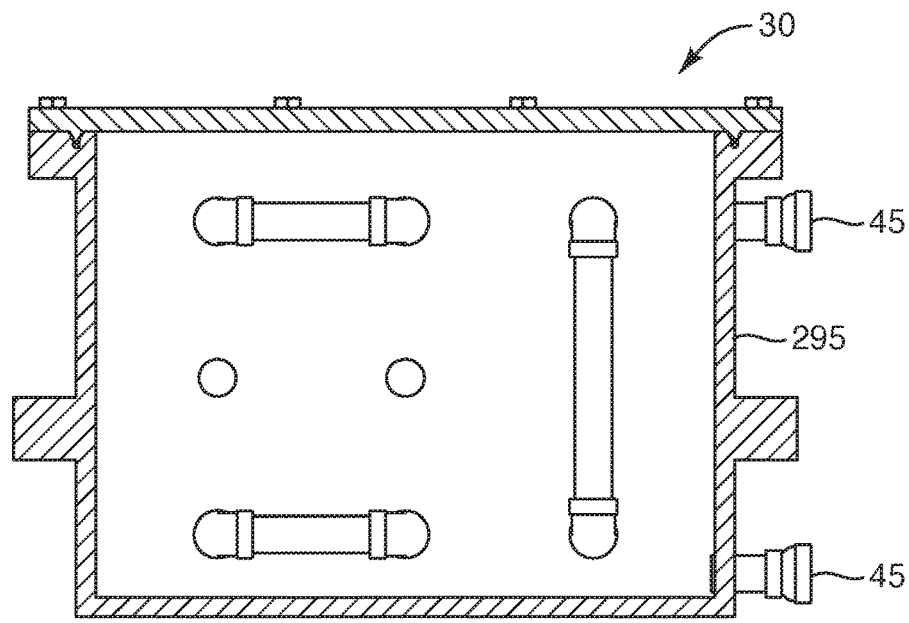
FIG. 9D illustrates a second cross-sectional view of the steam generator in accordance with a representative embodiment.
Figure 9E:
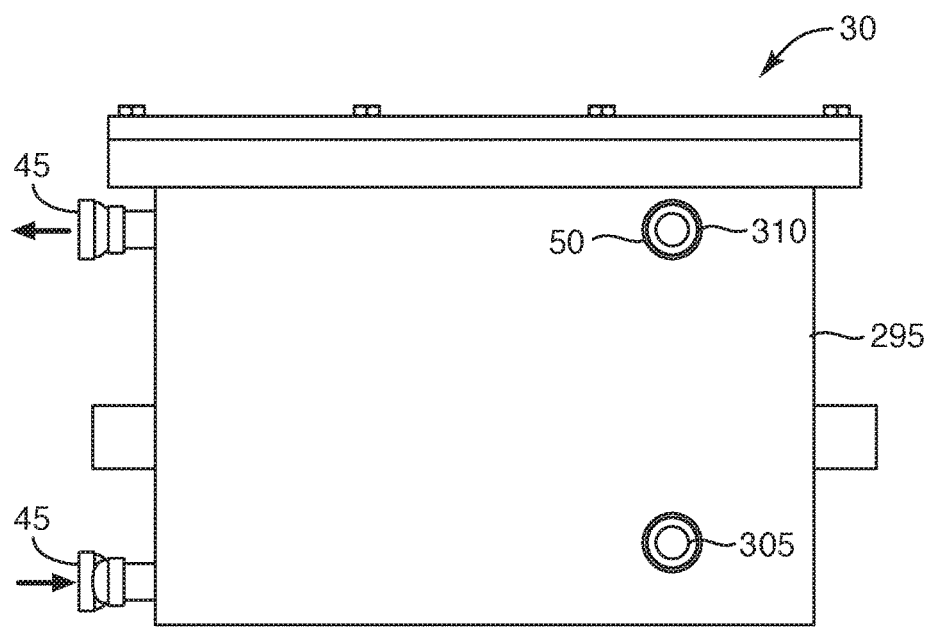
FIG. 9E illustrates a side view of the steam generator in accordance with a representative embodiment.
Figure 9F:
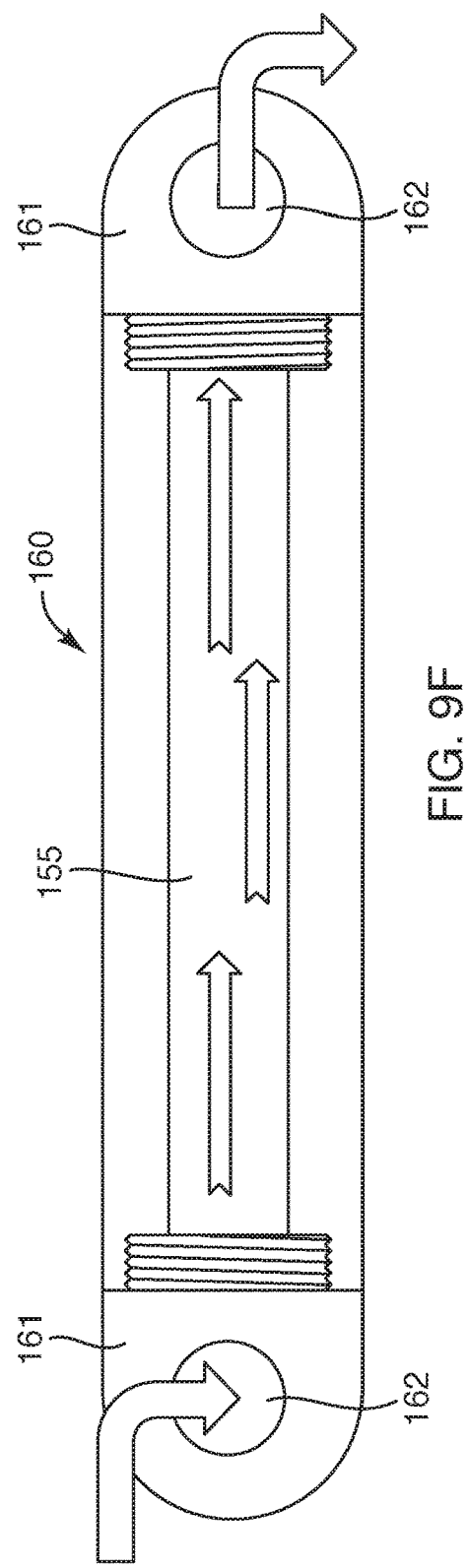
FIG. 9F illustrates a side view of a fuel pin in accordance with a representative embodiment.

The rounded ends of the pins 160 can further comprise any suitable number of holes, of any suitable size, that are configured to direct fuel into (and/or out of) the fuel channel(s) running in the pin. Indeed, in some embodiments, each of the rounded ends comprises 1, 2, 3, 4, 5, or more openings. Moreover, while the openings in the rounded ends of the pin can extend in any suitable manner, in some embodiments, the openings are disposed at an angle that directs fuel from the openings to (and/or from) the fuel channel in the pin. Furthermore, in some embodiments, a cross-sectional area of all of the openings in a rounded end of a pin are between about 80% and about 120% (or any subrange thereof) of a cross-sectional area of the fuel channel 155 in the pin. In one non-limiting illustration, FIG. 9F shows an embodiment in which a fuel pin 160 comprises two rounded ends 161 defining at least one opening 162, with a fuel channel 155 running through the pin. Again, while the rounded ends 161 can be coupled to the pin 160 in any suitable manner, FIG. 9F shows that in some embodiments, the end 161 is threadingly coupled to the pin 160.

In another example, instead of being configured to generate steam, which is then used to generate heat, in some embodiments, the heat exchanger 25 and/or the second fluid line 45 are configured to heat and expand air. In turn, such expanded air can be used to turn a turbine (or otherwise actuate another suitable device) and generate electricity.

In yet another example, instead of generating steam, the heat exchanger 25 and/or the second fluid line 45 are used to heat any other suitable object and/or medium. Indeed, in some embodiments, the heat exchanger and/or second fluid line are used to heat: a body of water (e.g., for distillation, desalination, evaporation, aquaculture, and/or any other suitable purpose), a building, a stadium, a neighborhood, an area, air, a complex, an underground reservoir containing fossil fuels, a heat transfer fluid, tar sands, oil shale, a biofuel waste water treatment plant, and/or any other suitable object and/or material.

In still another example, instead of having the heat exchanger 25 and the steam generator 30 comprise two discrete components that are disposed next to each other, in some embodiments, one is contained (at least partially) within the other. Indeed, in some embodiments, at least a portion of the heat exchanger is disposed within the steam generator.

In another example of a manner in which the described system 10 can be modified, in some embodiments, the rate at which fuel is passed through the reactor core 70 is controlled by a computer processor (e.g., as discussed below in the Representative Operating Environment system). Accordingly, in some embodiments, a computer (e.g., a special-purpose computer that is configured to regulate the reactor and/or a general purpose computer configured to perform the same function) is configured to increase the flow of fuel through the reactor core when more energy is needed (e.g., during peak hours of electrical consumption), to slow the flow of fuel through the reactor core when less energy is needed (e.g., during off-peak hours), and/or to shut down the reactor 20 when desired (e.g., in case of an emergency, maintenance, etc.).

In yet another example, some embodiments of the described reactor 20 comprise one or more bearings and/or low friction surfaces that help allow for the reactor core 70 to rotate with respect to one or more reflectors 75.

In another example of a modification, in some embodiments, one or more corners, edges, interfaces, and/or other boundaries of any suitable component of the described system 10 (e.g., the reactor core 70) are rounded, arched, chamfered, and/or otherwise shaped to remove stress risers and to reduce the likelihood of crack formation.

In another example of a modification, in some embodiments, the reactor core 70 is non-rotatably fixed within the reactor 20. Thus, in some such embodiments, the flow rate of the fuel through the reactor is controlled via one or more pumps and/or valves, via changing an orientation of the reactor, and/or in any other suitable manner (besides by rotating the reactor core, as described earlier).

In even another example of a suitable modification, some embodiments of the described system 10 comprise one or more condensers that are configured to recycle some or all of the steam produced by the steam generator 30.

Figure 10:
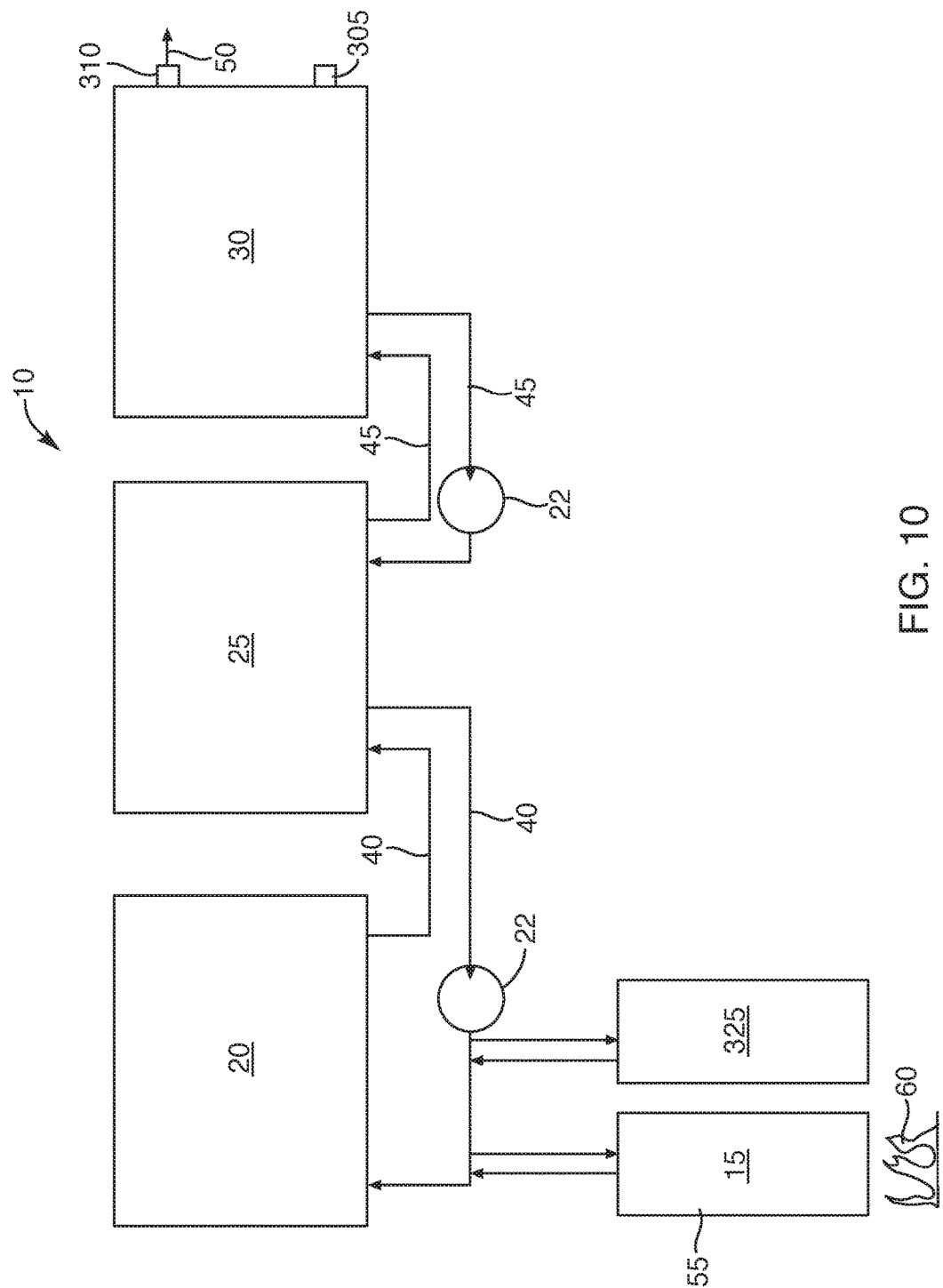
FIG. 10 illustrates a schematic view of the molten salt reactor system in accordance with a representative embodiment of the invention.

In still another example of a suitable modification, some embodiments of the described system 10 are configured to extract one or more materials (e.g., chemicals, composition, mixtures, gases, and/or other desired materials) from the fuel as it cycles through the system. Indeed, in some embodiments (as illustrated by FIG. 10) the described system 10 comprises a processing center 325 that is configured to remove isotopes (e.g., medical grade isotopes) and/or other materials that are generated as the fuel is cycled.

In another example, the described system 10 can comprise any other suitable component, including, without limitation, a secondary containment structure; a tertiary containment structure; a radiator configured to dissipate heat from the reactor core and/or fuel; one or more dump tanks configured to receive the fuel and/or heat transfer medium; one or more additional reactors 20 used in parallel, series, and/or any other suitable manner with the first reactor core 70; one or more emergency programs that are configured to automatically slow and/or stop the flow of fuel through the reactor core; one or more other components and/or programs that are configured to shut in and/or to dump the fuel from the reactor core 70; and/or any other suitable component.

In another example of a suitable modification, some embodiments of the described system 10 comprise one or more holding devices, such as the vessel 98 shown in FIG. 1A and/or the heater 15, that are configured to store fuel prior to its introduction into the reactor core 70. Accordingly, in some embodiments, after the fuel has passed through the heat exchanger 25 and/or the heater 15, the fuel is optionally pumped relatively rapidly to the holding device.

Where the system 10 comprises a holding device (e.g., vessel 98), the holding device can comprise any suitable characteristic that allows it to hold the fuel prior to introduction into the reactor core. Indeed, in some embodiments, the holding device comprises one or more reflectors 75, a tank that is configured to hold the fuel, one or more heaters (e.g., as discussed above with respect to the heater 15) to keep the fuel at or above a desired temperature, insulation, shielding, and/or any other suitable component or characteristic that allows the holding device to function as described herein.

In yet another example of a suitable modification, one or more components of the described system 10 are optionally coated with graphite, which may include, but is not limited to, graphite foam, graphite sheets, graphite plates, and/or any other suitable form of graphite that can be applied to such components. Indeed, in some embodiments, the container 100, one or more fluid lines 40, the heat exchanger 25, and/or any other suitable component of the system is coated and/or lined with graphite foam. In such embodiments, the graphite foam can have any suitable characteristic. For instance, the graphite foam can be any suitable thickness, including, without limitation, one or more layers of foam having a thickness between about 0.1 cm and about 60 cm or in any subrange thereof (e.g., between about 6 cm and about 18 cm thick).

In even another example, some embodiments of the reactor 20 are disposed on a supporting surface, such as a foundation, a scaffold, a trailer, a train track, a boom, a pivoting table, floating river and ocean barges, and/or any other surface that is configured to support the reactor core 70 and/or the other components of the reactor. While such a support is configured to hold the reactor, in some embodiments, the support further strengthens the reactor to reduce deformation of the core under high temperatures, inclement weather, earthquakes and/or other acts of nature, due to gravity, and/or similar forces.

In still another example of a suitable modification, as the reactor core tube 120 (and hence the reactor 20 and reactor core 70) can be any suitable length (as discussed earlier), in some embodiments, at least one component of the reactor comprise multiple pieces (or sections of the component) that are coupled together to form the component (e.g., a relatively long component and/or a portion of the component). Indeed, in some embodiments, one or more fuel wedges 180 in the reactor comprise two or more wedge sections that are placed end to end (or side to side, face to face, and/or are otherwise configured) to form a single wedge. Similarly, in some embodiments, the reflectors 75, the reactor core tube, the container 100, the cover 105, and/or any other suitable portion of the reactor respectively comprises two or more reflector sections, reactor core tube sections, container sections, cover sections, and/or other sections that are attached end to end (or side to side, face to face, and/or in any other suitable manner).

Where one or more components of the reactor 20 comprise multiple sections that couple together to form a complete component (or at least a larger portion of the component), such components can provide some embodiments of the reactor core with one or more desirable characteristics. Indeed, in some embodiments, it is easier and/or less expensive to form a relatively long component of the reactor (e.g., a fuel wedge 180) out of shorter sections that couple together to form the full component than it is to simply form the full component as a monolithic object. For instance, in some embodiments, it is easier to form fuel channels 155 (e.g., with desired paths through the wedges, with desired spacing between channels, with inlets that correspond spatially with the corresponding outlets, and/or having any other suitable characteristic) through multiple short sections than it is to form such channels through a single long fuel wedge. As an additional benefit, in some embodiments in which a component of the reactor comprises multiple sections and one section becomes damaged, it can be easier and/or less expensive to replace that section than it would be to replace the entire component (e.g., if the component were formed as a single piece).

Where one or more components of the reactor 20 comprise multiple sections that couple together (e.g., end to end and/or otherwise) to form a full-length (and/or full-sized) component (and/or portion of the component), the sections of the various components (e.g., the fuel wedge 180, the reactor core tube 120, the reflectors 75, and/or any other suitable component) can be virtually any suitable length that allows the reactor to function. In this regard, while component length will, in some embodiments, vary depending on reactor size, reactor configuration, and/or any other desired characteristic of the reactor, in some embodiments, a section of a fuel wedge (and/or any other suitable component of the reactor, including, without limitation, the reactor core tube, the reflectors, the container 100, etc.) is between about 1 cm and about 20 m in length, or any length that falls therein. Indeed, in some embodiments, a section of the fuel wedge is between about 0.3 m and about 3 m (e.g., between about 0.6 m and about 1.9 m). Thus, by way of non-limiting illustration, where an embodiment of a full-length fuel wedge is about 7 m, and each section is about 1 m long, the full-length wedge comprises seven sections coupled end to end. Again, however, lengths of various component sections may be longer or shorter than those described herein, based on a variety of factors, including, without limitation, manufacturing techniques, use conditions, and factors discussed above.

Where one or more components of the reactor 20 comprises multiple sections that couple together end to end (or in any other suitable manner) to form a full-length component (and/or a larger portion of the component), the various sections can be coupled together in any suitable manner that allows the reactor to function. Indeed, in some embodiments, multiple component sections (e.g., multiple fuel wedge 180 sections and/or sections of any other suitable component) couple together to form a component (e.g., a fuel wedge) via one or more alignment pins that extend between two or more sections; one or more processes that extend from one section into corresponding recesses in another section; dovetail couplings; mechanical engagements; by welding the various sections together; via one or more cramps and/or other pieces of material that are configured to span a joint between two sections and to fit into a keyed recess in each section to retain the sections together; by one or more mechanical and/or frictional coupling mechanisms; by one or more threaded engagements; by one or more clamps; by one or more mating engagements; by one or more fasteners; by applying pressure to one or more sections with one or more components of the reactor (e.g., by having the end caps 140 and 145 force wedge sections together; by having the reflectors 75 force sections of the reactor core tube 120 together, etc.); and/or in any other suitable manner. In some embodiments, however, one or more sections of a component (e.g., a fuel wedge) of the reactor are coupled together via one or more alignment pins. By way of non-limiting illustration, FIG. 11A shows an embodiment in which a first 400 and a second 405 sections of a fuel wedge 180 are coupled together via one or more alignment pins 410 that extend between the two sections.

Where multiple sections of a component of the reactor 20 (e.g., multiple wedge 180 sections, such as 400 and 405 and/or any other suitable components of the reactor) are coupled together via one or more alignment pins, the various sections can be coupled together with any suitable number of alignment pins, including, without limitation, 1, 2, 3, 4, 5, 6, 7, 8, 9, 10, 11, 12, or more. By way of non-limiting illustration, FIGS. 11B-11C show some embodiments in which the first 400 and second 405 sections of the fuel wedge 180 are configured to couple together via two alignment pins 410 that extend into recesses 415 in each section. Thus, in some such embodiments in which the reactor 20 comprises four full-length wedges where each full-length wedge comprises two sections joined together, eight alignment pins (e.g., two between each of the two corresponding sections) are used to couple the eight sections together to form the four full-length wedges.

Where the reactor 20 comprises a component (e.g., a fuel wedge 180 and/or any other suitable component) that comprises two or more sections (e.g., sections 400 and 405) that are coupled together by one or more alignment pins 410, the alignment pins can be disposed in any suitable location that allows the reactor to function. Indeed, in some embodiments in which the fuel wedge is formed by coupling two or more wedge sections together, one or more pins are disposed in and extend from an end face (e.g., end face 417); are disposed in and extend from a side interface (e.g., side interface 418 and/or 419); are disposed in an end face towards a medial (e.g., portion 420), lateral (e.g., lateral portion 425), and/or interface 418 and/or 419 portion of the wedge; and/or are disposed in an any other suitable location. By way of non-limiting illustration, FIG. 11B shows an embodiment in which the alignment pins 410 and recesses 415 are disposed in an end face 418 and near a lateral edge 425 of the wedge section 400.

Figure 11A:
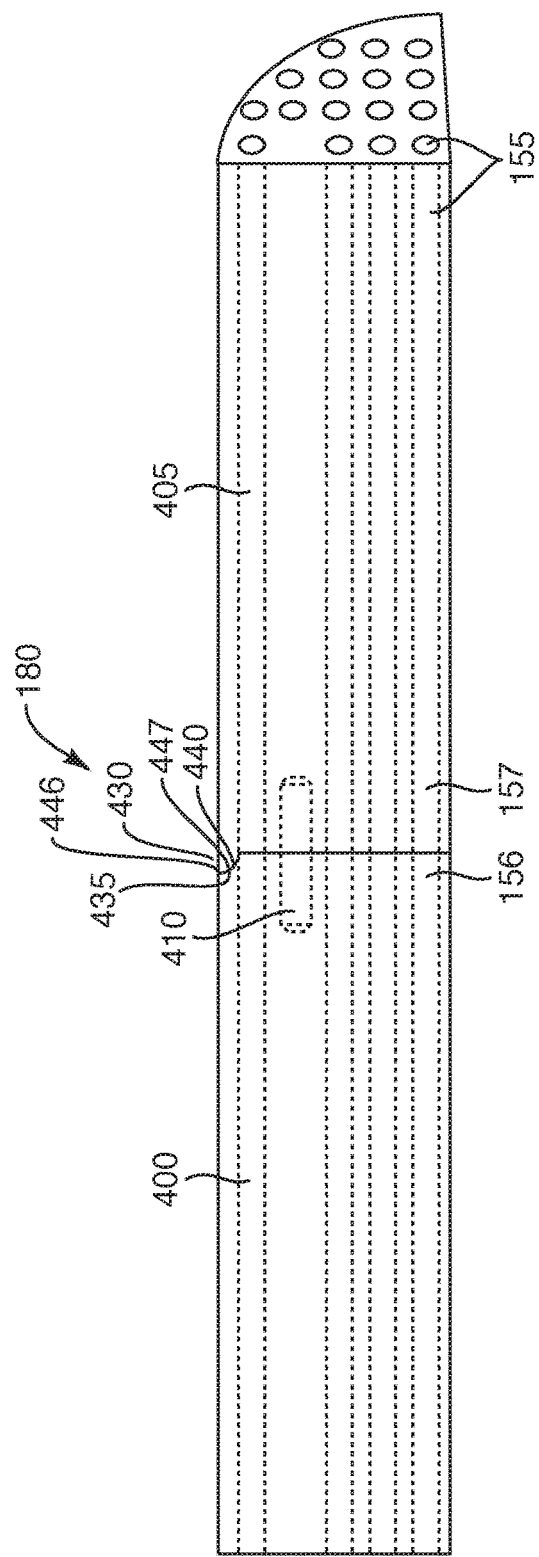
FIG. 11A illustrates a perspective, schematic view of a fuel wedge comprising multiple sections that are coupled together in accordance with a representative embodiment.
Figures 11B, 11C:
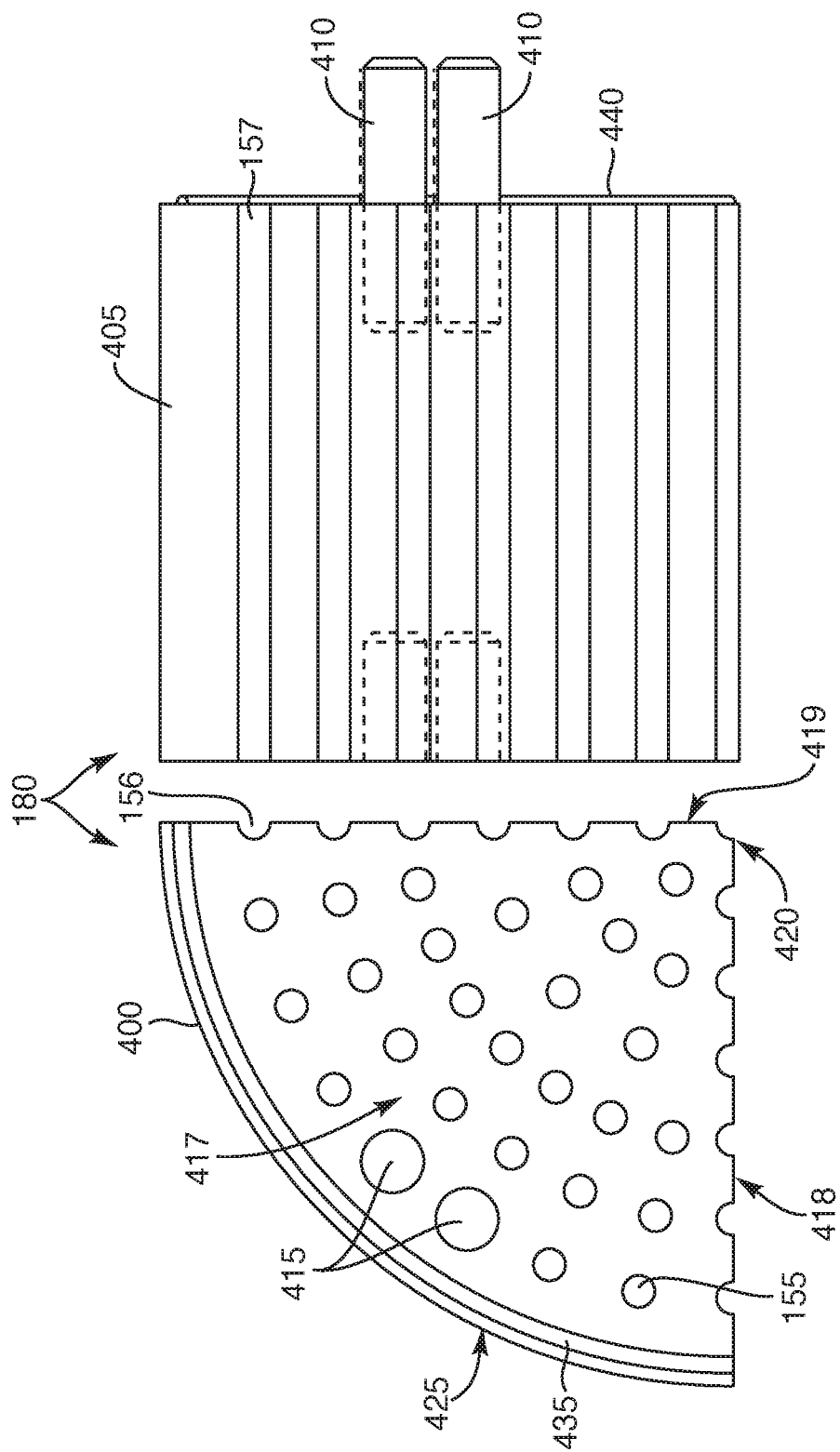
FIG. 11B illustrates a plan view of an end face of a section of the fuel wedge in accordance with a representative embodiment.
FIG. 11C illustrates a side view of a section of the fuel wedge in accordance with a representative embodiment.

The alignment pins 410 can have any suitable characteristic that allows them to couple two or more sections of a component (e.g., a fuel wedge 180, a reflector 75, and/or any other suitable component) together and/or to maintain such sections in proper alignment with each other (e.g., such that a first fuel channel 156 of first section 400 of a fuel wedge properly aligns with a corresponding second fuel channel 157 of a second corresponding section 405 of the fuel wedge, as (for example) shown in FIG. 11A). Indeed, the alignment pins can be any suitable shape, including, without limitation, being substantially cylindrical, prism-shaped, slat shaped, corkscrew shaped, bar-shaped, graphite bars, tubular, and/or any other suitable shape that allows them to join and/or align two sections of a reactor component. By way of non-limiting illustration, FIGS. 11A-11C show some embodiments in which the alignment pins 410 are substantially cylindrical in shape.

The alignment pins 410 can be any suitable size that allows them to function as described herein. In this regard, the alignment pins' size can vary based on the size of the reactor 20, the size of the reactor component sections being joined by the alignment pins, and/or any other suitable characteristic of the reactor. In some embodiments, however, the alignment pins have a length that is between about 1.2 cm and about 1.8 m, or in any subrange thereof (e.g., between about 10 and about 45 cm). Indeed, in some embodiments, the alignment pins have a length that is between about 15 cm and about 35 cm (e.g., about 30 cm±2 cm).

While the alignment pins 410 can have any suitable width or diameter that allows them to function as described herein, in some embodiments, the alignment pins have a width or diameter that is between about 0.5 cm and about 35 cm, or in any subrange thereof. Indeed, in some embodiments, the alignment pins have a diameter/width that is between about 2.5 cm and about 13 cm (e.g., between about 5 cm and about 10.2 cm). For instance, some embodiments of the alignment pins have a diameter between about 6.3 cm and about 8.9 cm.

The alignment pins 410 can comprise any suitable material that allows them to function as described herein while allowing the reactor 20 to function. Some examples of suitable materials include, but are not limited to, one or more types of graphite, ceramic material, metal, metal alloy (e.g., one or more nickel alloys, low-chromium nickel-molybdenum alloys (such as HASTELLOY-N™)), cement, stone, synthetic material, and/or any other suitable material. In some embodiments, however (and as discussed above), the alignment pins comprise graphite.

In some embodiments in which one or more components of the reactor 20 comprise multiple sections that couple together to form a larger component, such sections are configured to be at least partially sealed together. In this regard, the various sections can be sealed together in any suitable manner that provides at least a partial fuel seal between the sections and that allows the reactor to function. Some non-limiting examples of suitable seals comprise one or more positive seals, carbon seals, carbon rope seals, rubber seals, lip seals, mating seals, compression seals, nano-composites, composites, and/or other suitable sealing mechanisms. In some embodiments, however, the seal comprises a positive seal in which one section of a component (e.g., a first section of a fuel wedge 180 and/or any other section of any suitable component) comprises one or more processes that extend from the section and that are configured to extend into one or more corresponding grooves, slots, and/or other recesses in a corresponding component section. By way of non-limiting illustration, FIGS. 11A-11C show some embodiments in which the first section 400 of the fuel wedge 180 defines a seal recess 435 that is configured to receive a seal projection 440 (e.g., comprising graphite and/or any other suitable material) that extends from the second section 405 to form a seal between the first and second sections (e.g., to prevent fuel from escaping, and/or reduce the amount of fuel that escapes, from the wedge).

Figure 11D:
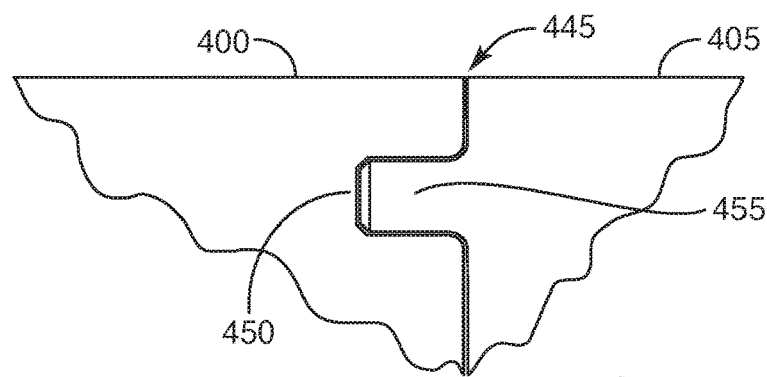
FIGS. 11D-11F each illustrate a side, cross-sectional view of a different seal disposed between two sections of the fuel wedge in accordance with representative embodiments.
Figure 11E:
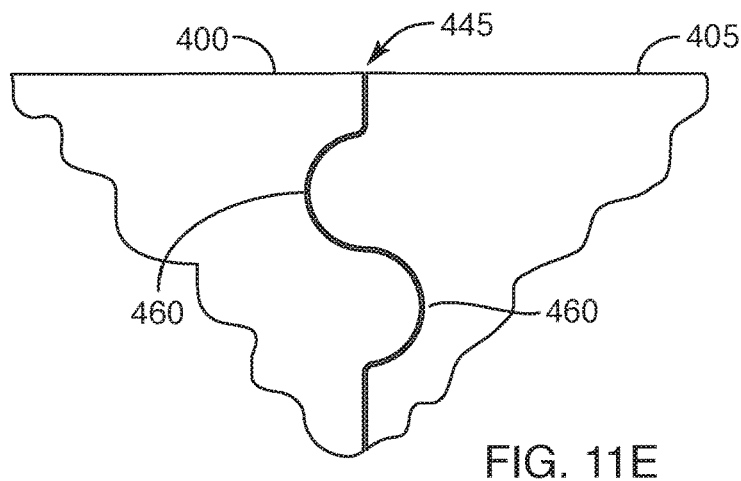
Figure 11F:
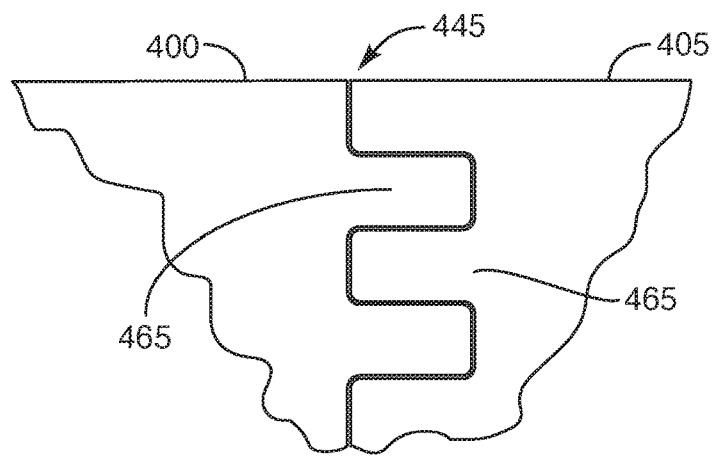

Although FIGS. 11A-11C show some embodiments in which a seal 445 that comprises a semicircular recess 446 receives a semicircular ridge 447, the various portions of the seal can have any suitable shape that allows the seal to prevent at least some fuel from leaking past the seal. In this regard, some non-limiting examples of seal shapes include one or more triangular recesses that receive one or more triangular ridges, one or more square-shaped recesses that are configured to receive one or more square-shaped ridges, and/or any other suitable shape. By way of non-limiting illustration, FIG. 11D shows an embodiment in which the seal 445 comprises a mortise shaped recess 450 and a tenon shaped ridge 455; FIG. 11E shows an embodiment in which the seal 445 comprises two mating S-curve surfaces 460; and FIG. 11F shows an embodiment in which the seal 445 comprises multiple mating notches 465.

Where one or more seals 445 are disposed between two or more sections of a component of the reactor 20 (e.g., between wedge sections and/or sections of any other suitable component), the seals can be disposed in any suitable location. Indeed, in some embodiments and as shown in FIGS. 11A-11G, the seal 445 is disposed at an end face of a reactor component, namely at an end face 417 of a wedge section (400 or 405). Accordingly, in some embodiments in which two wedge sections are abutted face to face, fuel is able to follow directly from a fuel channel in one section into a corresponding fuel channel in a second section without leaking out of the wedge 180 and/or becoming disposed between the wedge and the interior surface 170 of the reactor core tube 120.

Figure 11G:
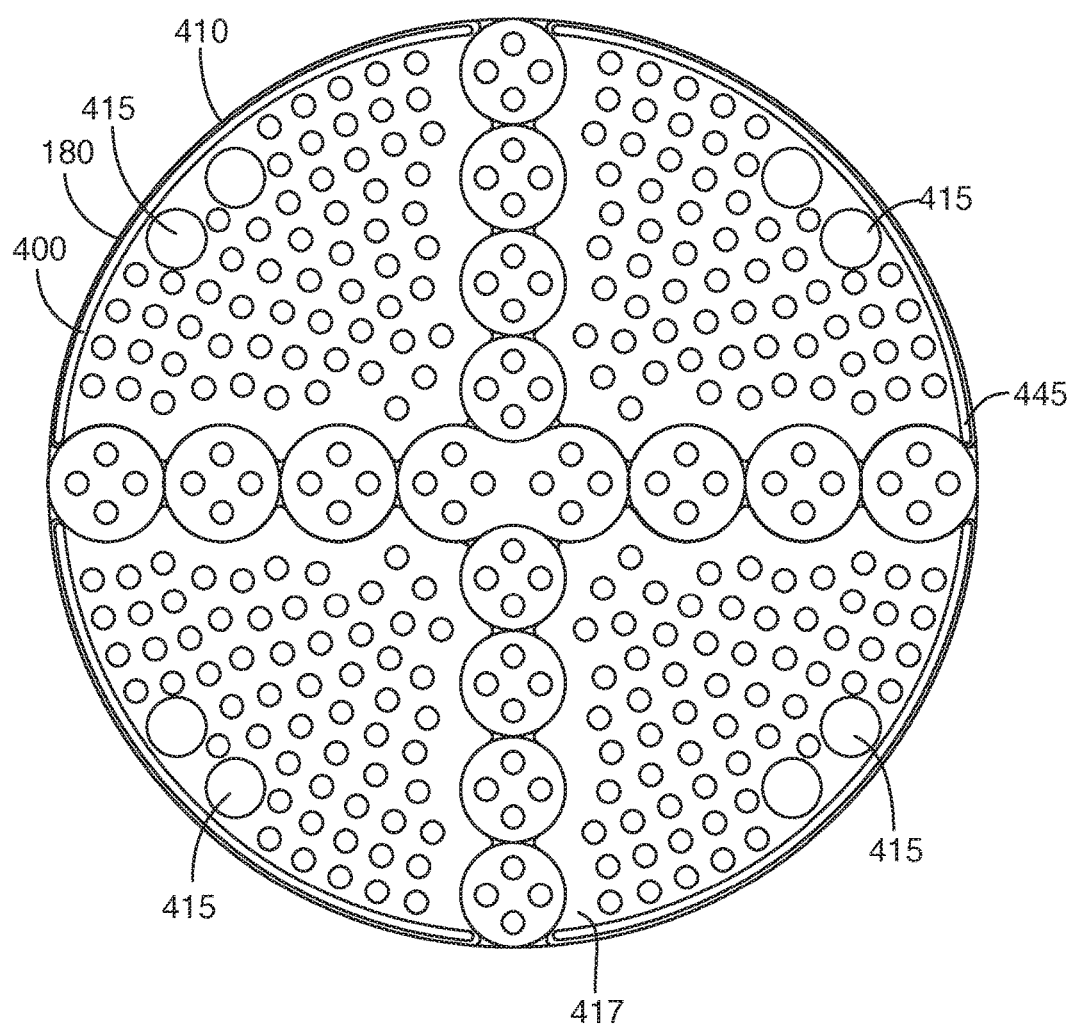
FIGS. 11G-11H each illustrate a cross-sectional view through the reactor core, wherein the core includes multiple alignment pins in accordance with some representative embodiments.
Figure 11H:
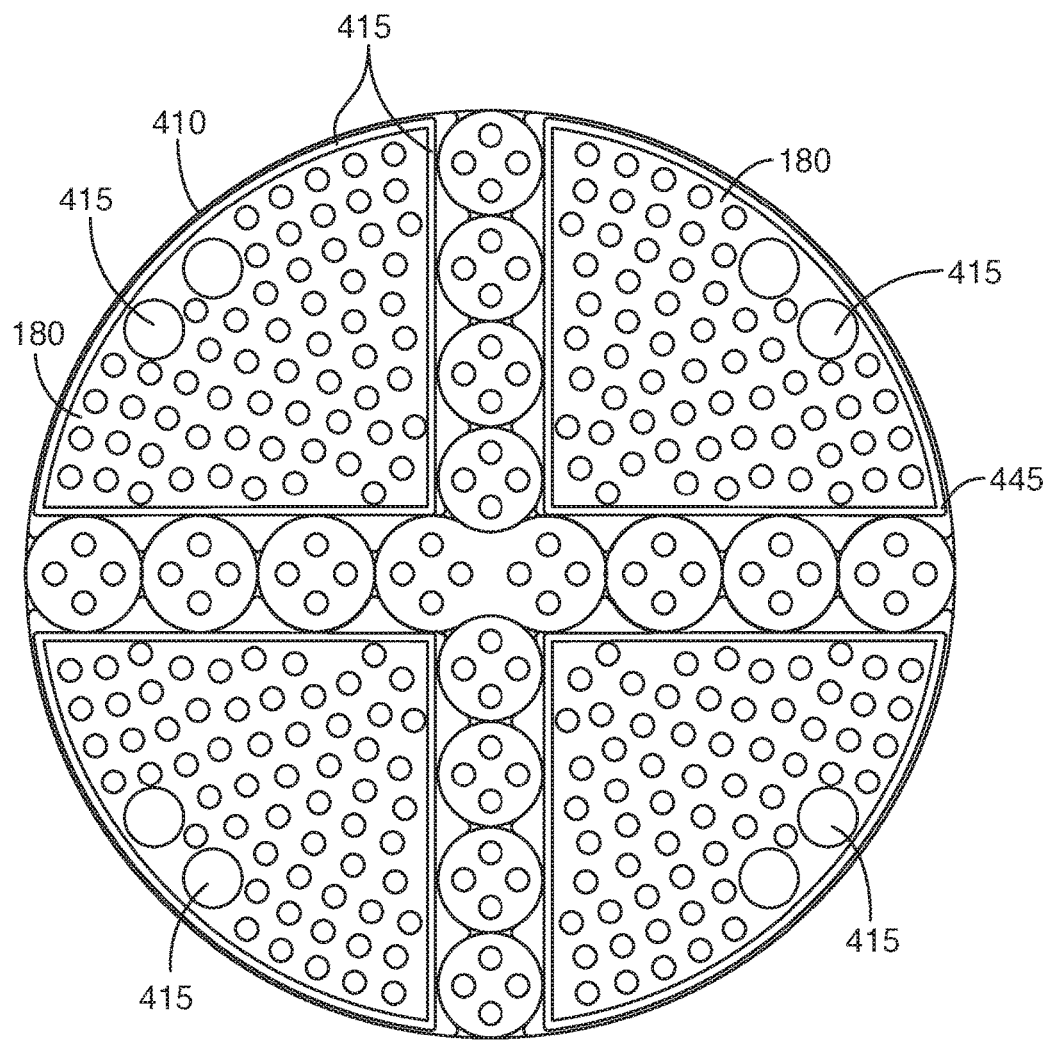
Figure 11I:
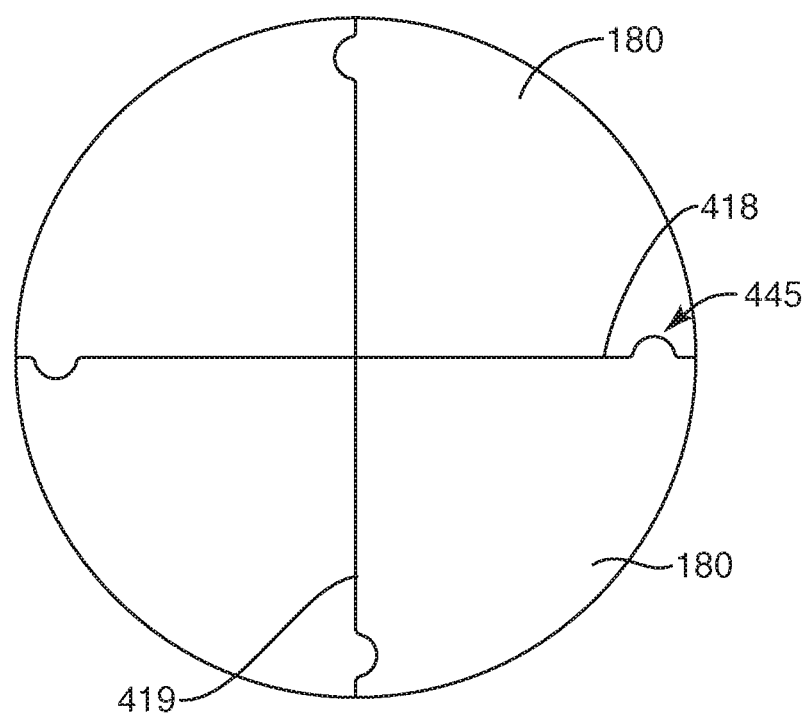
FIG. 11I illustrates a cross-sectional view through the reactor core in accordance with a representative embodiment.

In addition to or in place of having one or more seals 445 at an end face (e.g., wedge face 417), in some embodiments, one or more seals are disposed between and along sides of reactor components of the reactor. By way of non-limiting illustration, FIG. 11I shows an embodiment which the seal 445 is disposed between side interfaces 418 and 419 of the wedges 180.

Figure 11J:
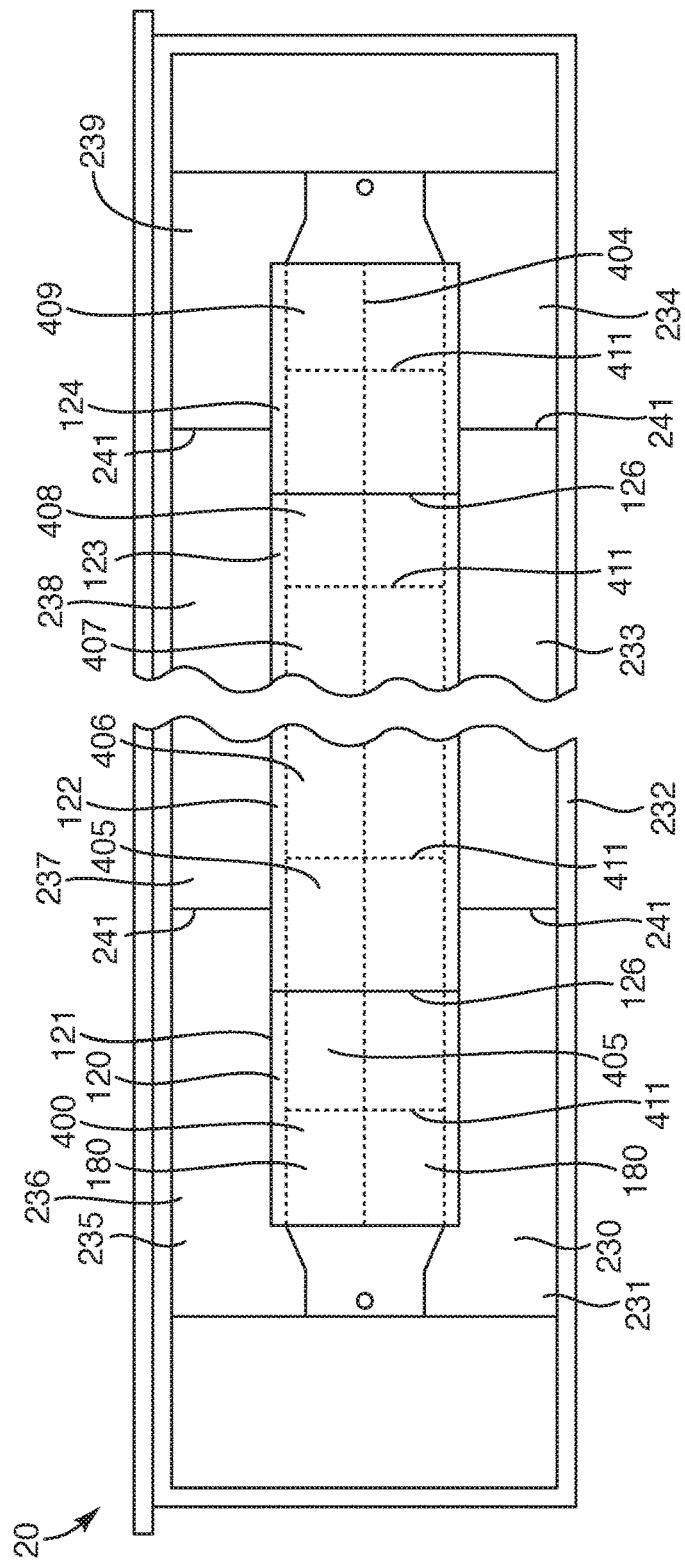
FIGS. 11J-11K each illustrate a schematic view of the reactor in accordance with some representative embodiments.

Regardless of where the seal 445 located, the seal can extend around any suitable portion of the rector 20 components. In this regard, FIG. 11G shows an embodiment in which the seal 445 extends around an outer perimeter 470 of an end face 417 of a wedge section 400. In contrast, FIG. 11H shows an embodiment in which the seal 445 extends around an entire perimeter of each wedge 180.

Where one or more components of the reactor 20 comprise multiple sections that are sealing coupled together, any suitable portion of such components and any suitable combination of the reactor's components can be comprise multiple sections that are sealing coupled together. Indeed, FIG. 11J shows that, in some embodiments, the reactor core tube 120 comprises 2, 3, 4, or more sections (e.g., sections 121, 122, 123, 124, etc.) that are connected at seams 126 and that house one or more wedges 180 (shown in FIG. 11J to be divided by horizontal line 404). In some such embodiments, while each wedge can comprise a single monolithic object, FIG. 11J shows an embodiment in which each of the wedges 180 comprise multiple wedge sections (e.g., sections 400, 405, 406, 407, 408, 409, etc.) that are coupled together at seams 411. Additionally, FIG. 11J shows an embodiment in which the reflectors (e.g., the first 230 and second 235 reflector) comprise multiple sections (e.g., sections 231-234 and 236-239) that meet at seams 241. While the seams for the various components (e.g., the wedges, the reactor tube, the reflectors, etc.) can be aligned with each other, FIG. 11J shows that, in some embodiments, one or more of the seams (e.g., 126, 241, and 411) of the various components are offset from each other to prevent undesired leakage in the reactor 20.

Figure 11K:
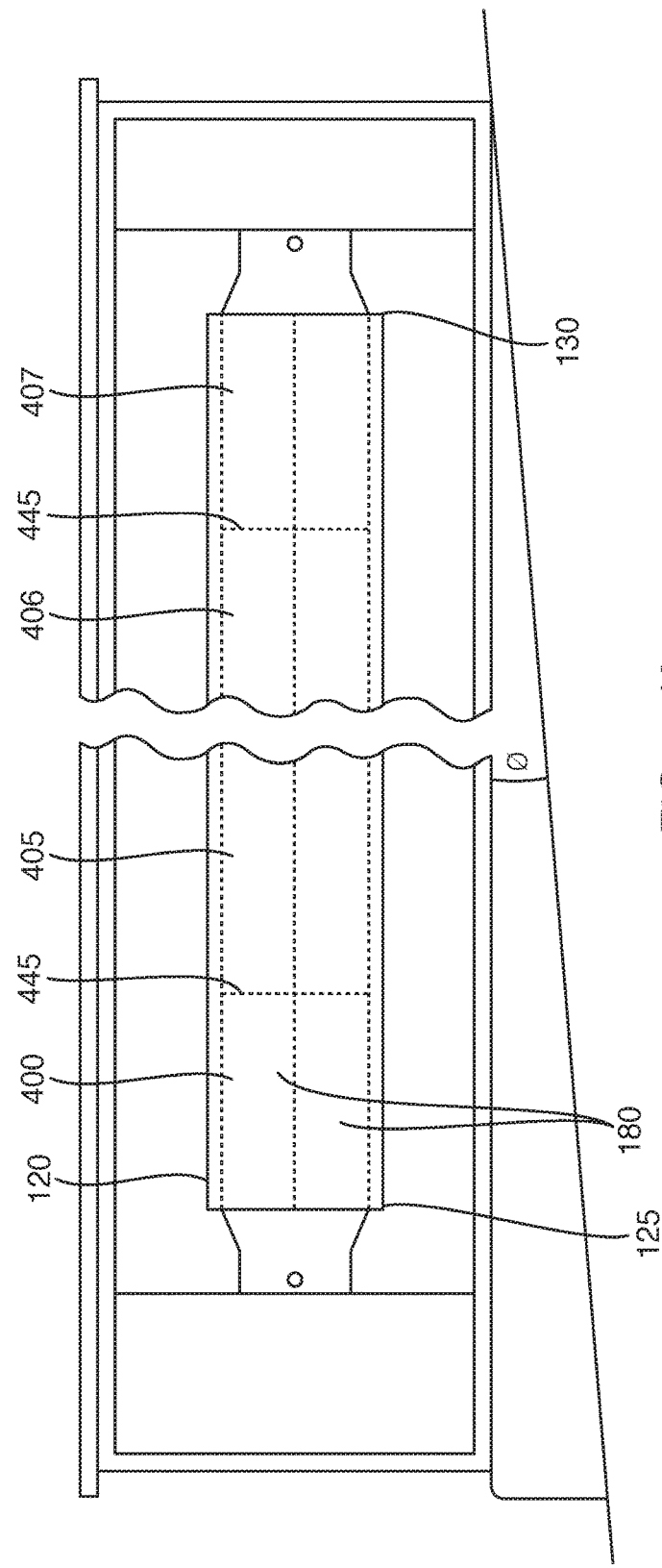
Figure 11L:
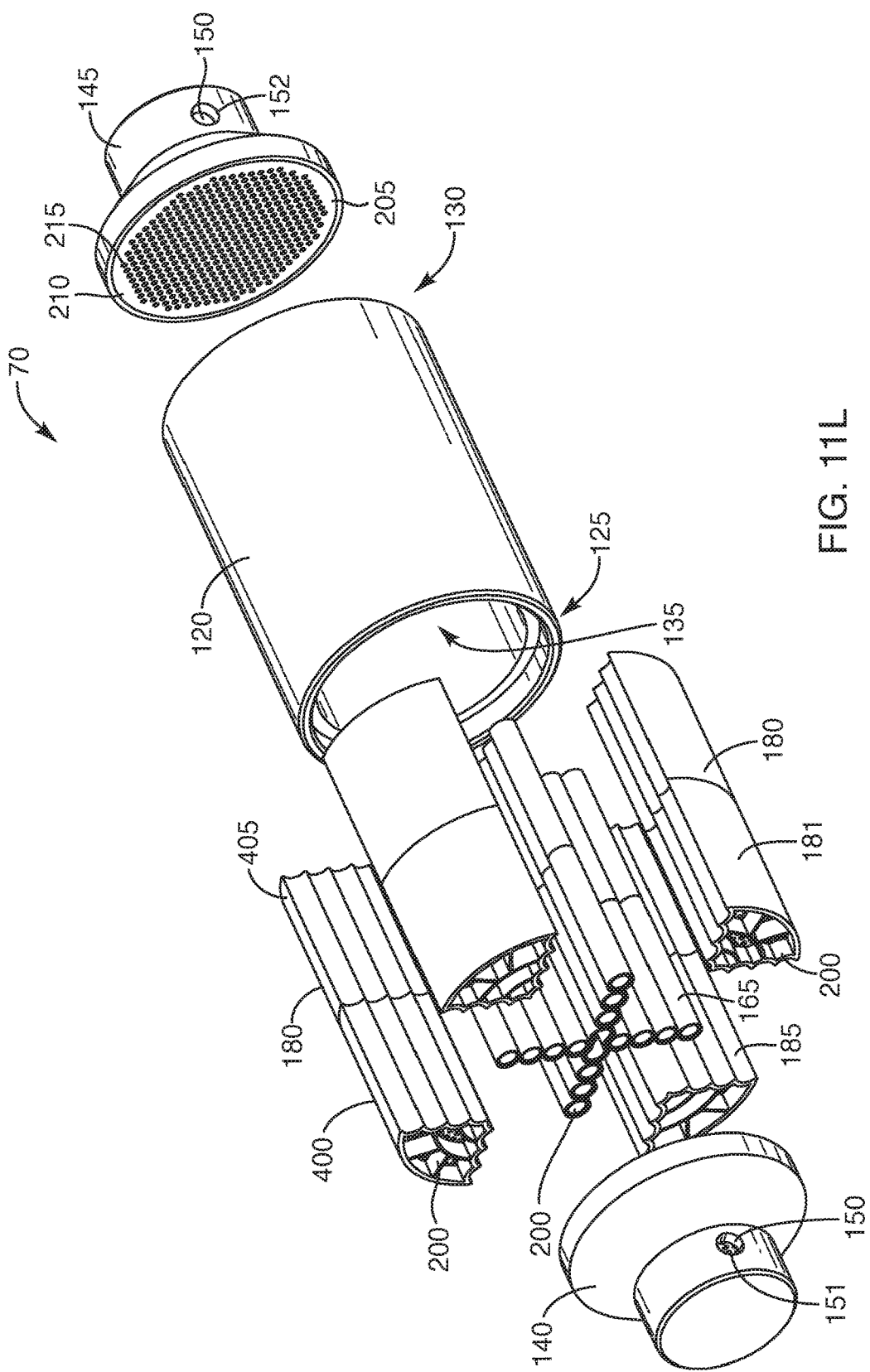
FIG. 11L illustrates a perspective, exploded view of the reactor core in accordance with a representative embodiment.

In accordance with some embodiments, FIG. 11K shows that while the wedges 180 each comprise multiple sections (e.g., sections 400, 405, 406, and 407), the reactor core tube 120 comprises a monolithic object that houses the wedges 180. Indeed, in some cases, it is easier to make a full-length, monolithic reactor tube defining a single internal space than it may be to make a full-length wedge defining a plurality of fuel channels 155 that extend from a first to a second end of the wedge. Accordingly, by using a monolithic reactor tube with wedges comprising multiple sections, in some embodiments, the reactor can be relatively inexpensive to manufacture. Additionally, in some such embodiments, by having some components of the reactor be made up of smaller sections, the reactor can be larger that it could otherwise be. Indeed, in some embodiments, the reactor can be relatively long (as discussed above), giving it (e.g., the reactor core tube) the appearance of a pipeline and the ability to produce a relatively large amount of heat and/or electricity.

In addition to the aforementioned features, the described system 10 can comprise any other suitable feature. Indeed, some embodiments of the described reactor core 70 are configured to be used in any orientation, including, without limitation, in a horizontal, vertical, diagonal, and/or variable orientation. Indeed, unlike some reactors, some embodiments of the described reactor core are configured to be used in a horizontal orientation (e.g., as shown in FIG. 1C).

In some embodiments, the reactor 20 is configured to function when the reactor (e.g., the reactor core tube 120) is at an angle. Indeed, in some embodiments, by having the reactor tube slope down from the fluid inlet 80 to the fluid outlet 85, gravity helps to pull fuel through the fuel channels 155, which can be especially helpful when the fuel channels have a relatively small inner diameter and/or are relatively long. In contrast, by angling the reactor core to slope up from the fluid inlet to the fluid outlet, the core can use gravity to slow the flow of the fuel through the reactor and/or to increase the dwell time of the fuel within the core.

Where the reactor core tube 120 is disposed at an angle, the tube can be disposed at any suitable angle. Indeed, in some embodiments, the reactor core is disposed at an incline or decline between about 0 degrees and about 90 degrees (or any subrange thereof) with respect to a horizontal plane (e.g., a floor or other horizontal supporting surface). Indeed, in some embodiments, the reactor tube is disposed at an angle Θ (e.g., sloping from the tube's first end 125 to its second end 130) between about 0 degrees and about 45 degrees (e.g., between about 8 degrees and about 15 degrees).

In some embodiments, the reactor 20 is configured to function as its orientation is changed (e.g., from vertical orientation, to diagonal orientation, and/or to a vertical orientation). Accordingly, some embodiments of the described reactor core are well suited for submarines, aircraft, and/other moving objects which may slightly or significantly vary the orientation of the reactor core.

Additionally, in some embodiments, the reactor 20 is coupled to a device that is configured to change an angle of the reactor to vary a flow rate of fuel through the reactor. In this regard, the angle of the reactor can be changed in any suitable manner, including, without limitation, by being automatically done by a computer (e.g., based on a feedback loop, programming, user commands, and/or any other suitable factor), manually, via any suitable machinery (e.g., one or more hydraulic lifts, motorized lifts, servos, cranes, jacks, pivoting platforms, and/or other suitable machinery), and/or in any other suitable manner.

As another example of a feature of the described system 10, some embodiments of the system are configured to drain out some or all of the fuel in the reactor core 70 to shut down the reactor 20. Indeed, in some embodiments, the system is configured to allow a significant portion of the fuel to be drained from the reactor core (e.g., via the fuel outlet 85) such that the remaining fuel in the reactor cools down and solidifies. In some such embodiments, the reactor can be restarted by cracking the fuel (e.g., via the heater 15), introducing the cracked fuel into the reactor, and then recirculating the cracked fuel until the solidified fuel in the core is heated and brought to a critical state.

As still another example, unlike some nuclear power plants that require a relatively large amount of real estate, some embodiments of the described system 10 have a relatively small footprint. Indeed, as discussed above, some embodiments of the described system can fit on a trailer, a train car, and/or in a variety of other locations that are relatively small.

In yet another example, unlike some nuclear reactors that require the reactor core to be shielded by thick magnetic cement, the reflectors 75 and the container 100 of some embodiments of the described reactor 20 control gamma radiation and neutronic escape sufficiently that additional cement shielding is unnecessary.

In still another example, some embodiments of the described system 10 are configured to actually use or "burn" nuclear waste from other nuclear reactors. As a result, in some embodiments, the described systems are quite beneficial for the environment and relatively inexpensive to operate.

In still another example of a feature of the described system 10, in some embodiments, as the various components of the fuel are mixed, such components become polluted from their pure state-thus making them relatively undesirable to terrorists or others who may seek to create weapons from such materials.

In still another example, some embodiments of the described system 10 are configured to produce relatively small amounts of plutonium in comparison to other nuclear power plants.

In even another example, some embodiments of the described reactor core 20 are configured to function in zero gravity-making such embodiments useful in space.

In yet other examples of features associated with the described system, the reactor 20, in some embodiments of the described system, is configured to be air cooled, and to thus require rather small amounts of water when compared with some conventional nuclear power reactors.

In even another example of a feature, some embodiments of the described system 10 comprise a reactor core 70 that has an internal space 135 that is relatively full with internal moderators. In this regard, some such embodiments leave relatively little room for gas (e.g., hydrogen, and/or other gases) to build-up in the reactor core 70. As a result, in some embodiments, some gases are prevented from forming and/or some gases are readily purged from the reactor core, thus reducing the chances of unwanted chemical reactions and/or explosions.

In yet another example, some embodiments of the described system are readily made mobile, thus making them ideal for power and/or heat generation in locations with relatively little infrastructure (e.g., at oil drilling sites, offshore oil drilling platforms, off-planet locations, the theater of war, water desalination at a body of water, oil spill cleanup, on the moon and/or mars, etc.).

Representative Operating Environment

As mentioned, some embodiments of the described system 10 are configured to be operated (at least in part) by one or more special-purpose computers (e.g., computers configured to control the reactor core 70) and/or general purpose computers. Indeed, the described systems and methods can be used with or in any suitable operating environment and/or software. In this regard, FIG. 12 and the corresponding discussion are intended to provide a general description of a suitable operating environment in accordance with some embodiments of the described systems and methods. As will be further discussed below, some embodiments embrace the use of one or more processing (including, without limitation, micro-processing) units in a variety of customizable enterprise configurations, including in a networked configuration, which may also include any suitable cloud-based service, such as a platform as a service or software as a service.

Some embodiments of the described systems and methods embrace one or more computer readable media, wherein each medium may be configured to include or includes thereon data or computer executable instructions for manipulating data. The computer executable instructions include data structures, objects, programs, routines, or other program modules that may be accessed by one or more processors, such as one associated with a general-purpose processing unit capable of performing various different functions or one associated with a special-purpose processing unit capable of performing a limited number of functions.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media (including non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing unit.

Figure 12:
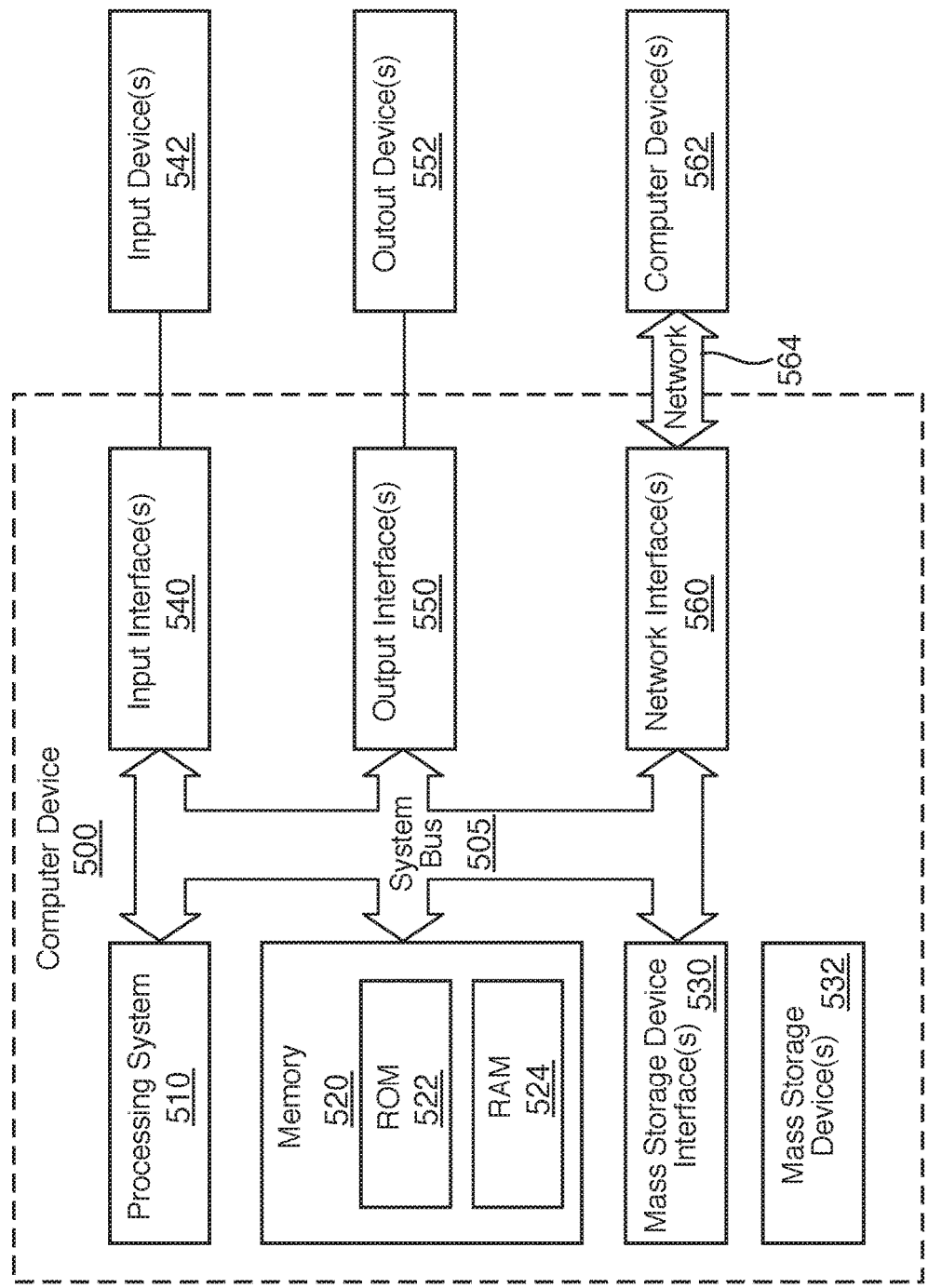
FIG. 12 illustrates a representative system that provides a suitable operating environment for use with some embodiments of the molten salt reactor system.

With reference to FIG. 12, a representative system includes computer device 500 (e.g., a monitoring system or other unit), which may be a general-purpose or (in accordance with some presently preferred embodiments) special-purpose computer. For example, computer device 500 may be a personal computer, a notebook computer, a PDA or other hand-held device, a workstation, a digital pen, a minicomputer, a mainframe, a supercomputer, a multi-processor system, a network computer, a processor-based consumer device, a cellular phone, a tablet computer, a smart phone, a feature phone, a smart appliance or device, a control system, or the like.

Computer device 500 includes system bus 505, which may be configured to connect various components thereof and enables data to be exchanged between two or more components. System bus 505 may include one of a variety of bus structures including a memory bus or memory controller, a peripheral bus, or a local bus that uses any of a variety of bus architectures. Typical components connected by system bus 505 include processing system 510 and memory 520. Other components may include one or more mass storage device interfaces 530, input interfaces 540, output interfaces 550, and/or network interfaces 560, each of which will be discussed below.

Processing system 510 includes one or more processors, such as a central processor and optionally one or more other processors designed to perform a particular function or task. It is typically processing system 510 that executes the instructions provided on computer readable media, such as on the memory 520, a magnetic hard disk, a removable magnetic disk, a magnetic cassette, an optical disk, or from a communication connection, which may also be viewed as a computer readable medium.

Memory 520 includes one or more computer readable media (including, without limitation, non-transitory computer readable media) that may be configured to include or includes thereon data or instructions for manipulating data, and may be accessed by processing system 510 through system bus 505. Memory 520 may include, for example, ROM 522, used to permanently store information, and/or RAM 524, used to temporarily store information. ROM 522 may include a basic input/output system ("BIOS") having one or more routines that are used to establish communication, such as during start-up of computer device 500. RAM 524 may include one or more program modules, such as one or more operating systems, application programs, and/or program data.

One or more mass storage device interfaces 530 may be used to connect one or more mass storage devices 532 to the system bus 505. The mass storage devices 532 may be incorporated into or may be peripheral to the computer device 500 and allow the computer device 500 to retain large amounts of data. Optionally, one or more of the mass storage devices 532 may be removable from computer device 500. Examples of mass storage devices include hard disk drives, magnetic disk drives, tape drives, solid state mass storage, and optical disk drives.

Examples of solid state mass storage include flash cards and memory sticks. A mass storage device 532 may read from and/or write to a magnetic hard disk, a removable magnetic disk, a magnetic cassette, an optical disk, or another computer readable medium. Mass storage devices 532 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

One or more input interfaces 540 may be employed to enable a user to enter data (e.g., initial information) and/or instructions to computer device 500 through one or more corresponding input devices 542. Examples of such input devices include a keyboard and/or alternate input devices, such as a digital camera, a sensor, bar code scanner, debit/credit card reader, signature and/or writing capture device, pin pad, touch screen, mouse, trackball, light pen, stylus, or other pointing device, a microphone, a joystick, a game pad, a scanner, a camcorder, and/or other input devices. Similarly, examples of input interfaces 540 that may be used to connect the input devices 542 to the system bus 505 include a serial port, a parallel port, a game port, a universal serial bus ("USB"), a firewire (IEEE 1394), a wireless receiver, a video adapter, an audio adapter, a parallel port, a wireless transmitter including, without limitation, interface satellite feeds, and/or any other suitable interface.

One or more output interfaces 550 may be employed to connect one or more corresponding output devices 552 to system bus 505. Examples of output devices include a monitor or display screen, a speaker, a wireless transmitter, a printer, and the like. A particular output device 552 may be integrated with or peripheral to computer device 500. Examples of output interfaces include a video adapter, an audio adapter, a parallel port, and the like.

One or more network interfaces 560 enable computer device 500 to exchange information with one or more local or remote computer devices, illustrated as computer devices 562, via a network 564 that may include one or more hardwired and/or wireless links. Examples of the network interfaces include a network adapter for connection to a local area network ("LAN") or a modem, a wireless link, or another adapter for connection to a wide area network ("WAN"), such as the Internet. The network interface 560 may be incorporated with or be peripheral to computer device 500.

Figure 13:
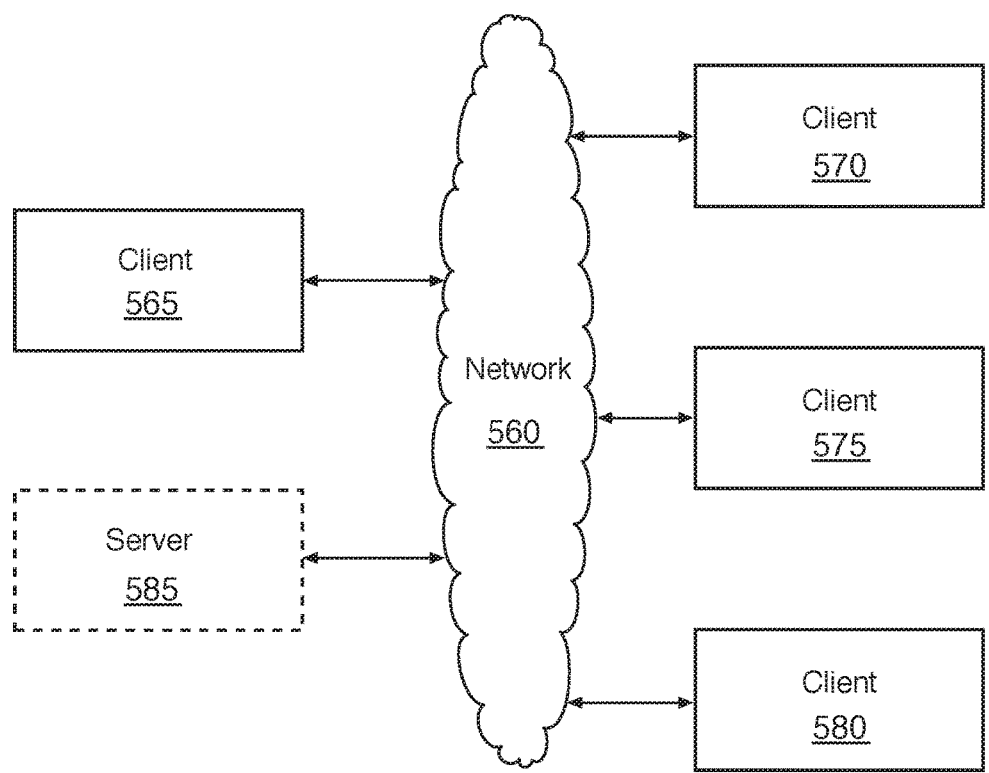
FIG. 13 illustrates a representative embodiment of a networked system that provides a suitable operating environment for use with some embodiments of the molten salt reactor system.

In a networked system, accessible program modules or portions thereof may be stored in a remote memory storage device. Furthermore, in a networked system computer device 500 may participate in a distributed computing environment, where functions or tasks are performed by a plurality networked computer devices. While those skilled in the art will appreciate that the described systems and methods may be practiced in networked computing environments with many types of computer system configurations, FIG. 13 represents an embodiment of a portion of the described systems in a networked environment that includes clients (565, 570, 575, etc.) connected to a server 585 via a network 560. While FIG. 13 illustrates an embodiment that includes 3 clients connected to the network, alternative embodiments include at least one client connected to a network or many clients connected to a network. Moreover, embodiments in accordance with the described systems and methods also include a multitude of clients throughout the world connected to a network, where the network is a wide area network, such as the Internet. Accordingly, in some embodiments, the described systems and methods can allow for remote monitoring, observation, adjusting, and other controlling of one or more of the described systems 10 from many places throughout the world.

Thus, as discussed herein, embodiments of the present invention embrace molten salt reactors. More particularly, some embodiments of the described invention relate to systems and methods for providing and using molten salt reactors. While the described systems can include any suitable component, in some embodiments, they include a graphite reactor core defining an internal space that houses one or more fuel wedges, where each wedge defines one or more fuel channels that extend from a first end to a second end of the wedge. In some embodiments, one or more of the fuel wedges comprise multiple wedge sections that are coupled together end to end and/or in any other suitable manner. In some cases, one or more alignment pins also extend between two sections of a fuel wedge to align the sections. In some cases, one or more seals are also disposed between two sections of a fuel wedge. Thus, in some cases, the reactor core can be relatively long. Additionally, in some embodiments, one or more sections of the wedges and/or parts of other reactor components are configured to be replaced relatively easily.

The present invention may be embodied in other specific forms without departing from its spirit or essential characteristics. The described embodiments, examples, and illustrations are to be considered in all respects only as illustrative and not restrictive. The scope of the invention is, therefore, indicated by the appended claims rather than by the foregoing description. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A method for using a molten salt reactor, the method comprising:
    obtaining a molten salt reactor comprising:
        a reactor core comprising graphite and defining an internal space; and
        a graphite fuel wedge that defines multiple fuel channels, wherein the fuel wedge is received within the internal space, wherein an outer surface of the fuel wedge comprises a first contoured shape, wherein an internal surface of the internal space comprises a second contoured shape, wherein the first contoured shape of the fuel wedge substantially corresponds in shape to and contacts the second contoured shape of the internal surface of the reactor core as the reactor core operates, and wherein the fuel channels are configured to allow a fissionable fuel to flow from a first end of the fuel wedge to a second end of the fuel wedge, and
    flowing the fissionable fuel through the fuel channels.

2. The reactor of claim 1, varying a rate at which the fissionable fuel flows through the fuel channels to vary a temperature of the fissionable fuel.

3. The reactor of claim 1, wherein the fuel wedge comprises:
    a first section comprising a first portion of the fuel channels, and
    a second section comprising a second portion of the fuel channels,
    wherein the first section and the second section are disposed end to end within the internal space such that the first and second portions of the fuel channels are aligned, and are in fluid communication, with each other,
    wherein an alignment pin extends between the first section and the second section of the fuel wedge, and
    wherein a seal is disposed between the first section and the second section of the fuel wedge.

* * * * *